US012041592B2

(12) United States Patent
Adachi et al.

(10) Patent No.: US 12,041,592 B2
(45) Date of Patent: Jul. 16, 2024

(54) WIRELESS COMMUNICATION DEVICE AND WIRELESS COMMUNICATION METHOD

(71) Applicant: KABUSHIKI KAISHA TOSHIBA, Tokyo (JP)

(72) Inventors: Tomoko Adachi, Kawasaki Kanagawa (JP); Masahiro Sekiya, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 481 days.

(21) Appl. No.: 17/472,492

(22) Filed: Sep. 10, 2021

(65) Prior Publication Data
US 2022/0110123 A1 Apr. 7, 2022

(30) Foreign Application Priority Data
Oct. 6, 2020 (JP) .................... 2020-169244

(51) Int. Cl.
*H04W 72/0453* (2023.01)
(52) U.S. Cl.
CPC ............... *H04W 72/0453* (2013.01)
(58) Field of Classification Search
CPC .............. H04W 72/0453; H04W 76/14; H04B 1/1027; H04B 2001/1045
USPC ...................................................... 455/452.1
See application file for complete search history.

(56) References Cited

U.S. PATENT DOCUMENTS

| 11,166,160 | B1* | 11/2021 | Wigger ................. G08B 7/06 |
| 2012/0014335 | A1 | 1/2012 | Adachi et al. |
| 2015/0245333 | A1* | 8/2015 | Hulkkonen ........... H04W 72/23 370/329 |
| 2017/0196009 | A1* | 7/2017 | Martin ................... H04L 5/001 |
| 2019/0158385 | A1 | 5/2019 | Patil et al. |
| 2019/0158413 | A1 | 5/2019 | Patil et al. |
| 2021/0219213 | A1* | 7/2021 | McCann ............... H04W 24/10 |

FOREIGN PATENT DOCUMENTS

| JP | 2010166401 A | 7/2010 |
| WO | 2019232808 A1 | 12/2019 |

OTHER PUBLICATIONS

Fischer, "Synchronous Transmitter Medium State Information", IEEE 802.11-20/0082r0, Jan. 2020.
Fischer, "Synchronous Transmitter Medium State Information", IEEE 802.11-20/0082r2, May 2020.
(Continued)

*Primary Examiner* — Tanmay K Shah
(74) *Attorney, Agent, or Firm* — Holtz, Holtz & Volek PC

(57) ABSTRACT

According to one embodiment, a wireless communication device notifies another wireless communication device that any one of a first frequency and a second frequency is set as a primary frequency, connects to the other wireless communication device at the first frequency and the second frequency, and in a case receiving information identifying that the other wireless communication device has a restriction on transmission and reception between the second frequency and the first frequency, obtains an access right of a frame addressed to the other wireless communication device at a secondary frequency other than the primary frequency out of the first frequency and the second frequency.

18 Claims, 37 Drawing Sheets

(56) References Cited

OTHER PUBLICATIONS

Guo, et al., "Multi-Link Grouping", IEEE 802.11-20/0034r0, Jan. 7, 2020.
Ho, et al., "MLA: Support for Constrained Devices", IEEE 802.11-20/0026r0, Jan. 10, 2020.
Ho, et al., "MLA: Sync PPDUs", IEEE 802.11-20/0026r2, Mar. 14, 2020.
Ho, et al., "MLA: Sync PPDUs", IEEE 802.11-20/0026r6, Mar. 14, 2020.
Seok, et al., "Synchronous Multi-Link Operation", IEEE 802.11-19/1305r4, Apr. 17, 2020.
Seok, et al., "Synchronous Multi-Link Transmission", IEEE 802.11-19/1305r0, Jan. 10, 2020.
Yano, et al., "A Study on Channel Selection with the Aid of Task-shared Multi-channel Sensing for Multi-band Wireless LAN", IEICE Technical Report (vol. 118, No. 474, RCS2018-314), Mar. 2019, pp. 169-174.

* cited by examiner

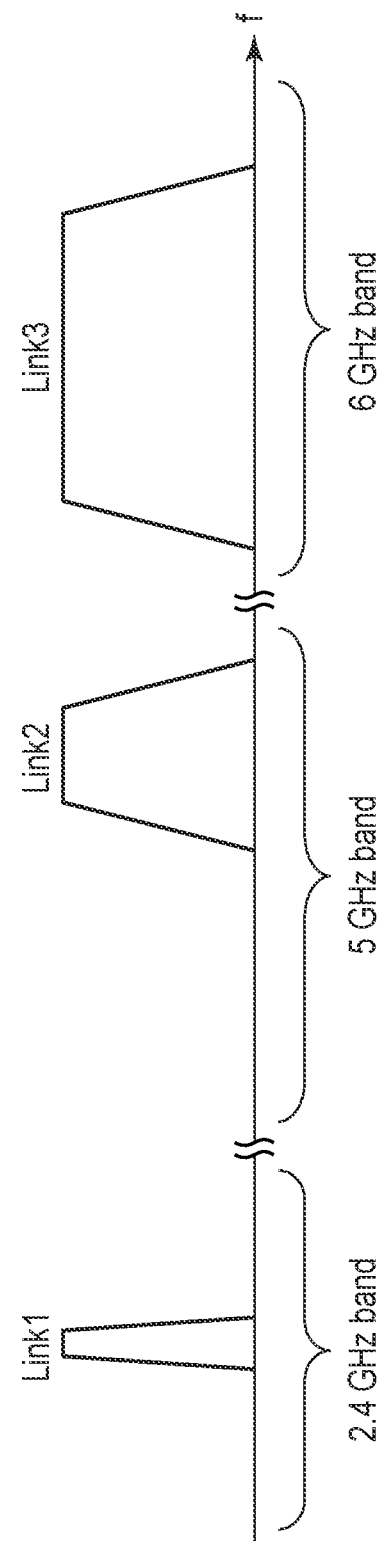
F I G. 1

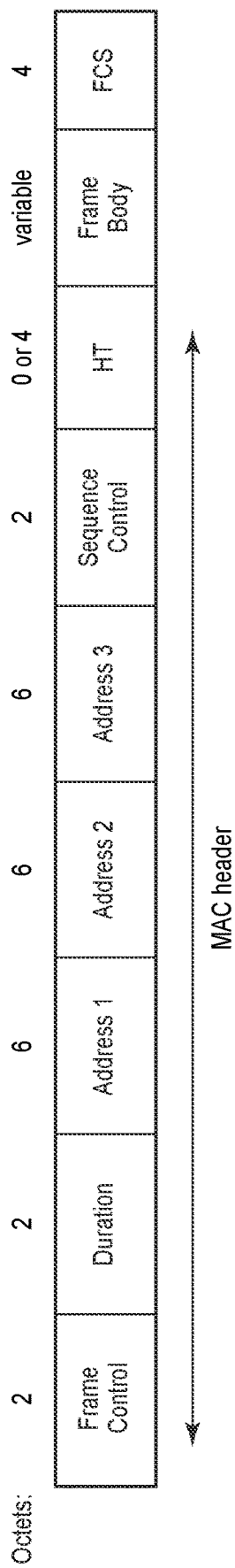
F I G. 3

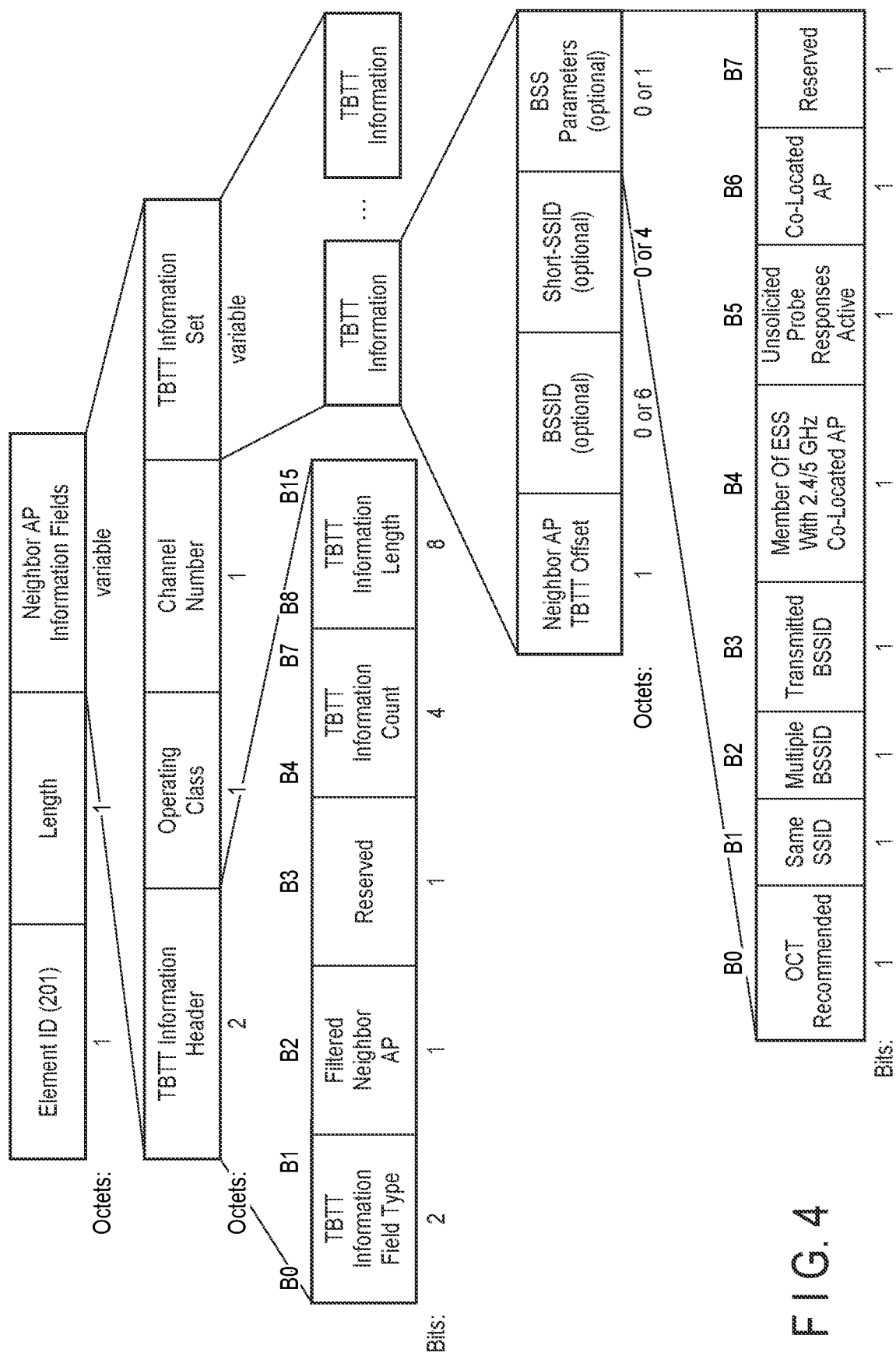
F I G. 4

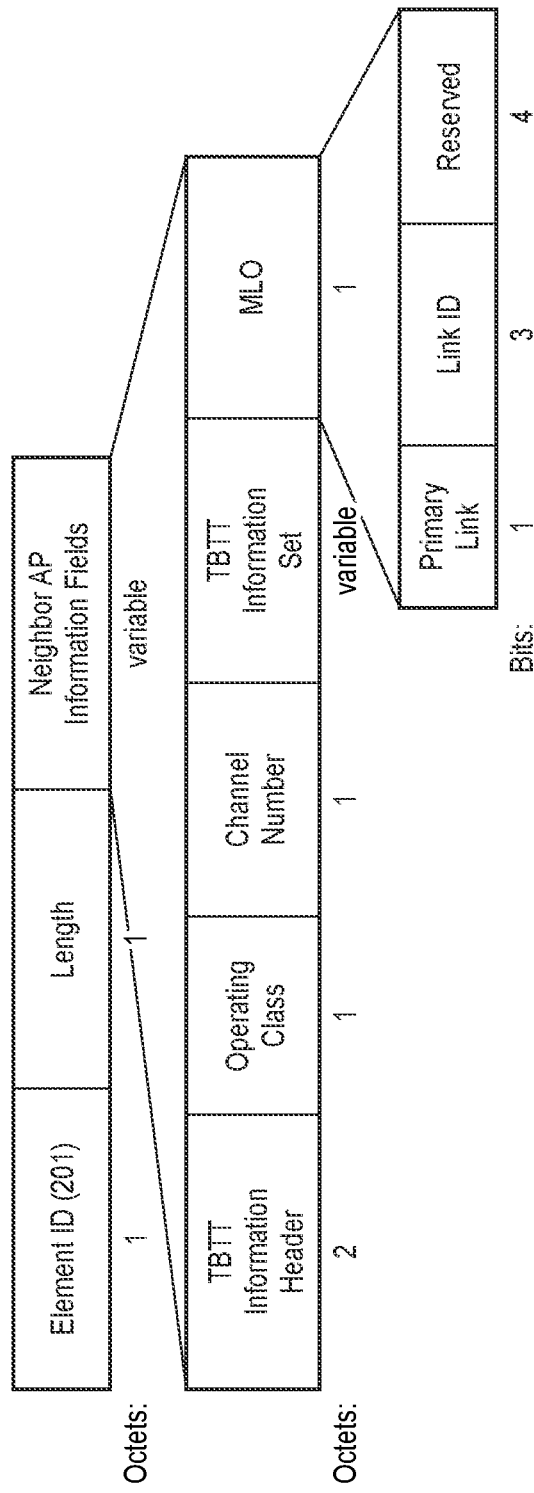
F I G. 5

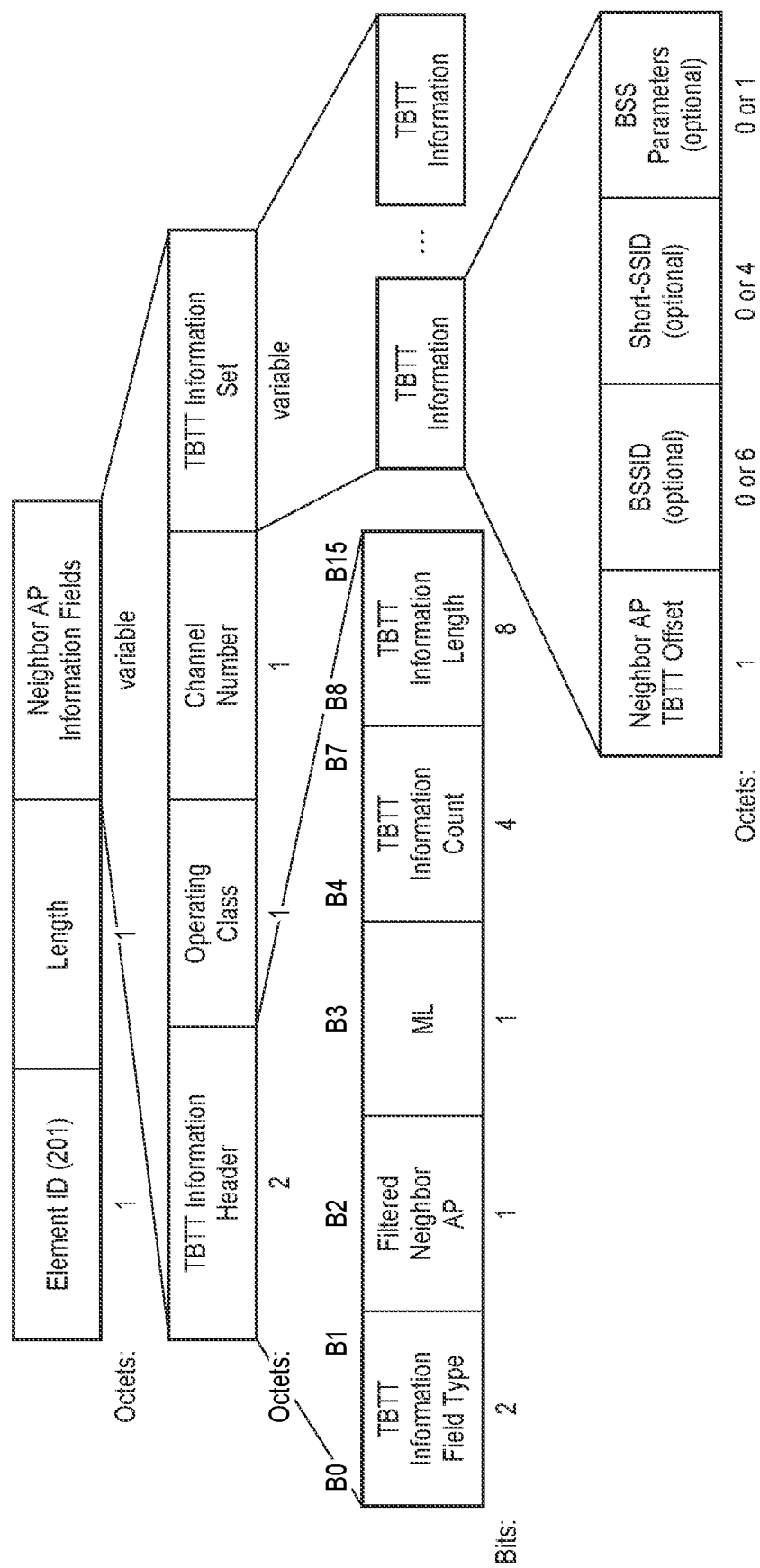
F I G. 6

| Value of TBTT Information Length Subfield | Content of TBTT Information Subfield |
|---|---|
| 1 | Neighbor AP TBTT Offset |
| 2 | Neighbor AP TBTT Offset and BSS parameters |
| 5 | Neighbor AP TBTT Offset and Short-SSID |
| 6 | Neighbor AP TBTT Offset, Short-SSID, and BBS parameters |
| 7 | Neighbor AP TBTT Offset and BSSID |
| 8 | Neighbor AP TBTT Offset, BSSID, and BSS parameters |
| 11 | Neighbor AP TBTT Offset, BSSID, and Short-SSID |
| 12 | Neighbor AP TBTT Offset, BSSID, Short-SSID, and BSS parameters |
| 0, 3-4, 9-10 | Reserved |
| 13-225 | Reserved, but the first 12 octets of the field are the same as for TBTT Information Length |

F I G. 8

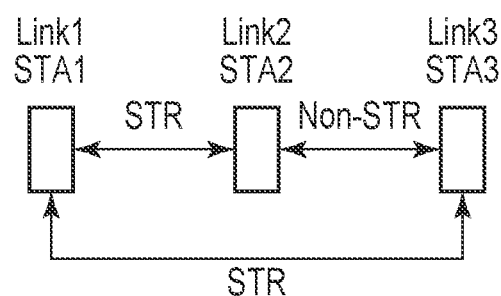
F I G. 10
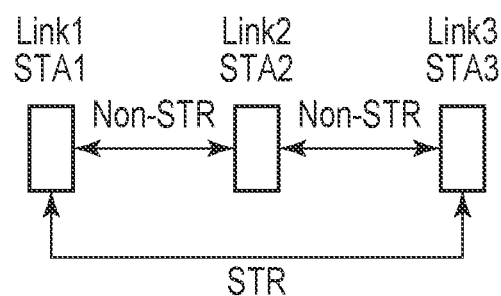
F I G. 12

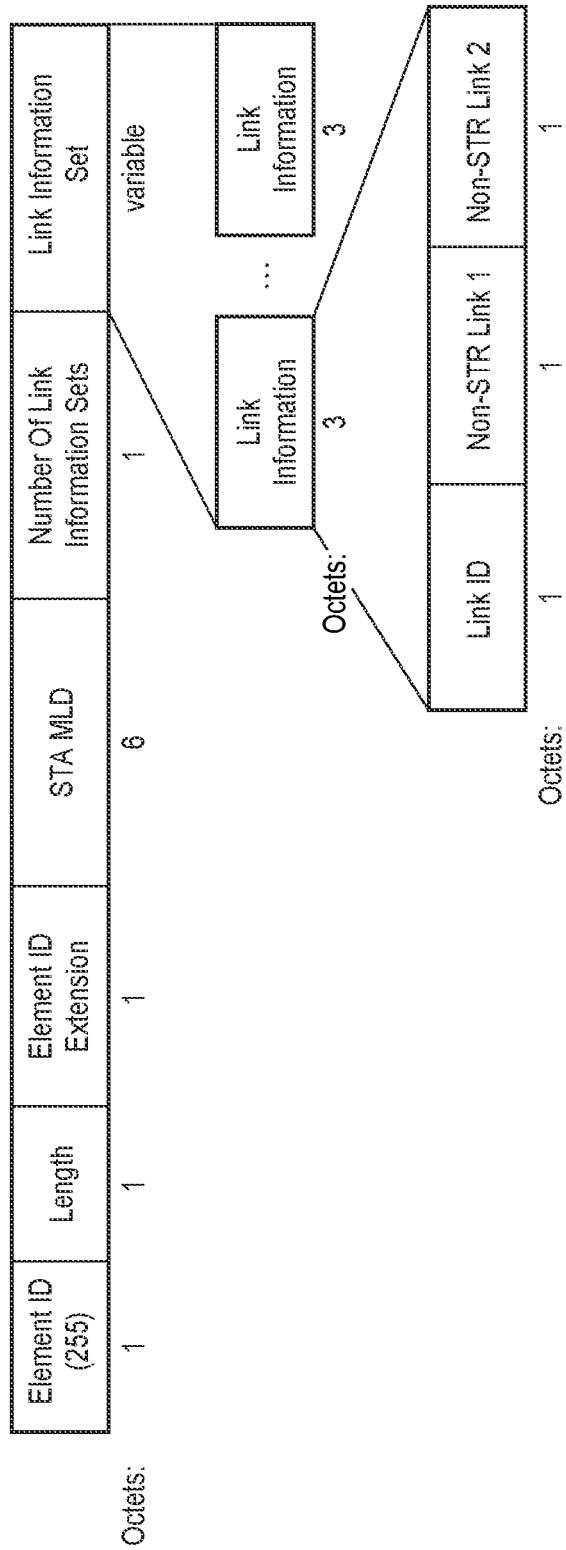
F I G. 11

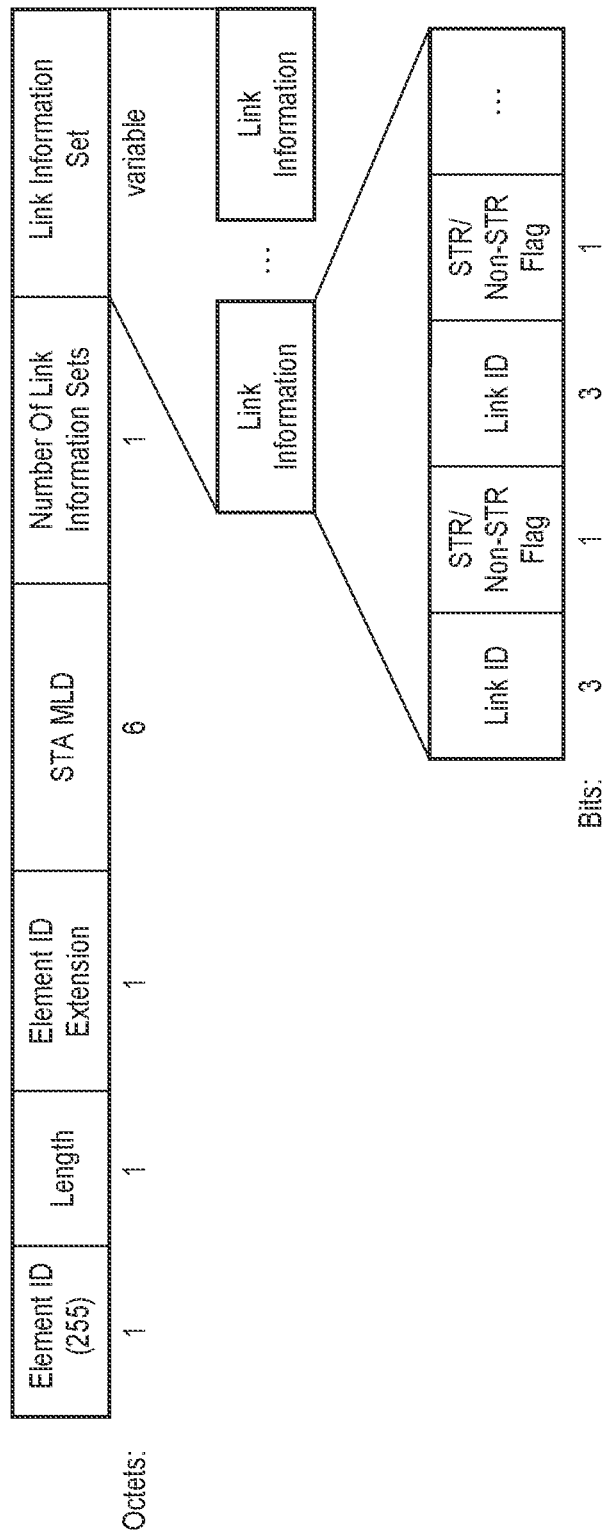
F I G. 13

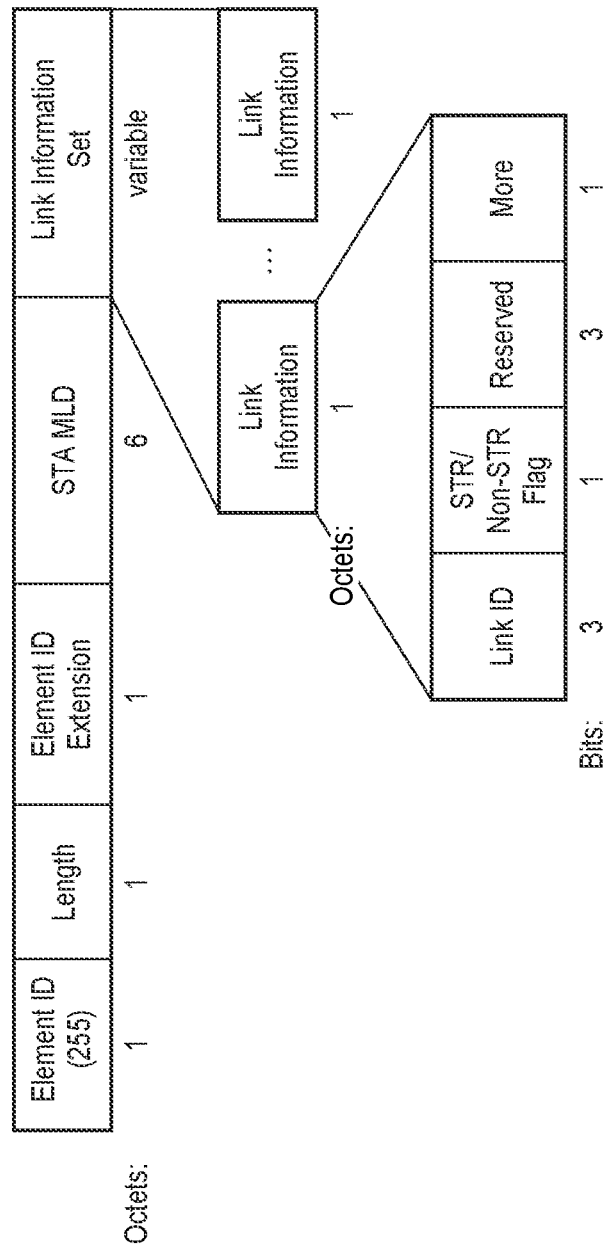
F I G. 14

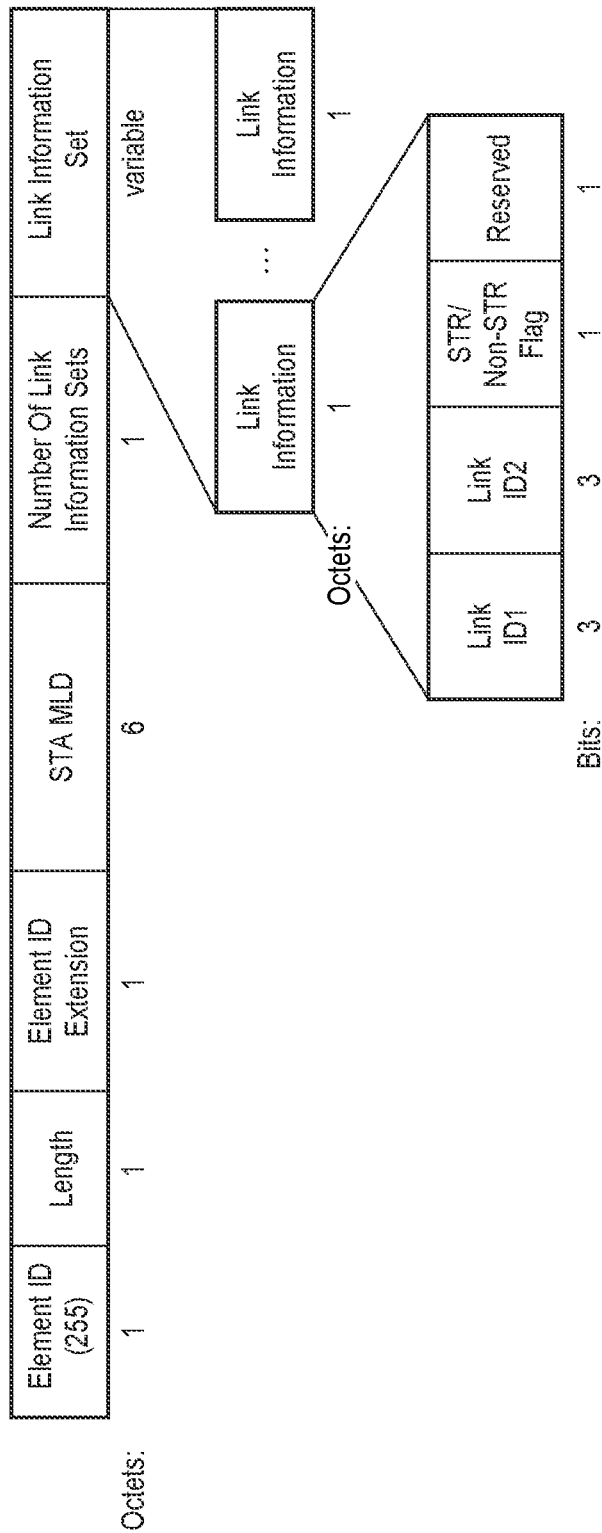
F I G. 15

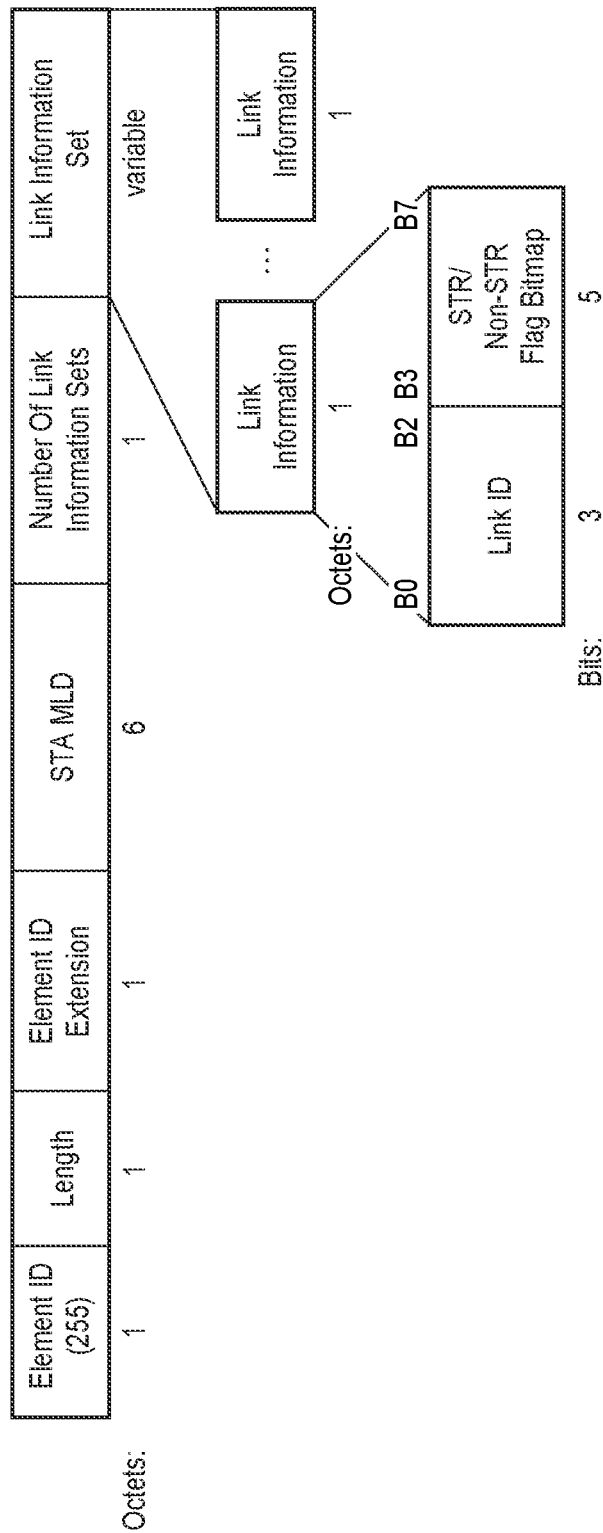
F I G. 16

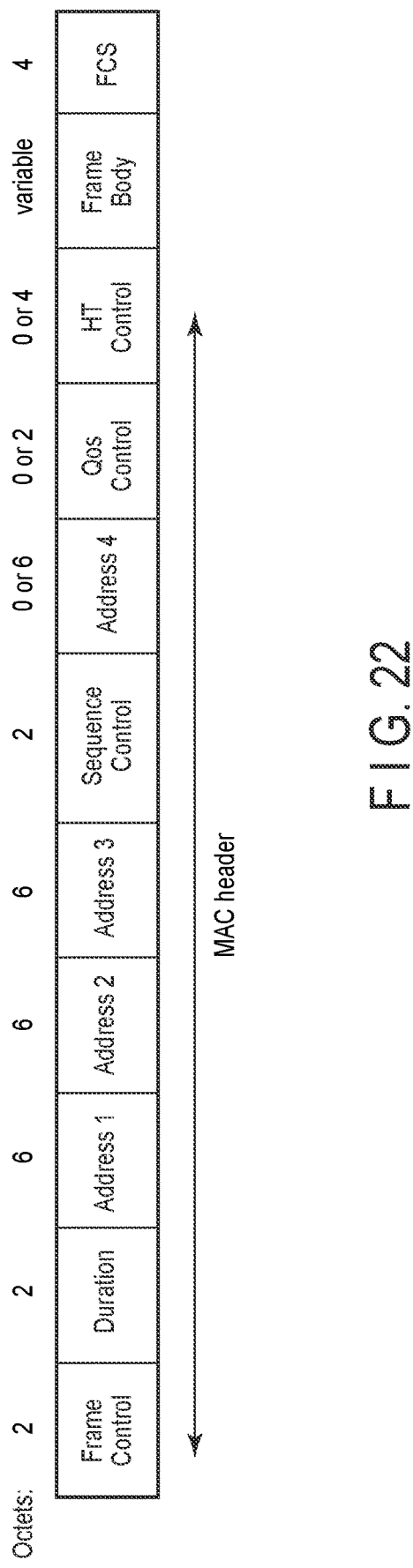
F I G. 22

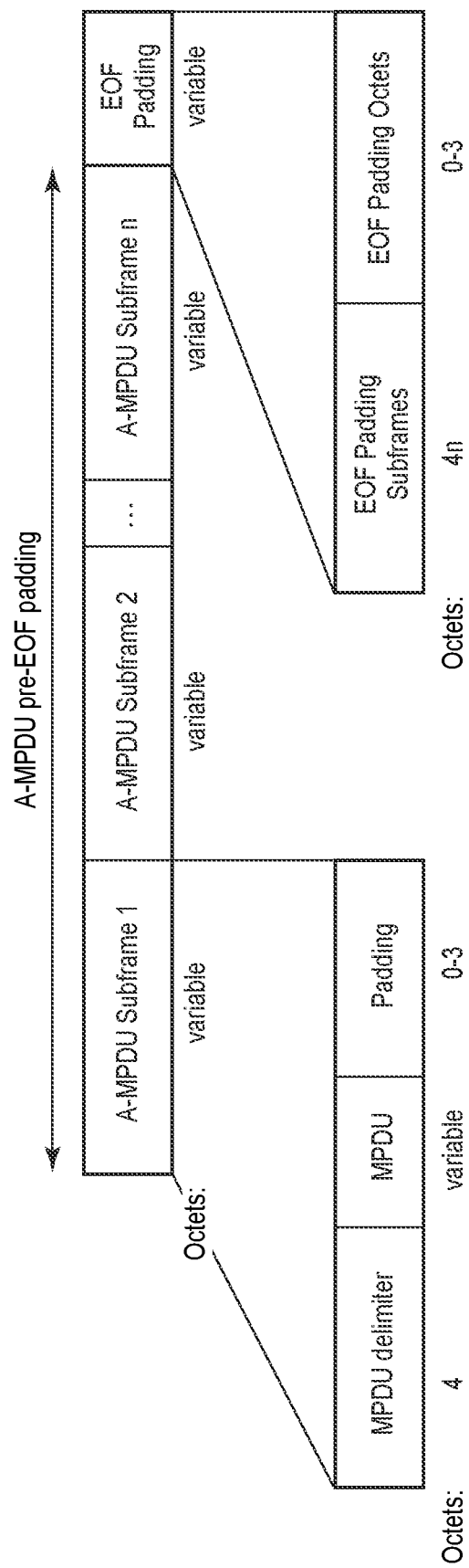
F I G. 24

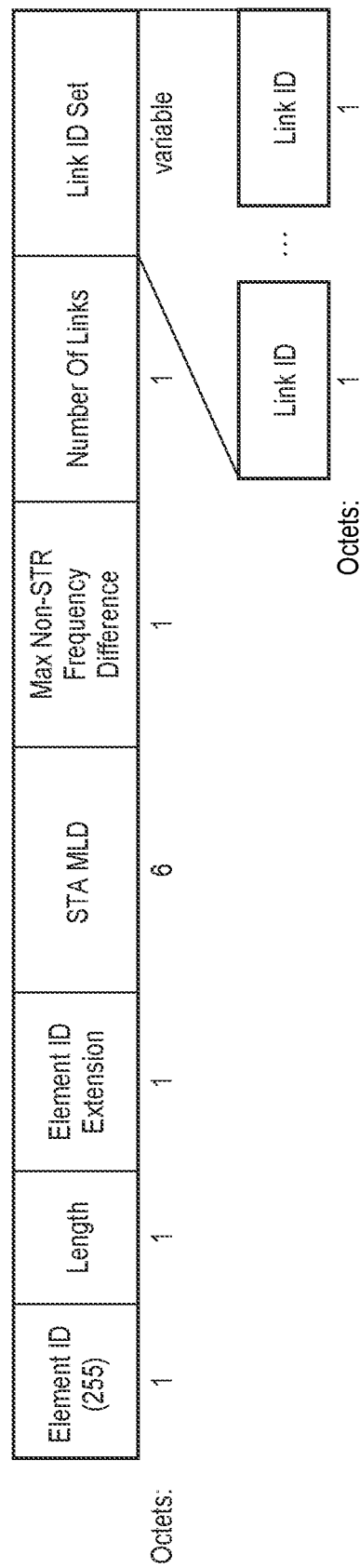
F I G. 26

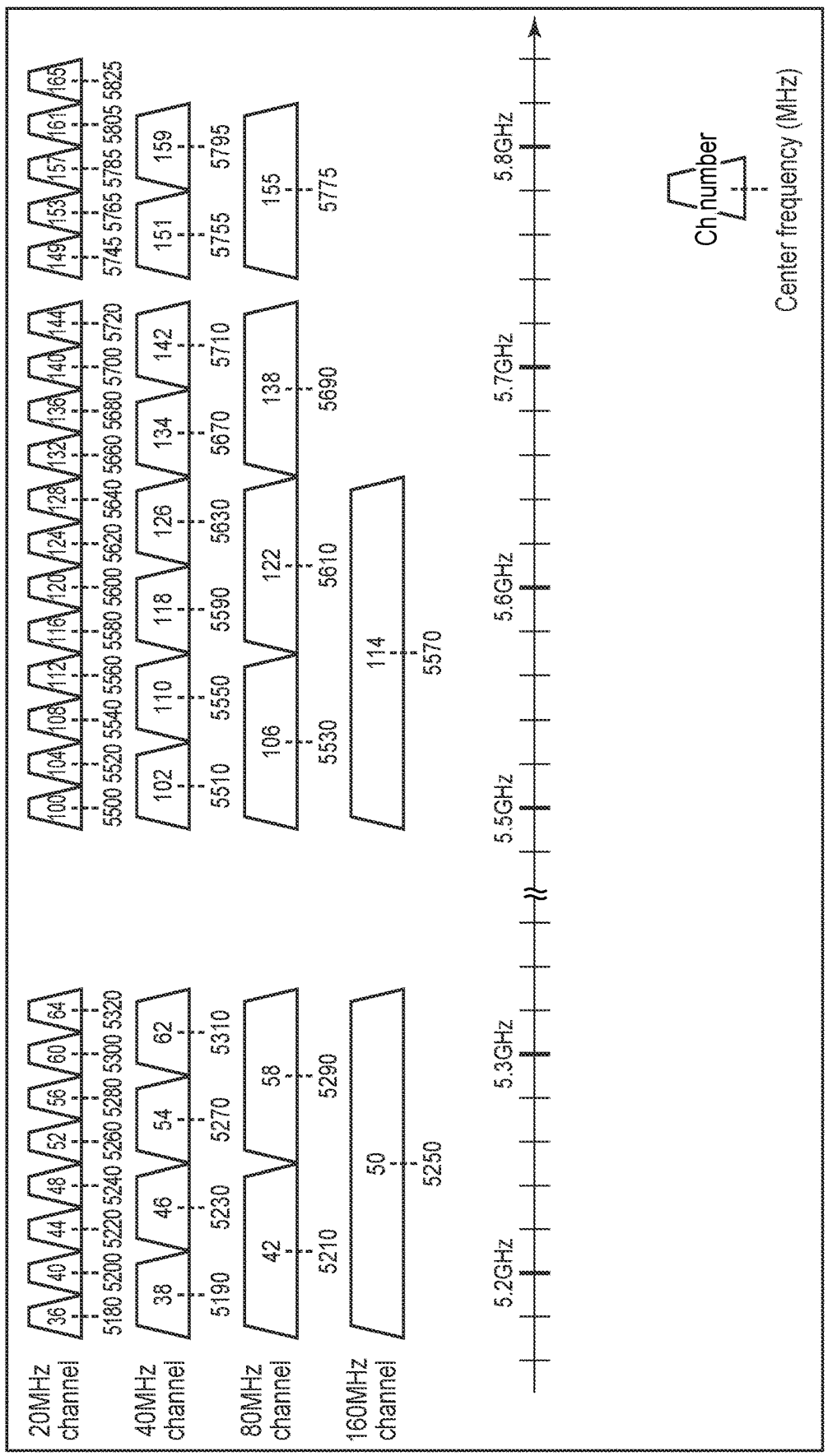
F I G. 27

| Status code | Name | Content |
|---|---|---|
| 0 | SUCCESS | Success |
| 1 | REFUSED, REFUSED_REASON_UNSPECIFIED | Refused (refused reason unspecified) |
| 2 | TDLS_REJECTED_ALTERNATIVE_PROVIDED | TDLS wakeup schedule is rejected (Substitute schedule is available) |
| 3 | TDLS_REJECTED | TDLS wakeup schedule is rejected |
| 4 | | Reserved |
| 5 | SECURITY_DISABLED | Security disabled |
| ⋮ | ⋮ | ⋮ |
| 8-9 | | Reserved |
| ⋮ | ⋮ | ⋮ |
| 20-21 | | Reserved |
| ⋮ | ⋮ | ⋮ |

F I G. 28

| Status code | Name | Content |
|---|---|---|
| 0 | SUCCESS | Success |
| 1 | REFUSED, REFUSED_REASON_UNSPECIFIED | Refused (refused reason unspecified) |
| 2 | TDLS_REJECTED_ALTERNATIVE_PROVIDED | TDLS wakeup schedule is rejected (Substitute schedule is available) |
| 3 | TDLS_REJECTED | TDLS wakeup schedule is rejected |
| 4 | DENIED_NOT_PRIMARY_LINK | Denied because link is not primary link |
| 5 | SECURITY_DISABLED | Security disabled |
| ⋮ | ⋮ | ⋮ |
| 8-9 | | Reserved |
| ⋮ | ⋮ | ⋮ |
| 20-21 | | Reserved |
| ⋮ | ⋮ | ⋮ |

F I G. 29

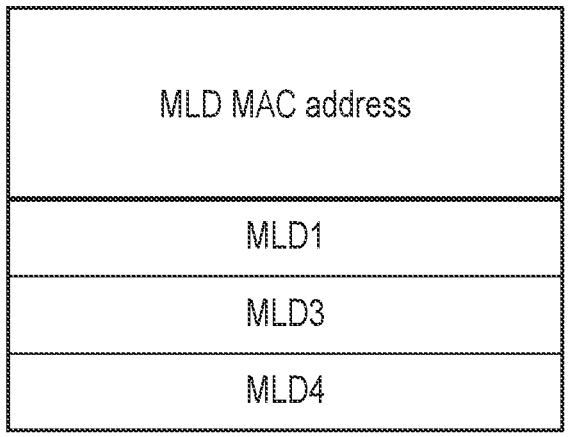
FIG. 30A
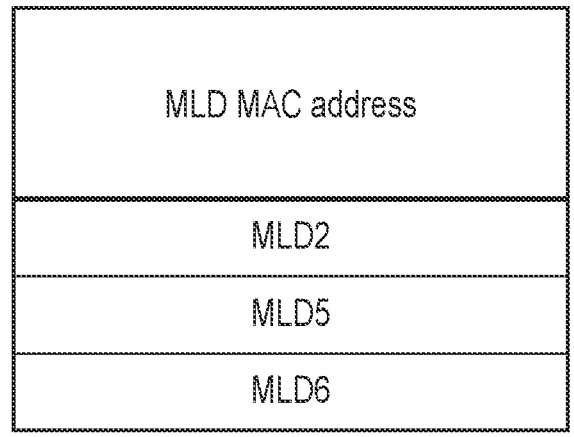
FIG. 30B
| MLD MAC address | Current link (Link2) MAC address | Current link (Link2) AID |
|---|---|---|
| MLD1 | STA1-2 | AID1-2 |
| MLD3 | STA3-2 | AID3-2 |
| MLD4 | STA4-2 | AID4-2 |
FIG. 31A
| MLD MAC address | Current link (Link2) MAC addres | Current link (Link2) AID |
|---|---|---|
| MLD2 | STA2-2 | AID2-2 |
| MLD5 | STA5-2 | AID5-2 |
| MLD6 | STA6-2 | AID6-2 |
FIG. 31B

| MLD MAC address | Primary link (Link1) MAC address | Primary link (Link1) AID | Link2 MAC address | Link2 AID | Non-STR link relationship with primary link |
|---|---|---|---|---|---|
| MLD1 | STA1-1 | AID1-1 | STA1-2 | AID1-2 | Y |
| MLD2 | STA2-1 | AID2-1 | STA2-2 | AID2-2 | N |
| MLD3 | STA3-1 | AID3-1 | STA3-2 | AID3-2 | Y |
| MLD4 | STA4-1 | AID4-1 | STA4-2 | AID4-2 | Y |
| MLD5 | STA5-1 | AID5-1 | STA5-2 | AID5-2 | N |
| MLD6 | STA6-1 | AID6-1 | STA6-2 | AID6-2 | N |

F I G. 32

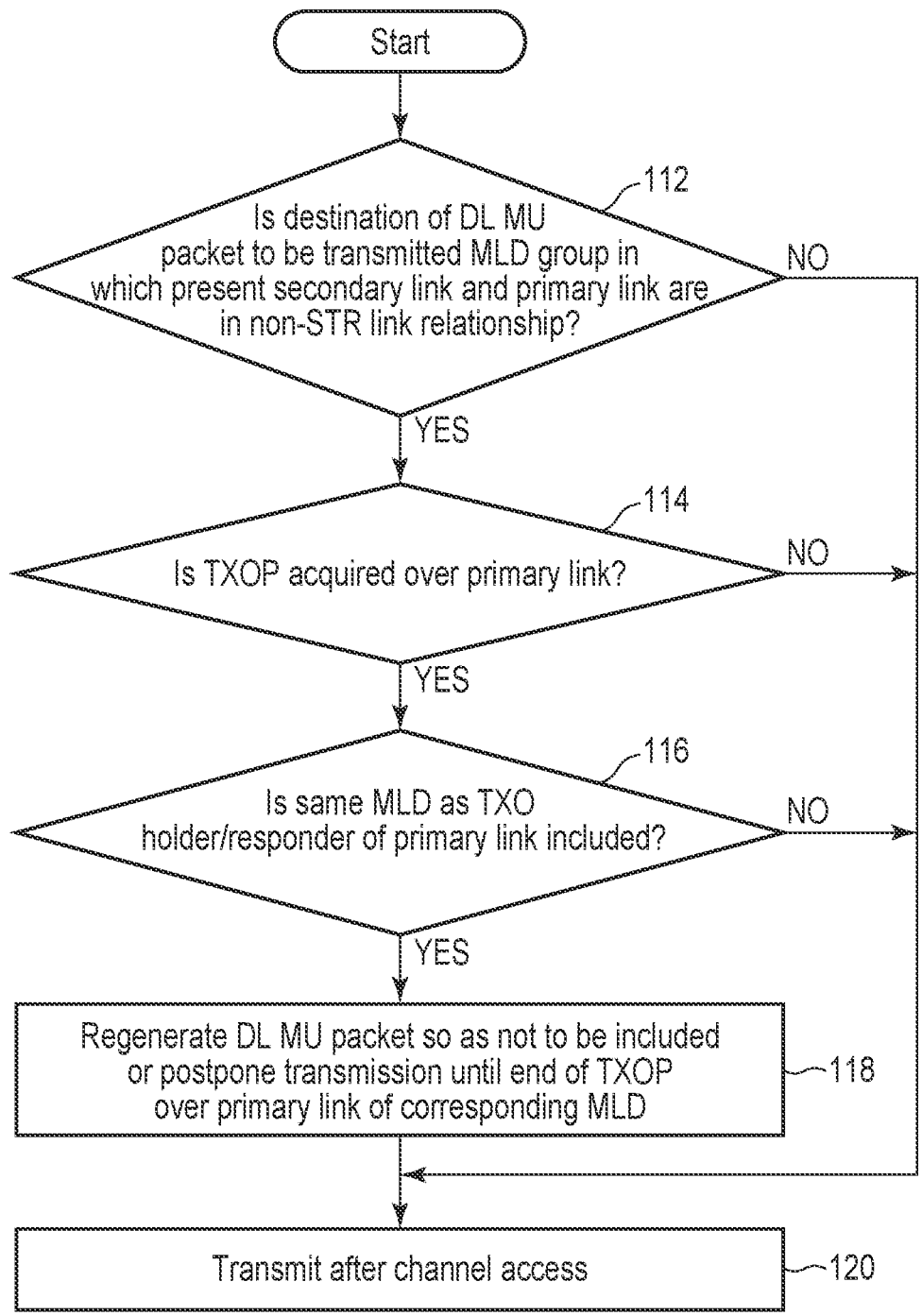
F I G. 33

| Status code | Name | Content |
|---|---|---|
| 0 | SUCCESS | Success |
| 1 | REFUSED, REFUSED_REASON_UNSPECIFIED | Refused (refused reason unspecified) |
| 2 | TDLS_REJECTED_ ALTERNATIVE_PROVIDED | TDLS wakeup schedule is rejected (Substitute schedule is available) |
| 3 | TDLS_REJECTED | TDLS wakeup schedule is rejected |
| 4 | | Reserved |
| 5 | SECURITY_DISABLED | Security disabled |
| ⋮ | ⋮ | ⋮ |
| 8 | DENIED_EXCEED_MAX_VALUE | Denied because the number of connections of STA-MLD exceeds maximum value |
| 9 | | Reserved |
| ⋮ | ⋮ | ⋮ |
| 20-21 | TDLS_REJECTED_ ALTERNATIVE_PROVIDED | Reserved |
| ⋮ | ⋮ | ⋮ |

F I G. 34

| Status code | Name | Content |
|---|---|---|
| 0 | SUCCESS | Success |
| 1 | REFUSED, REFUSED_REASON_UNSPECIFIED | Refused (refused reason unspecified) |
| 2 | TDLS_REJECTED_ALTERNATIVE_PROVIDED | TDLS wakeup schedule is rejected (Substitute schedule is available) |
| 3 | TDLS_REJECTED | TDLS wakeup schedule is rejected |
| 4 | | Reserved |
| 5 | SECURITY_DISABLED | Security disabled |
| ⋮ | ⋮ | ⋮ |
| 8-9 | | Reserved |
| ⋮ | ⋮ | ⋮ |
| 20 | DENIED_STR_LINKS | Reject due to STR link |
| 21 | DENIED_NON_STR_LINK | Reject due to non-STR link |
| ⋮ | ⋮ | ⋮ |

F I G. 36

| Status code | Name | Content |
|---|---|---|
| 0 | SUCCESS | Success |
| 1 | REFUSED, REFUSED_REASON_UNSPECIFIED | Refused (refused reason unspecified) |
| 2 | TDLS_REJECTED_ALTERNATIVE_PROVIDED | TDLS wakeup schedule is rejected (Substitute schedule is available) |
| 3 | TDLS_REJECTED | TDLS wakeup schedule is rejected |
| 4 | | Reserved |
| 5 | SECURITY_DISABLED | Security disabled |
| ⋮ | ⋮ | ⋮ |
| 8 | | Reserved |
| 9 | DENIED_NOT_RESTRICTION_CONDITION | Denied because restriction condition is not satisfied |
| ⋮ | ⋮ | ⋮ |
| 20-21 | | Reserved |
| ⋮ | ⋮ | ⋮ |

F I G. 37

| Value of Trigger Type Subfield | Trigger Frame Type |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

F I G. 38

WIRELESS COMMUNICATION DEVICE AND WIRELESS COMMUNICATION METHOD

CROSS-REFERENCE TO RELATED APPLICATIONS

This application is based upon and claims the benefit of priority from Japanese Patent Application No. 2020-169244, filed Oct. 6, 2020, the entire contents of which are incorporated herein by reference.

FIELD

Embodiments descried herein relate generally to a wireless communication device and a wireless communication method that per multi-link communication.

BACKGROUND

There are known multi-link communications that perform communications among wireless links. When devices via a plurality of wireless links. When transmission and reception are performed independently in each of the plurality of wireless links, communication band is widened and throughput is improved. However, there may be cases when transmission and reception cannot be performed independently at each of the plurality of wireless links due to such as interference among the wireless links.

BRIEF DESCRIPTION OF THE DRAWINGS

FIG. 1 illustrates an example of wireless links used in multi-link communication.

FIG. 3 illustrates an example of a format of a Beacon frame.

FIG. 4 illustrates an example of a format of a Reduced Neighbor Report element included ill a Frame Body of the Beacon frame.

FIG. 5 illustrates a first example of a format of the Reduced Neighbor Report element reporting information of the multi-link communication.

FIG. 6 illustrates a second example of a format of the Reduced Neighbor Report element reporting information of the multi-link communication.

FIG. 8 is a table illustrating an example of relationship between a value of a TBTT Information Length subfield and types of subfields included in the TBTT Information subfield.

FIG. 10 illustrates an example of three wireless links in which Link2 and Link3 are in non-STR link relationship and LinK1 and other two links are in STR link relationship.

FIG. 11 illustrates an example of a format of an ML element included in a Frame Body of an Association Request frame.

FIG. 12 illustrates another example of three wireless links in which Link2 and Link3 are in non-STR link relationship and Link1 and Link1 are in non-STR link relationship.

FIG. 13 illustrates another example of a format of the ML element.

FIG. 14 illustrates a further example of a format of the ML element.

FIG. 15 illustrates a fur the example of a format of the ML element.

FIG. 16 illustrates a further example of a format of the ML element.

FIG. 22 illustrates an example of a format of a Data frame.

FIG. 24 illustrates an example of padding by frame aggregation.

FIG. 26 illustrates an example of a format of an ML element according to a second embodiment.

FIG. 27 illustrates an example of channels in a wireless LAN standard.

FIG. 28 illustrates an example of a Status Code of the wireless LAN standard.

FIG. 29 illustrates an example of a Status Code of the wireless LAN standard according to a third embodiment.

FIGS. 30A and 30B illustrate examples of a table created by the AP MLD according to a fourth embodiment.

FIGS. 31A and 31B illustrate another examples of the table created by the AP MLD according to the fourth embodiment.

FIG. 32 illustrates a further example of the table created by the AP MLD according to the fourth embodiment.

FIG. 33 is a flowchart illustrating an example of classifying processing of STA MLDs by the UP MLD according to the fourth embodiment.

FIG. 34 illustrates an example of a Status Code according to a sixth embodiment.

FIG. 36 illustrates an example of a Status Code according to a ninth embodiment.

FIG. 37 illustrates an example of a Status Code according to a tenth embodiment.

FIG. 38 illustrate an example of a Trigger Type subfield according to an eleventh embodiment.

DETAILED DESCRIPTION

Figure 2:
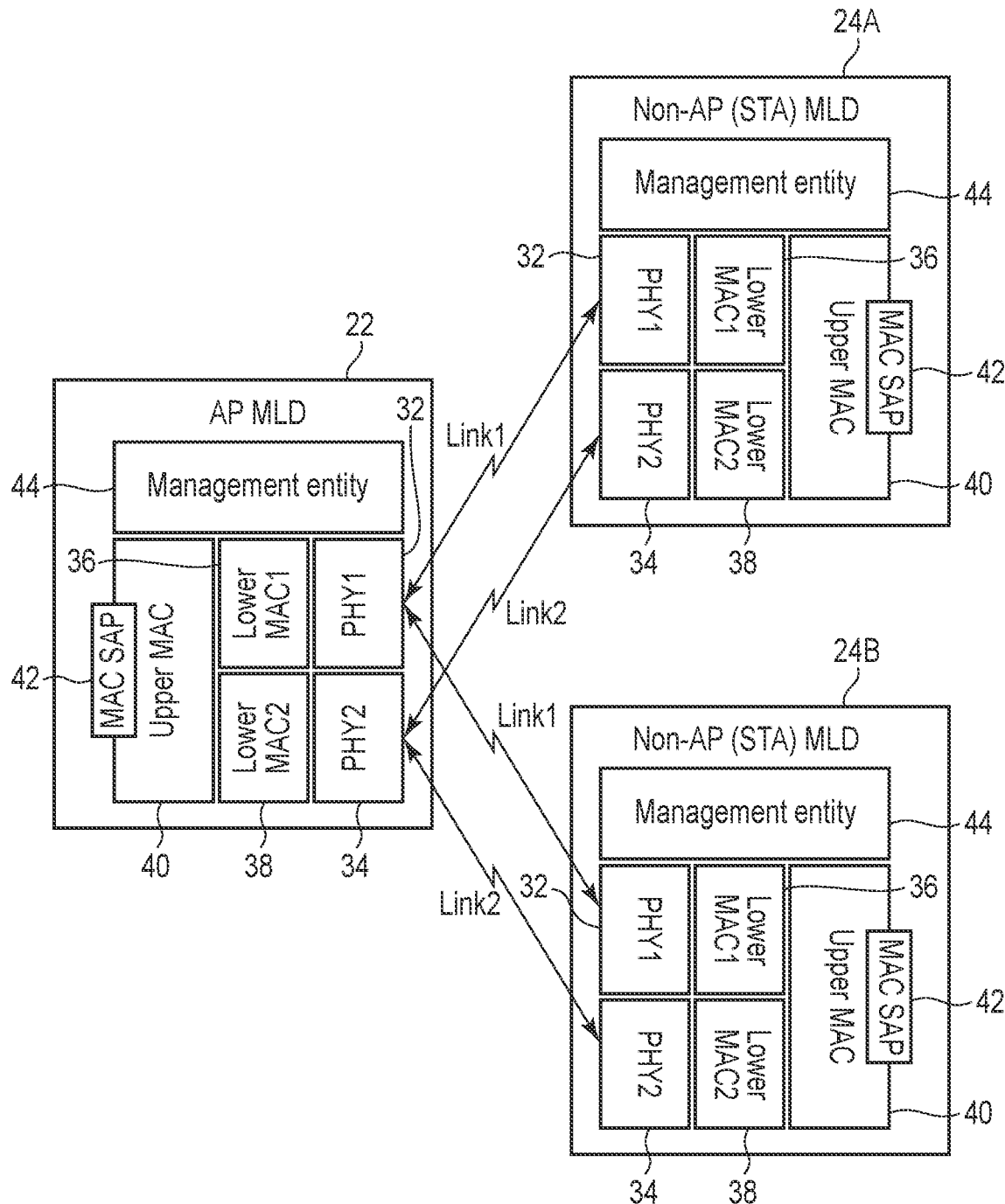
FIG. 2 illustrates an example of wireless communication devices that perform the multi-link communication.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a wireless communication device is capable of receiving, from another wireless communication device at a first frequency, first information capable of identifying that the other wireless communication device is capable of operating at a second frequency, and second information capable of identifying that the other wireless communication device has a restriction on transmission and reception between the second frequency and the first frequency; notifies the other wireless communication device that any one of the first frequency and the second frequency is set as a primary frequency; connects to the other wireless communication device at the first frequency and the second frequency; and in a case where the wireless communication device receives the second information, based on whether a transmission destination address of a transmission source address of communication at the primary frequency includes an address of the other wireless communication device, obtains an access right of a frame addressed to the other wireless communication device at a secondary frequency other than the primary frequency out of the first frequency and the second frequency.

First Embodiment

<<Multi-link Communication>>

In the multi-link communication, communication is performed among wireless communication devices using a plurality of wireless links. The one enabling multi-link communication is referred to as multi-link operation (hereinafter, referred to as MLD).

The wireless link corresponds to a frequency channel at different frequency bands or in the same frequency band. In a wireless LAN in conformity with IEEE 802.11 standard using 2.4 GHz band, 5 GHz band, and 6 GHz band, a frequency channel is determined using a channel bonding technique based on a 20 MHz channel. That is, the channel of the wireless LAN includes 40 MHz channel using two adjacent 20 MHz channels, 80 MHz channel using four adjacent 20 MHz channels, 160 MHz channel using eight adjacent 20 MHz channels, or 80+80 MHz channel using two sets of four adjacent 20 MHz channels. These channels correspond to frequency channels of a wireless link. In future, in 6 GHz band specifically, 320 MHz channel, 160+160 MHz channel, 240 MHz channel, or 160+80 MHz channel may be also assumed as channels of the wireless LAN.

In other words, the wireless link is a frequency channel used in a basic service set (hereinafter, referred to as a BSS) which is a unit of a wireless LAN system including an access point hereinafter, referred to as AP) having one medium access control (hereinafter, referred to as MAC) address. The AP notifies a wireless communication device of the frequency channel used in the BSS using a Beacon frame or a Probe Response frame.

FIG. 1 illustrates an example of wireless links used in the multi-link communication. Wireless links (Link1, Link2, and Link3) of three frequency bands are used. For example, Link1 is in 2.4 GHz band and has a channel width of 20 MHz. Link2 is in 5 GHz band and has a channel width of 80 MHz. Link3 is in 6 GHz band and has a channel width of 160 MHz.

Naturally, the number of wireless links used in the multi-link communication is not limited to three, and may be two or four or more. The plurality of wireless links may be in the same frequency band instead of being in different frequency bands. For example, two wireless links of 160 MHz channel may be in 6 GHz band. The frequency hand is not limited to 2.4 GHz band, 5 GHz band, and 6 GHz band, and as long as frequency bands that are usable by the wireless system increase, the frequency Land may naturally include these usable frequency bands.

In regard to 2.4 GHz band, channel numbers that are usable without substantial interference are Ch. 1, Ch. 6, and Ch. 11. Since channel numbers are allocated at Intervals of 5 MHz, these three channels are allocated at intervals of 25 MHz. Therefore, although the use of 40 MHz channel is permitted in IEEE 802.11 standard, the use of channel bonding is not appropriate. Therefore, it is considered that a usage pattern, of selecting only one 20 MHz channel is adopted in most of the cases in 2.4 GHz band.

<<AP MLD and STA MLD>>

Generally, when the multi-link communication is performed, a wireless communication device serving as an AP on each of the wireless links is referred to as an AP multi-link device (hereinafter, referred to as an AP MLD), and a wireless communication device operating as a non-AP (terminal (STA)) on each of the wireless links is referred to as a non-AP MLD. In the wireless LAN in conformity with IEEE 802.11 standard, since an AP is also a type of STA, a STA that is not an AP is expressed as a non-AP. However, a terminal that communicates with an AP can be expressed as a STA as a counterpart to the AP. Therefore, in this specification, a non-AP is referred to as a STA for convenience, and a non-AP MLD is referred to as a STA MLD.

<<Wireless Communication Device>>

FIG. 2 illustrates an example of wireless communication devices that perform the multi-link communication.

For example, an AP MLD 22 can perform the multi-link communication with non-AP (STA) MLDs 24A and 24B over a plurality of wireless links, Link1 and Link2, for example. The number of the Non-AP (STA) MLDs 24A and 24B is not limited to two, and may be three or more, or may be singular. The number of wireless links that perform the multi-communication is not limited to two, and may be three or more. When the multi-link communication is performed using two wireless links, the wireless links are not limited to Link1 and Link2, and may be Link1 and Link3 or Link2 and Link3. The combination of wireless links between the AP MLD 22 and the non-AP (STA) MLD 24A may be the same as or different from the combination of wireless links between the AP MLD 22 and the non-AP (STA) MLD 24B.

The basic structure relating to the multi-link communication at the AP MLD 22 and the Non-AP (STA) MLDs 24A and 24P is substantially the same. Although not illustrated in FIG. 2 the AP MLD 22 may be connected to a wired infrastructure network. The implementation of the AP MLD 22 and the Non-AP (STA) MLDs 24A and 248 varies depending on whether the two wireless links are in non-STR link relationship, i.e., the two wireless links are a non-STR link pair, or in STR link relationship, i.e., the two wireless links are an STR link pair (details will he described later).

As one implementation method for the multi-link communication, a wireless communication device includes a processing unit that controls access to a wireless medium for the wireless links and a physical processing unit. The AP MLD 22 and the Non-AP (STA) MLDs 24A and 24B each includes a first physical processing unit (PHY 1) 32 and a first lower MAC processing unit (Lower MAC 1) 36 for Link1, a second physical processing unit (PHY 2) 34 and a second tower MAC processing unit (Lower MAC 2) 38 for Link2, and further includes an upper MAC processing unit 40 and a management entity 44. The lower MAC processing units 36 and 38 correspond to processing units that control access to the wireless medium. The lower MAC processing unit 36 and the physical processing unit 32 of the AP MLD 22 and the Non-AP (STA) MLDs 24A and 24B use Link1. The lower MAC processing unit 38 and the physical processing unit 34 of the AP MLD 22 and the Non-AP (STA) MLDs 24A and 24B use Link2. The first physical processing unit 32 and the second physical processing unit 34 may have a configuration in which partial processing is shared.

When the multi-link communication is performed via three or more wireless links, physical processing units and lower MAC processing units corresponding to the number of links are provided in the AP MLD 22 and the Non-AP (STA) MLDs 24A and 24B.

In IEEE 802.11 wireless LAN standard, the medium access control (MAC) layer is specified as a place such as to process a first process of controlling access to a wireless medium, and a second process of passing data to and from an upper Logical Link Control (hereinafter, 130 referred to as LLC) layer and queuing data in response to power save operation. The lower-level MAC processing units 36 and 38 execute the first process. The upper MAC processing unit 40 executes the second process. Dividing the processes between the upper MAC processing unit 40 and the lower MAC processing units 36 and 38 is not limited to this example, and may be changed.

The upper MAC processing unit 40 receives data from the upper layer, and handles the data and accompanying information necessary to convert the data into a Data frame as a MAC Service Data Unit (hereinafter, referred to as an MSDU). The upper MAC processing unit 40 handles information necessary to generate a Management frame in response to an instruction from the management entity 44 as a MAC Management Protocol Data Unit (hereinafter, referred to as an MMPDU). The management entity corresponding to the MAC layer is an MAC Layer Management Entity (hereinafter, referred to as an MLME).

When the MSDU and the MMPDU are led from the upper MAC processing unit 40, the lower MAC processing units 36 and 38 generate MAC frames (MAC Protocol Data Units, referred to as MPDUs). The MAC frame includes a MAC header, a Frame Body, and a frame Check Sequence (hereinafter, referred to as an FCS).

The MAC header includes a field indicating a frame type. This field is subdivided into a Type field and a Subtype field.

As types of MAC frames when they are roughly classified, there are the Data frame, the Management frame, and a Control frame Identification information of these types is in the Type field, and more detailed identification information of these types is in the Subtype field.

In addition to these, the MAC header includes a field which includes a sequence number indicating a transmission order of the Data frames or the Management frames. The sequence number may be allocated by the upper MAC processing unit 40. For the Data frames, when the QoS function is supported, the allocation of the sequence numbers depends on a Traffic Identifier (hereinafter, referred to as a TID) and a transmission destination. Also for the Management frame, the allocation of the sequence number depends on the transmission destination. Therefore, a plurality of sequence number spaces for allocating the sequence numbers are provided. Generally, the sequence number space is a modulo 4096 counter.

The FCS includes a 32 bit cyclic redundancy code (CRC) for error detection.

As described later, in the multi-link communication, each of the lower MAC processing units 36 and 38 has a MAC address. Therefore, according to the conventional rule, the transmission destination has a resolution of the MAC address of a transmission destination link, and a sequence number space has to be provided for the individual transmission destination link. However, in order to flexibly switch a 11*nk* that transmits a frame, it is desirable to use the same sequence number for a frame among a plurality of links, i.e., to share a sequence number space among the links. Therefore, it is desirable to provide the sequence number space for each wireless communication device of the transmission destination in the multi-link communication. As a method of collectively handling a wireless communication device of the transmission destination having a plurality of wireless links, a MAC address (also referred to as an MLD MAC address) allocated to the upper MAC processing unit 40 in FIG. 2 is used. With this configuration, at the data transmission source, the upper layer passing data to the MAC layer only needs to know the MAC address of the upper MAC processing unit 40. The upper MAC processing unit 40 can distribute data to the lower MAC processing units 36 and 38 suitable for transmission. As another method, any one of the MAC addresses of a plurality of wireless links is used as a representative of the wireless communication device.

The lower MAC processing units 36 and 38 perform access control to a wireless medium such as Carrier Sense Multiple Access with Collision Avoidance (hereinafter, referred to as CSMA/CA), and then transmit a MAC frame to the wireless medium through the physical processing units (PHY1 and PHY2) 32 and 34. The MAC frame finally becomes a PHY packet (PHY Protocol Data Unit, referred to as a PPUD) in the physical processing units 32 and 34 and is transmitted to a wireless medium through an antenna not illustrated. The lower MAC processing units 36 and 38 have different MAC addresses. In generating the MAC frame, the lower MAC processing units 36 and 38 each sets a MAC address of the individual wireless link, i.e., its MAC address, in a transmission source MAC address (Transmitting Address, referred to as TA) field of the MAC header. To generating the MAC frame, the lower MAC processing units 36 and 38 each sets a MAC address of the wireless link at the opposite side in a transmission destination MAC address (Receiving Address, referred to RA) field of the MAC header. For a broadcast frame, the lower MAC processing units 36 and 38 each sets a broadcast address in the RA. For a multicast frame, the lower MAC processing, units 36 and 38 each sets a multicast address in the RA.

Control frames that are one type of MAC frames are desirably created by the lower MAC processing units 36 and 38, since they are frames deeply related to the operation in accessing the wireless medium. The above-described sequence number is not attached the Control frames.

The MAC frames such as the Beacon frame, a Probe Request frame, the Probe Response frame, an Authentication Frame, an Association Request frame, and an Association Response frame are Management frames.

The Beacon frame is periodically transmitted from the AP, and notifies an STA of operation information of the BSS, a modulation and coding scheme (hereinafter, referred to as MCS) to be used, and the like. At an AP MLD, the Beacon frame is transmitted from the APs affiliated with the AP MLD. When an AP affiliated with the AP MLD transmits the Beacon frame, information relating to the AP MLD is also included as described later. When a STA affiliated with the STA MLD receives the Beacon frame transmitted by an AP affiliated with the AP MLD, the STA shares information in the Beacon frame within the STA MLD.

The Probe Request frame is a frame used at a STA to request an AP to transmit information similar to the Beacon frame. At a STA MLD, the Probe Request frame can be transmitted from the STAs affiliated with the STA MLD. The reception destination target may be the AP affiliated with the AP MLD. The Probe Response frame is transmitted as a response to the STA by the AP that receives the Probe Request frame. At the AP MLD, the Probe Response frame is transmitted from the corresponding AP affiliated with the AP MLD. The reception destination target may be the STA affiliated with the STA MLD. The Probe Response frame notifies information similar Lo that of the Beacon frame. When the AP affiliated with the AP MLD transmits the Probe Response frame, information relating to the AP MLD is also included as described later. When the STA affiliated with the STA MLD receives the Probe Response frame transmitted flora the AP affiliated with the AP MLD, the STA shares information in the Probe Response frame within the STA MLD.

The Authentication frame, the Association Request frame, and the Association Response frame are used in a procedure in which the AP and the STA are connected to each other. After these frames are exchanged between one of the STAs affiliated with the STA MLD and an AP affiliated with the AP MLD that is on the same wireless link, this procedure can be applied to the entire connection of the AP MLD and the STA MLD, i.e., connection setup between a STA MLD and an AP MLD can be done through a single wireless link. The Authentication frame is used to authenticate a counterpart, and is transmitted from both the AP and the STA. The Association Request frame is transmitted from the STA to the AP and requests connection to the AP. When the Association Reques1 frame is transmitted from the STA affiliated with the STA MLD to the AP affiliated with the AP MLD, the allocation of a wireless link used between the STA MLD and the AP MLD is also requested in the Association Request frame. The Association response frame is transmitted from the AP to the STA, and notifies the STA of acceptance or rejection for the association request from the STA.

Although the Data frame is basically a frame that stores data supplied from the upper layer, in the wireless LAN in conformity with IEEE 802.11 standard, there is a Data frame that is not created from the MSDU and has no data, i.e., no Frame Body. In the wireless LAN in conformance with IEEE 802.11 standard, a specific example of the Data frame is a QoS Null frame. Such Data frame is used for the purpose of being closed within the MAC layer. Specifically, since the sequence number in the QoS Null frame may be set to any value, the upper NEC processing unit 40 may not be involved for generating the QoS Null frame and the QoS Null frame may be created by the lower NEC processing units 36 and 38.

The management entity 44 corresponds to a service management entity (hereinafter, referred to as an SME) in IEEE 802.11 standard. The management entity 44 is divided into the MLME for the MAC layer and a PHY layer management entity (hereinafter, referred to as a PLME) for the PHY layer. Although not strictly expressed in FIG. 2, the MLME communicates information with the upper MAC processing unit 40, and the SAME communicates information with the physical processing units 32 and 34.

The physical processing units 32 and 34 each passes the payload of a PHY packet received on each of the wireless links of the multi-link communication to the corresponding lower MAC processing units 36 and 38 together with such as the MCS information used in the reception decoding. The lower MAC processing units 36 and 38 each extracts a MAC frame from the payload. The physical processing units 32 and 34 also pass the reception level and the reception timing information of the signal, which fails to he decoded, to the corresponding lower MAC processing units 36 and 38. The lower MAC processing units 36 and 33 use these pieces of information to perform carrier sensing.

The lower MAC processing units 36 and 38 extract MAC frames. Upon determining that there is no error in the MAC frame by the FCS, the lower MAC processing units 36 and 38 each determines whether the MAC frame is addressed to its own terminal based on the RA field of the MAC header. When its MAC address of the wireless link is set in the PA field, the lower MAC processing units 36 and 38 each extracts the Frame Body from the MAC frame and determines whether it is necessary to transmit the response frame using the information of the MAC header. When it is necessary to transmit the response frame, the lower MAC processing units 36 and 38 each generates an appropriate response frame and transmits the response frame through the corresponding physical processing units 32 and 34. When the PA field is the broadcast address, the lower MAC processing units 36 and 38 each extracts the Frame Body from the MAC frame when the frame is from the same ESS. Whether the frame is from the same P33 is determined. using an address field describing a BSS Identifier (hereinafter, referred to as a BSSID), which is a MAC address of the AP. In the MAC frame transmitted from the AP, the TA expresses the BSSID. When the RA field is a multicast address, the lower MAC processing units 36 and 38 each extracts the Frame Body from the MAE frame when the frame is from the same BSS and the multicast address includes its MAC address of the wireless link. The broadcast address and the multicast address are collectively referred to as a group address. When the group address is handled at the MLD, the MAC address of the AP MLD may be used instead of the BSSID.

The response frame is a Control frame and includes an Ack frame and a Block Ack frame. Although the RA is always present in the Control frame, the TA may not be always present. In the case of the response frame, when the RA field is the MAC address of the wireless link, the lower MAC processing units 36 and 38 each further processes the response frame and extracts a Frame Body if it is present. When the PA field of the response frame is a broadcast address, or a multicast address and includes its MAC address of the wireless link, the lower MAC processing units 36 and 38 each further processes the response frame and extracts a Frame Body if it is present when the MAC address to be a reception target is set in the TA. The lower MAC processing units 36 and 38 each passes the Frame Body to the upper MAC processing unit 40 together with the sequence number extracted from the MAC header, the TA, the Traffic Identifier if it is a Qos Data frame, and a final address (Destination Address, referred to as a DA) of the data if it is present when the device is an AP MLD as described later.

The upper MAC processing unit 40 specifies the MAC address of the upper MAC processing unit 40 or the representative MAC address of the wireless communication device of the transmission source associated with the TA, and rearranges the frame bodies in the order of the sequence numbers for each individual Traffic Identifier. That is, the upper MAC processing unit 4*n* has a reordering buffer. In the case of a Data frame, when the final destination is its own wireless communication device, the upper MAC processing unit 40 passes the Frame Body to an upper layer. When the AP MLD 22 receives a Data frame and the DA is not its own wireless communication device, the AP MLD 22 performs transfer processing. As a method of deriving the MAC address of the upper MAC processing unit 40 or the representative MAC address of the wireless communication device of the data transmission source from the TA, there is a method of detecting, in advance, the MAC address of which wireless link is used under which address of the upper MAC processing unit 40 or the representative MAC address by negotiation between the wireless communication devices. There is also a method of notifying each other of these address relations in the process of establishing communication over any of the wireless links. It is possible to set, in advance, the regularity in allocating addresses among the MAC address of the upper MAC processing unit 40 or the representative MAC address and the MAC addresses of the wireless links and derive the MAC address of the upper MAC processing unit 40 or the representative MAC address from the regularity.

There is a method of providing a first link or a primary link and a second link or a secondary link. In relationship in which one wireless communication device among wireless communication devices performing the multi lank communication is the AP MLD on a wireless link and another wireless communication device is the STA MLD on the wireless link, one of the plurality of wireless links performing the multi-link communication is set as a first link or a primary link, and the remaining wireless links are set as second links or secondary links. The number of the second links or secondary links may be one. In the first embodiment, it is assumed that the AP MLD sets the primary link, Since the links relate to frequencies, the primary link can be also referred to as a first frequency or primary frequency, and the secondary links can be also referred to as second frequencies or secondary frequencies.

In this method, the STA MLD monitors the state of the wireless medium of the primary link and obtains the access right to the primary link when the primary link is available, and obtains the access right to the secondary link when the secondary link is also available at the same time, and performs transmission over the secondary link at the same time over the primary link.

When the AP MLD transmits a signal to the STA MLD, the AP MLD obtains the access right when the primary link is available similarly to the STA MLD, and transmits a signal to the STA MLD through the primary link. When the STA MLD performs communication over the primary link and the AP MLD performs transmission to the STA MLD over the secondary link at STA MLD, interference occurs between the primary link and the secondary link at the STA MLD.

Therefore, in this method, when the interference occurs among the links, the AP MLD is not permitted to perform transmission to the STA MLD over the secondary link at the STA MLD.

However, depending on wireless communication devices, there are cases in which the interference among the wireless links becomes a problem and the interference does not become a problem. When the interference among the wireless links does not become a problem, in performing the multi-link communication among wireless communication devices, transmission can be performed independently for the individual links. Therefore, it is not necessary to perform the multi-link communication based on the primary link, such as obtaining an access right by monitoring the states of the wireless mediums and performing transmission over the secondary link and transmission over the primary link at the same time when the secondary link is also available.

In the multi-link communication of the above scheme based on the primary link, transmission over the secondary link is not permitted when the secondary link is available but the primary link is not available. Therefore, the transmission opportunity or the wireless communication device is reduced.

Transmission of Data frames from the AP MLD to the STA MLD is limited tb a case where the transmission is performed only over the primary link when the primary link is available, or a case where the transmission is performed over the primary link and the secondary link when the secondary link is also available. However when the STA MLD does not perform transmission, it is technically possible to transmit Data frames to the STA MLD only over the secondary link.

However, in the above method, a method of transmitting Data frames only over the secondary link is not studied. This reduces transmission opportunities of the AP MLD.

In this method, when the STA MLD transmits Data frames only over the primary link, the AP MLD is not permitted to transmit Data frames to the STA MLD over the secondary link in consideration of the Interference among the links.

In actual communication, there are cases when the STA MLD on the reception side of Data frames transmits response frames. In such cases, transmission to the STA MLD should not be performed over the secondary link. However, no measures to this is studied.

Therefore, the embodiment is to perform transmission by the AS MLD without causing interference on wireless links wherein interference becomes a problem at the STA MLDs. The embodiment is to share the wireless links also with STA MLDs which have no interference among the wireless links. The embodiment is to prevent complicated control even when primary links are different depending on the STA MLDs.

<<Non-STR MLD and Non-STR Link>>

Depending on the implementation method for a wireless communication device that performs the multi-link communication, a restriction may occur among wireless links.

In order to actually emit a signal from the physical processing units 32 and 34 to the wireless medium through the antenna, an analog processing unit (not illustrated) has to be interposed. The analog processing unit converts the PHY packet, which is a digital signal, into an analog signal having a frequency corresponding to a wireless link, and transmits the analog signal from the antenna. At the time of reception, the analog processing unit converts an analog signal received by the antenna into a digital signal which is processed by the physical processing units 32 and 34. It is studied that an EF filter used by the analog processing unit is shared in the plurality of physical processing units 32 and 34. The RE filter passes only a signal in a specific frequency range. When the RP filter is shared by the plurality of physical processing units 32 and 34, the RF filter has a frequency range having a width covering frequencies of a plurality of wireless links of the plurality of physical processing units 32 and 34.

For example, when the analog processing unit of the wireless Link2 and the analog processing unit of Link3 in FIG. 1 share the RF filter, a transmission signal leaks into Link3 while a signal is transmitted over Link2, and interference occurs the reception of Link3. In such a case, even though the PHY packet including a frame in which the MAC address of Link3 is the RA (in other words, the frame is addressed to its own wireless communication device) received over Link3, there may be a case in which the PHY packet fails to be correctly received and decoded. For example, in the wireless LAM in conformance with IEEE 802.11, while the minimum reception sensitivities required by the MCSs are specified, even though the PHY packet is received with the reception power equal to or higher than the corresponding minimum reception sensitivity, the PHY packet may fail to be decoded. In addition to there is a case in which the PHY packet fails to be decoded even though the adjacent channel rejection level is satisfied. That is, this is a case where the reception decoding fails to be performed even though the required specifications relating to the reception of a normal PHY packet are satisfied.

Depending on an implementation method, a PHY packet using low multi-level modulation such as a binary phase shift keying (hereinafter, referred to as BPSK) can be decoded due to a restriction of the frequency range used at each of the wireless links with a digital filter in the physical processing units 32 and 34, a provision of a local oscillator (hereinafter, referred to as an LO) for each of the wireless links, or the like.

However, even under the same condition in which the reception power and the MCS permit a reception and decoding as long as there is no collision of wireless signals for an operation under a single link, when a transmission is performed over one of the two wireless links, there are at least some cases where a MAC frame addressed to its own wireless communication device fails to be received on the other wireless link. Two wireless links in which a transmission is performed over one link and a reception is not performed over the other link, i.e., the transmission and reception are not simultaneously performed are in relationship of non-simultaneous transmission and reception (hereinafter, referred to as non-ST) link.

Non-STR link relation can be referred to as two wireless links in which a reception of one link is restricted by a transmission of the other link, or the transmission and reception of the two links cannot be simultaneously performed.

Depending an the implementation method, in two wireless links in non-STR link relationship, there are cases where carrier sensing cannot be performed over one link while a transmission is performed over the other link.

When the RF filter of the analog processing unit of Link1 in FIG. 1 is separately provided from the RF filters of the analog processing units of Link2 and Link3, Link1 will not be affected from transmission and reception of Link2 and Link3, and thus transmission and reception of Link1 can be independently performed from transmission and reception of Link2 and Link3. In this case, it is possible to normally perform a reception and decoding of a PHY racket while satisfying the regular requirement specification relating to the reception of the PHY packet, and at is possible to perform standby operation which satisfies carrier sensing requirement. In the following description, two wireless links that can perform transmission and reception simultaneously are referred to as being in relationship of simultaneous transmission and reception (hereinafter, referred to as STR) links.

STR link relationship can be referred to as two wireless links in which a reception of one link is not restricted by a transmission of the other link, or the transmission and reception of the two links can be simultaneously performed.

When relationship between the two wireless links cannot achieve STR, the wireless links have non-STR relationship, whereas when the wireless links do not have non-STR relationship, they will have STR relationship. The relation between STR and non-STR is exclusive. It can also be said that whether the two wireless links are in STR link relationship or non-STR link relationship depends on a separation distance on frequencies of the two wireless links.

For example, in FIG. 1, when the frequencies of Link2 and Link3 are sufficiently separated, Link2 and Link3 may become STR link relation. A wireless communication device that possibly has a wireless link to be in non-STR link relationship depending on the manner of the combination of a wireless link is referred to as a non-STR MLD.

Although the non-STR MLD can communicate over one or more wireless links, the non-STR MLD can be an MLD that can transmit or receive no frame over the one wireless link while a frame is transmitted or received over the other link. The non-STR MLD can (1) only transmit or receive Data frames/Management frames to other MMDs over one wireless link at the same time, and (2) listen over, or standby on, one or more wireless links. The standby operation includes reception of an initial control message (for example, Request To Send (hereinafter, referred to as an RTS)/Multi-User RID (hereinafter, referred to as MU RTS)) and performance of Clear Channel Assessment (hereinafter, referred to as CCA). The reception of an initial control message may have one or more 1imions, such as on spatial streams, MCSs (data rates), PPDU types, and frame types. Link switch delay may be indicated by the non-AP MLD.

On the other hand, a wireless communication device that does not have a wireless links possibly in non-STR link relationship in any combination of wireless links and that can have any link in the STR link relation is referred to as an STR MLD.

As a result of selecting the wireless links, the wireless communication device may be referred to as an STR MLD when all the wireless links can be in STR link relationship with each other, and the wireless communication device may be referred to as a non-STR MLD when at least two wireless links are an non-STR link relationship. In the following specification, the definitions of an STR MLD and a non-STR MLD are the former definitions unless otherwise specified. In the present embodiment, a main point is that whether the two wireless are in STR relationship or non-STR link relationship rather than the wireless communication device is a non-STR MLD or an STR MLD.

In the present embodiment, the AP MLD is an STR MLD in which two wireless links are in STR link relationship regardless of any combination of the wireless links. On the other hand, the STA MLD may be a non-STR MLD or an STR MLD. The wireless communication device that is an STA MLD and is a non-STR MLD is referred to as a non-STR STA MLD. The wireless communication device that is an STA MLD and is an STA MLD is referred to as an STR STA MLD. Even when both non-STR STA MLDs and STR STA MLDs are induced in the wireless communication system, the AP MLD performs the multi-link communication with regard to both the non-STR STA MLDs and the STR STA MLDs.

<<Setting of the STA MED Primary Link by the AP MLD and Notification to the STA MLD>>

In transmitting a Beacon frame ever the wireless links, the AP MLD 22 also notifies information relating to the communication state of other links. For example, in the wireless LAN in conformity with. IEEE 802.11 standard, information relating to the communication state of other APs or AP MLDs can be notified using an information element called a Reduced Neighbor Report element. The present embodiment also uses this element to notify the primary link.

FIG. 3 illustrates an example of a format of the Beacon frame transmitted from the AP MLD 22. Strictly speaking, the Beacon frame here is a Beacon frame transmitted from the AP MLD 22 over one of the wireless links. When the Beacon frame is transmitted over Link1, the Beacon frame is transmitted from the RP having the MAC address of lower MAC processing unit 36. When the Beacon frame is transmitted over Link2, the Beacon frame is transmitted from the AP having the MAC address of the lower MAC processing unit 38. The Beacon frame includes the MAC header, the Frame Body (variable in units of octets), and the FCC (four octets).

The MAC header includes a Frame Control field (two octets), a Duration field (two octets), an Address 1 (first address) field (six octets), an Address 2 (second address) field (six octets), an Address 3 (third address) field (six octets), a Sequence Control field (two octets), and an HT Control field (zero or four octets).

The Frame Control field includes the Type subfield and the Subtype subfield. The AP MLD describes identification information of the Management frame in the Type subfield, and describes identification formation of the beacon in the Subtype subfield, and transmits the Beacon frame.

The Frame Body includes information unique to the frame type and the frame subtype. The Frame Body includes a large number of information elements.

FIG. 4 illustrates an example of a format of the Reduced Neighbor Report element, which is an example of an information element included in the Frame Body of the Beacon frame. The Reduced Neighbor Report element includes an Element ID field (one octet), a Length field (one octet), and a Neighbor AP Information field (variable length in units of octets).

The Neighbor AP Information field includes a Target Beacon Transmission Time (hereinafter, referred to as TBTT) Information Header subfield (two octets), an Operating Class subfield (one octet), a channel Number subfield (one octet), and a TBTT Information Set subfield (variable).

In the wireless LAN in conformity with IEEE 802.11 standard, the position of the center frequency on the frequency of the wireless link can be detected by a channel number. The channel numbers are allocated at 5 MHz intervals. The AP MLD indicates this value in the Channel Number subfield. The AP MLD indicates, in the Operating Class subfield, combined information on rule (output limits or the like) in a country or region and a channel width.

These two subfields permit the STA MLD to detect at which frequency location and with which channel width the AP ELI) is operating.

The TBTT Information Header field includes a TBTT Information Field Type subfield (two bits), a filtered Neighbor AP subfield (one bit), a Reserved subfield (one bit), a TBTT Information Count subfield (four bits), and a TBTT Information Length subfield (eight bits). The reserved field is a field that is not presently used and is left for future use.

The TBTT Information Set subfield includes one or more TBTT Information subfields.

Each TBTT Information subfield includes a Neighbor AP TBTT Offset subfield (one octet), a BSS Identifier (hereinafter, referred to as a BSSID) subfield (optional) (zero octets or six octets), a Short-SSID subfield (optional) (zero octets or 4 octets), and a BSS Parameters subfield (optional) (zero octets or one octet). The AP MLD indicates, in the BSSID subfield, the BSSID that is an identifier of the BSS. The AP MLD describes the SSID, which is a service set identifier of a wireless LAN system, in the Short-SSID subfield. The BSSID subfield and the Short-SSID subfield are not mandatory, and the Neighbor AP Information field may not include these subfields.

The BSS Parameters field includes an OCT Recommended subfield (one bit), a Same SSID subfield (one bit), a Multiple BSSID subfield (one bit), a Transmitted BSSID subfield (one bit), a Member Of ESS With 2.4/5 GHz Co-Located AP subfield (one bit), an Unsolicited Probe Response Active subfield (one bit), a Co-Located AP subfield (one bit), and a Reserved subfield (one bit).

Although the STA MLD can detect that the surrounding APs (including the same device) are operating using which channel width and at which frequency position by receiving a Beacon frame including the Reduced Neighbor Report element illustrated in FIG. 4, the STA MLD fails to detect which AP is involved in the multi-link operation under the same AP MLD as an AP that transmits the Beacon frame.

The Reduced Neighbor Report element can additionally include an information field. Therefore, the AP MLD according to the present embodiment can add information indicating whether an AP reported by the Reduced Neighbor Report element is used under the same AP MLD and information indicating whether the wireless link transmitting the Beacon frame is the primary link. The AP MLD can notify the STA MLD of these information.

The AP MLD may respectively assign link identifiers (hereinafter, referred to as Link IDs) to the wireless links, and describe the Link IDs in this information field.

FIG. 5 illustrates an example of a format of the Reduced Neighbor Report element to which the information field is added. Although not illustrated in FIG. 5, the TBTT Information Header field includes subfields similar to those in FIG. 4, and the TBTT Information Set field includes subfields similar to those in FIG. 4.

Similarly to FIG. 4, the Neighbor AP Information field includes the TBTT Information Header subfield, the operating Class subfield, the Channel Number subfield, and the TBTT Information Set subfield, and further includes an MLD subfield (one octet).

The MLD subfield is an information field that notifies STA MLDs of information for the multi-link communication. The MLD subfield is added when an AP reported by the Reduced Neighbor Report element is used under the same AP MLD. The MLD subfield includes a Primary Link subfield (one bit), a Link ID subfield (three bits), and a Reserved subfield (four bits).

The AP MLD describes, in the Primary Link subfield, information indicating whether the wireless link used by the AP reported by the Reduced Neighbor Report element is a primary link. The PP MLD describes the link identifier of the wireless link used by the reported AP in the Link ID subfield. When the wireless link itself used by the Beacon frame being transmitted the primary link, in order to notify the primary link, information relating to the AP itself transmitting the Beacon frame should be included in the Reduced Neighbor Report element.

For the size of the Primary Link subfield, one bit is sufficient. When the wireless link used. by the reported AP is the primary link, "1" is set in the Primary Link subfield, and when the wireless link is not the primary link, "0" is set in the Primary Link subfield. With the restriction of the maximum number of wireless links that can be supported by the AP MLD, the number of bits in the Link ID subfield can be restricted. For example, when the maximum number of wireless links is limited to eight and the link identifier is allocated from zero, the size of the Link ID subfield is three bits. When a case where the link identifier is zero is not used to give a special meaning (set to Reserved), the maximum number of links is seven in three bits. Assuming that the size of the MEG subfield is one octet as illustrated in FIG. 5, when the Primary Link field is one bit and the Link ID field is three bits, the remaining four bits can be left (reserved) for future use.

Next, second and third examples of notifying method for information for the multi-link communication will be described. In the first example, a new information field, such as the MLD field as illustrated in FIG. 5, is added to the Reduced Neighbor Report element. In the second and third examples, information for the multi-link communication is notified using the Reserved bit in the current Reduced Neighbor Report element with but adding a new information field.

As illustrated in FIG. 4, the TBTT Information Header field in the Reduced Neighbor Report element includes a Reserved bit (B3), FIG. 6 illustrates an example of a format of the Reduced Neighbor Report element in the second example of reporting information for the multi-link communication using the bit B3.

In the second example, the AP MLD describes, in the bit B3 of the TBTT information Header field, multi-link (hereinafter, referred to as ML) information that is capable of identifying the AP reported by the Reduced Neighbor Report element is performing multi-link operation under the same AR MLD. The AD MLD sets the ML bit to "1" when the AP is used under the seine AP MLD, and sets the ML bit to "0" when the AP is not performing multi-link operation under the same AP MLD.

When the ML bit of the Reduced Neighbor Report element is "1", the STA MLD that receives the Beacon frame including the ML bit sets the wireless link notified by the Reduced Neighbor Report element as a candidate for the wireless link to be used in the multi-link operation with the AP MLD that transmits the Beacon frame.

Figure 7:
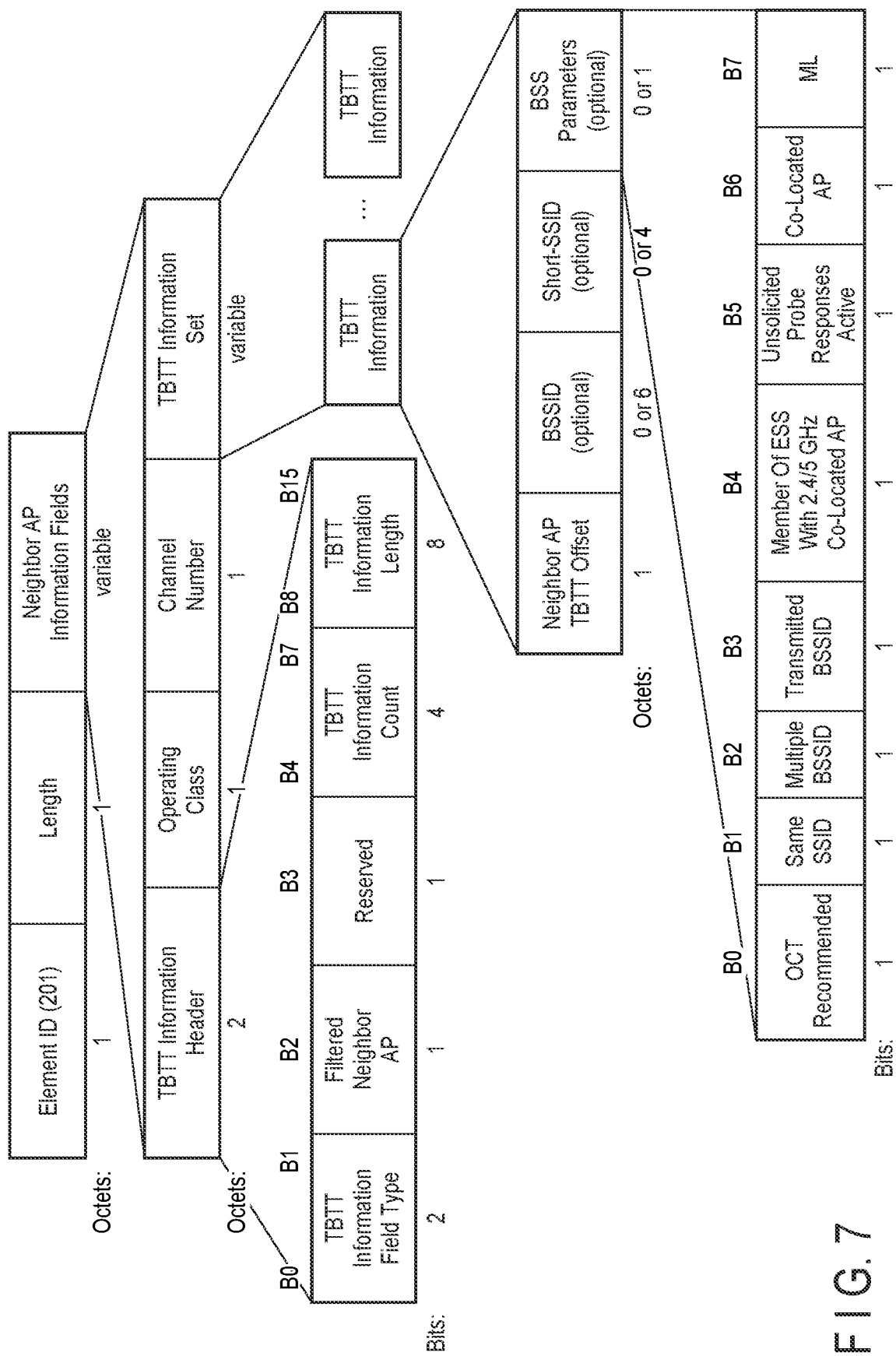
FIG. 7 illustrates a third example of a format of the Reduced Neighbor Report element reporting information of the multi-link communication.

As illustrated in FIG. 4, the BSS Parameters subfield in the TBTT Information field in the Reduced Neighbor Report element also includes a Reserved subfield (bit B7). FIG. 7 illustrates an example of a format of he Reduced Neighbor Report element in the third example of reporting information for the multi-link communication using the bit B7.

The AP MLD describes ML information similar to the second example in the bit B7 of the BPS Parameters field. A method of setting an ML subfield in FIG. 7 is similar to that of the ML subfield in FIG. 6. Alternatively, while using the ML subfield in FIG. 6, the last bit B7 of the BPS Parameters field may be used to indicate whether to be the primary link instead of FIG. 7. With this configuration, possible to notify which wireless link operates as the primary link together. The bit B7 is similar to the Primary Link subfield in FIG. 5.

As described above, in the examples of FIGS. 6 and 7, the AP MLD notifies the STA MLD of whether the AP reported by the Reduced Neighbor Report element is performing the multi-link operation under the same AP MLD using the ML bit. Also in the examples of FIGS. 6 and 7, it is possible to add a one-octet field similar to the MLD subfield of FIG. 5 to the end of the Reduced Neighbor Report element, and notify whether the AP MLD sets the wireless link that transmits the Beacon frame as the primary link using the field. Since presence of the MLD subfield in FIG. 5 notifies that the AP reported by the Reduced Neighbor Report element is used under the same AP MLD, the MLD subfield can replace the ML subfield in FIG. 6 or 7. On the other hand, when the MLD subfield is further added in the examples of FIGS. 6 and. 7, the ML field notifies whether the AP reported by the Reduced Neighbor Report element is used under the same AP MLD. The MLD subfield exists when the ML subfield is set to "1" and the AP reported by the Reduced Neighbor Report element performs the multi-link operation under the same AP MLD. As described above, the combination of the MLD subfield and the ML subfield serves as a multistage notification unit configured to additionally notify the primary link information and the link ID information.

Next, a fourth example in which the AP MLD notifies the STA MLD of information relating to a primary link will be described.

The TBTT information subfield in the Reduced Neighbor Report element is variable in size. The size of the TBTT Information subfield is determined by the value of the TBTT Information Length subfield. The size of the TBTT information subfield specified by the TBTT Information Length subfield determines the types of the subfields included in the TBTT Information subfield.

FIG. 8 is a table illustrating an example of a relationship between the value of the TBTT information Length subfield and types of subfields included in the TBTT Information subfield in the wireless LAN standard. For example, when the value of the TBTT Information Length subfield is 1, this indicates that the TBTT Information subfield includes only the Neighbor AP TBTT Offset subfield. When the value of the TBTT Information Length subfield is 2, this indicates that the TBTT Information subfield includes the Neighbor AP TBTT Offset subfield and the ESS Parameters subfield. When the value of the TBTT Information Length subfield is 5, this indicates that the TBTT Information subfield includes the Neighbor AP TBTT Offset subfield and the Short-SSTD subfield. In the following, similarly, when the value of the TBTT Information Length subfield is 12, this indicates that the TBTT Information subfield includes the Neighbor AP TBTT Offset subfield, the BSSID subfield, the Short-SSID subfield, and the BSS Parameters subfield.

The value of the TBTT Information Length subfield has reserved values that are presently unused. When the size of a new subfield included in the TBTT Information field is defined such that the value of the TBTT information Length subfield becomes any of these reserved values, the new subfield can added to the TBTT information field. The AP MLD may use this subfield to notify whether an AP reported by the Reduced Neighbor Report element is used under the same AP MLD and whether a wireless of the AP is the primary link.

The AP MLD may describe, in this subfield, information capable of identifying whether an AP is used under the same AP MLD and a link identifier in a multi-Link operation of a wireless link of the AP, and AP MLD may notify the link identifier of the wireless link set as the primary link using another information element or the like.

Figure 9:
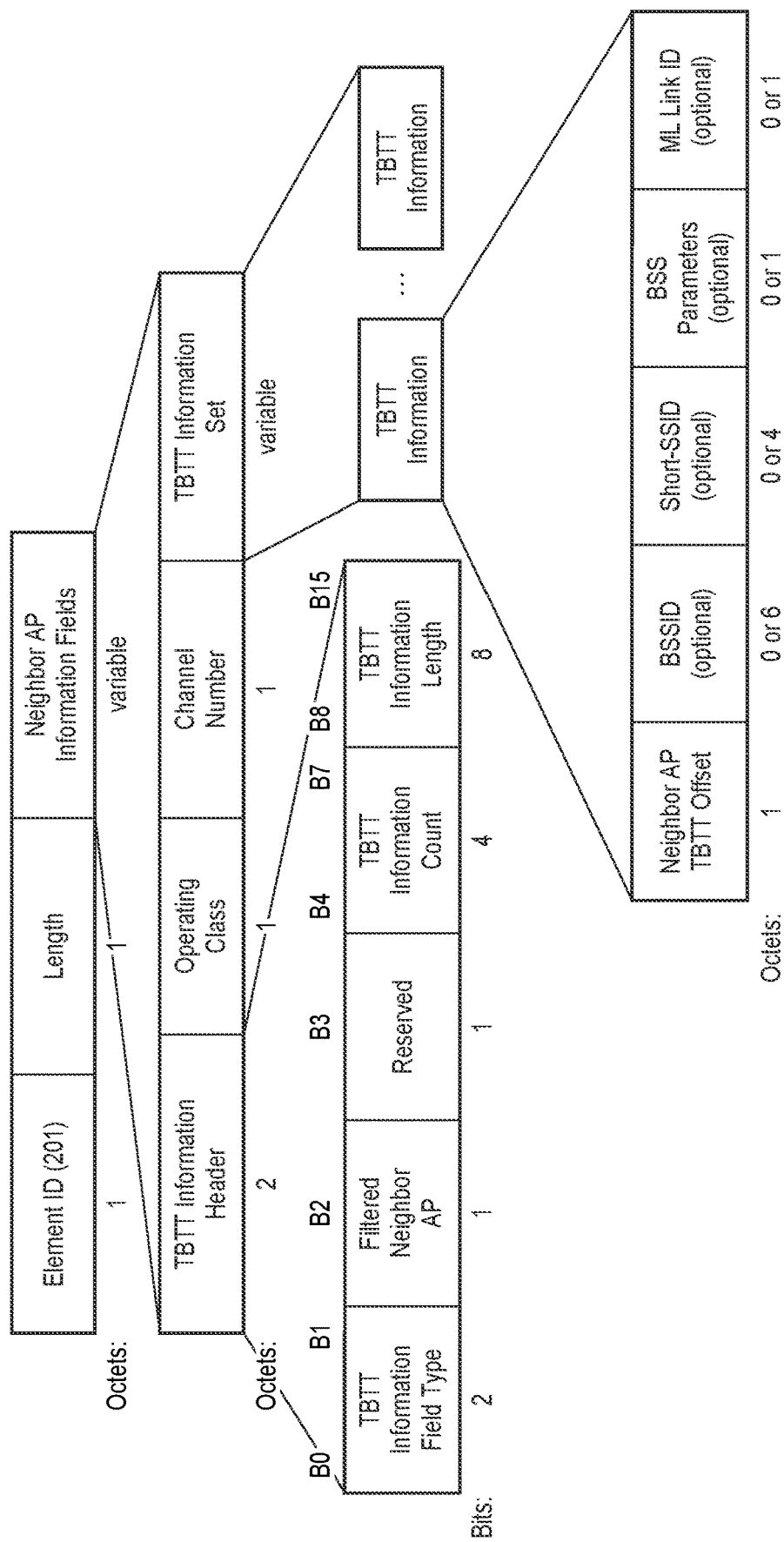
FIG. 9 illustrates a fourth example of a format of the Reduced Neighbor Report element reporting information of the multi-link communication.

This link identifier may correspond to X drawn as Link X in FIGS. 1 and 2, for example. FIG. 9 illustrates an example of a format of the Reduced Neighbor Report element in which the ML Link ID subfield (one octet) is newly defined after the BSS Parameters subfield in the TBTT Information field. The AP MLD describes the link identifier of a wireless link of the AP reported by the Reduced Neighbor Report element in the ML Link ID subfield.

When the ML Link ID subfield is included in the TBTT information field, the BSSID subfield, the Short-SSID subfield, and the BSS Parameters subfield are also necessarily included in the TBTT Information field. In this case, 13 may be set as the value of the TBTT Information Length subfield.

When there is provided a rule that the wireless links used in the multi-link communication always have the same SSID, the ML Link ID subfield is always included in the TBTT Information field together with the BSSID subfield and the ESS Parameters subfield. In this case, 9 may be set as the value of the TBTT Information Length subfield.

In an example of the wireless LAN standard, as illustrated in FIG. 8, the values of 13 and 9 of the TBTT Information Length subfield are unused. When the values of 13 and 9 are already used in the TBTT Information Length subfield for other purposes, the length of the ML Link ID subfield may be adjusted so as to be any of the reserved values.

Although the expression of the primary link is used here, the primary link may be referred to as an anchor link instead.

Similarly to the MLD subfield illustrated in FIG. 5, the AP MLD can notify the STA MLD of the wireless link set as the primary link using the ML Link ID subfield.

For example, the AP MLD sets three wireless links as illustrated in FIG. 1, and notifies that Link2 and Link3 are available in the multi-link communication and that Link2 is the primary link by the Beacon frame transmitted oven Link1.

The AP MLD notifies that Link1 and Link3 are available in the multi-link communication and that Link2 is the primary link by the Beacon frame transmitted over Link2. In this case, since Link2 is the wireless link itself that is transmitting the Beacon frame, when information of Link2 itself is not included in the Reduced Neighbor Report element, it is not possible to notify that Link2 is the primary link. In this case, the AP MLD may notify that L1nk2 is the primary link using another information element or the like. The AP MLD may further notify the identifier of the wireless link itself that is transmitting the Beacon frame.

The AP MLD notifies that Link1and Link2 are available in the mufti-link communication and that Link2 is the primary link by the Beacon frame transmitted over Link3.

In the above description, although these pieces of information are notified to the STA MLD using the information element in the Beacon frame, these pieces of information may be notified to the STA MLD using the information element in the Probe Response frame. The Probe Response frame is a type of Management frame in which the AP MLD transmits function information, supported data rates, and the like to the STA MLD in response to the Probe Request frame transmitted from the STA MLD to the AP MLD. It is possible to add information element relating to the MLD to the Probe Response frame with reference to the case of the Beacon frame.

Similar information may be notified using other Management frames, for example, an Action frame. Also in this case, it is possible to add information element relating to the MLD to the Action frame with reference to the case of the Beacon frame.

In addition to the information described above, information may be notified using the information element described above or a new information element. Since the MAC address (six octets) of the AP MLD is essential for sequence number processing in the STA MLD as described above, it is necessary to notify STA MLDs of the MAC address of the AP MCD by some information element carried in a frame such as the Beacon frame.

<<Notification of the Non-STR/STR Link from the STA MCD to the AP MCD>>

When the AP MLD notifies the STA MLD of the above information, the STA MLD can detect which one of the wireless links can be used for multi-link communication between the AP MLD as social as the STA MLD receives the above information from the AP MLD in any one of the wireless links before connecting to the AP MLD over any one of the wireless links. Before the STA MLD is connected to the AP MLD over any of the wireless links, the STA MLD can determine which pair of wireless links among the wireless links capable of performing multi-link communication with the AP MLD is in non-STR link relationship at the STA MLD (or which wireless links are the non-STR links), or all pairs of wireless links capable or performing multi-link communication with the AP MLD are in STR link relationship at the STA MLD (or all wireless links have STR link relationship with each other).

For example, similarly to the AP MLD, it is assumed that the STA MLD also desires to per the multi-link communication using Link1, Link2, and Link3. FIG. 10 illustrates an example of tree wireless links in which Link2 and Link3 are in non-STR link relationship, and Link1 is in STR link relationship with respect to Link2 and Link3.

In the state as illustrated in FIG. 10, in establishing communication with the AP MLD, the STA MLD notifies at least any one AP affiliated with the AP MLD of relationship of the non-STR links and relationship of the STR link among the wireless links desired to perform multi-link communication. In this case, the AP MLD may notify the 1*nk* identifier or not.

Since each BSSID i.e., the PAC address of each AP affiliated with the AP MLD, is in one-to-one correspondence with the wireless links, when no link identifier is notified by the AP MLD, the STA MLD may use the BSSID, or in other words, the MAC address of toe AP an the AP MLD, instead of the link identifier.

An example will be described in which the STA MLD notifies the AP MLD of non-STR link relationship among the wireless links and TR link relationship among the wireless links when the AP MLD notifies each link identifier. Here, the example shows the case when the STA MLD notifies the AP MLD of the link relationships over Link1.

The AP PLD has a MAC address of API on Link1, AP2 on Link2, and AP3 on Link3, and the STA MLD has a MAC address of STA1 on Link1, STA2 on Link2, and STA3 on Link3.

First, it is assumed that the STA MLD connects to the AP MLD at Link1. At this time, the STA having the MMD address STAR receives the Beacon frame and the like including the information elements illustrated in FIGS. 5 to 9 transmitted from the AP having the MAC address AP1, and thus detects that the AP MLD performs the multi-link communication on Link2 and Link3 in addition to Link1, and that Link2 is the primary link. The STA having the MAC address STAT also detects that the AP MLD uses the MAC address of AP2 on Link2 and AP STA uses the MAC address of AP3 on Link3. Then, the STA having the MAC address STA1 transmits an Association Request frame to the AP having the MAC address AP1 over Link1, and attempts connection to the AP having the MAC address AP1.

The Association Request frame is a type of Management frame transmitted from the STA MLD to the AP MLD, and includes the data rates supported by the STA MLD, the SSID of a network to which connection is desired, and the like.

The Association Request frame includes the MAC header, the Frame Body, and the FCS, similarly to the Beacon frame in FIG. 3. In the Type subfield of the Frame Control field included in the MAC header, the identification information of the Management frame is described, and in the Subtype subfield, the identification information of the Association Request frame is described.

The STA having the MAC address STA1 notifies the AP having the MAC address AP1 of other link information available at the STA MLD using the information element in the Frame Body of the Association Request frame. The STA having the MAC address STA1 may notify this information using, for example, an information element defined as a Multi-Link (ML) element. The STA having the MAC address STAI may perform notification by insertion an information element in another information element added as an extension standard of the wireless LAN, such as an Extremely High Throughput (hereinafter, referred to as EHT) Capabilities element.

Here, an example is taken and described in which notification is made using the ML element defined as one of the information elements in the Frame Body of the Association Request frame. However, the method of notification on the STA MLD side and the method of obtaining the information on the AP MLD side are basically unchanged even though the type of the information element is changed. Therefore, even though the EHT Capabilities element is used instead of the ML element, processing similar to the processing described below is executed.

In the transition of connection of the STA MLD from a certain AP MLD to another AP MLD, when the AP MLDs constitute the same Extended Service Set (hereinafter, referred to as an ESS), the STA MLD can use a Reassociation process with the migration destination AP MLD. The ESS is a plurality of interconnected BSSs that can be handled as a single BSS at the Logical Link Control (hereinafter, referred to as an LLC) layer in the Data Link layer of an OSI reference model.

With the Reassociation Request frame transmitted from the STA MLD to the AP MLD during the reassociation process, notification can be made similarly to the Association Request frame described above. The Reassociation Request frame is also a type of Management frame. The basic configuration of the Reassociation Request frame is the same as that of the Beacon frame illustrated in FIG. 3. The Reassociation Request frame is different from the Beacon frame in the Subtype field and the information element included in the Frame Body. The subtype of the Reassociation Request frame is a Reassociation Request.

The STA MLD notifies the AP MLD that Link2 and Link3 set by the AP MLD are available and whether each of Link2 and Link3 is in non-STR link relationship with respect to another link in the ML element in the Association Request frame transmitted from STA1. When the links are not in non-STR link relationship, the links are in STR link relationship. Therefore, whether the links are in non-STR link relationship can also be read as whether the links are in STR link relationship.

In the example of FIG. 10, the STA MLD notifies the AP MLD that Link2 is in STR link relationship with respect to Link1 and in non-STR link relationship with respect to Link3, and that Link3 in STR Link relationship with respect to Link1 and is in non-STR link relationship with respect to Link2.

Figure 18A:
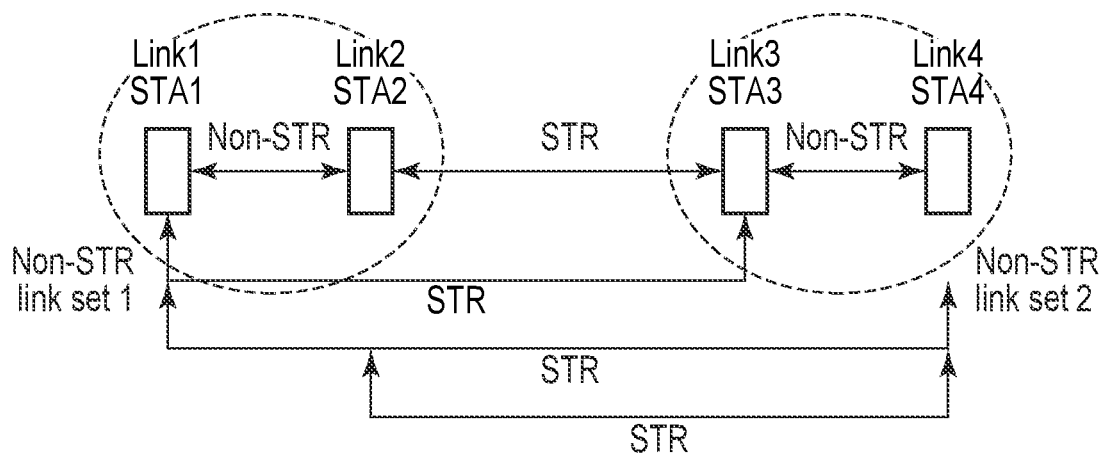
FIGS. 18A and 18B illustrate some examples of wireless links in non-STR link relationship and wireless links in STR link relationship.
Figure 18B:
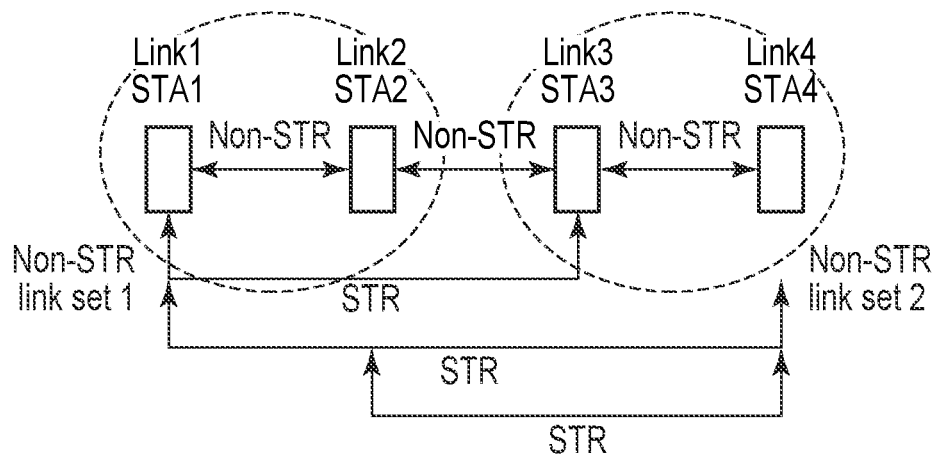

The STA MLD selects all or a subset of the plurality of wireless links not from the AP MLD, and notifies the AP MLD of the selected wireless link as a wireless link to be used in this selection, the STA MLD may select another wireless link to be a non-STR link pair with the wireless link designated as the primary link, but needs to avoid having a relationship as illustrated in FIG. 18B, described later. When it can be determined whether the links are in non-STR or STR link relationship by the difference in the frequency separation distance among the links, when the difference in the frequency separation distance among the links is within a threshold value, the STA MLD determines that the two links are in non-STR link relationship. When the STA MLD has an information management database which holds information on wireless link in STR relationship, the MAC processing layer may access this information management database to retrieve information to determine whether the two wireless links are in link relationship.

FIG. 11 illustrates an example of the format of the ML element included in the Frame Body of the Association Request frame. The STA MLD can notify the AP MLD of the information relating to non-STR link relationship and the information relating to STR link relationship using the ML element illustrated in FIG. 11.

The basic configuration of the Association Request frame is the same as that of the Beacon frame illustrated FIG. 3. The Association Request frame is different from the Beacon frame in the Subtype field and the information element included in the Frame Body. Although the subtype of the Beacon frame is a beacon, the subtype of the Association Request frame is an Association Request frame. The Frame Body of the Association Request frame can also include a number of information elements. FIG. 11 illustrates an example of the format of the ML element which is an example of the information element included in the Frame Body of the Association Request frame.

The ML element includes an Element ID field (one octet), a Length field (one octet), an Element ID Extension field (one octet), a STA MLD field (six octets), a Number Of Link Information Sets field (one octet), and a Link Information Set field (variable length in units of octets).

The ML element in FIG. 11 is different in that the Element ID Extension field is newly added to the Reduced Neighbor Report element in FIG. 4 after the Length field. This is because the number of Element IDs for identifying information elements in the wireless LAN standard in conformity with IEEE 802.11 standard reaches the upper limit of the number that can be expressed by one octet, and thus a new ML element fails to be defined only by the Element ID. Only when the Element ID takes the maximum value "255", the Element ID Extension field is added, and an additional value for identifying an information element is described therein.

The Element ID Extension field also has one octet. In the wireless LAN standard in conformity with the current IEEE 802.11 standard, the value of "0" is allocated to represent "reserved", and a value equal to or greater than "1" allocated to identify an information element, similarly to the Element ID. Here, a unique value for identifying the ML element is described in the Element ID Extension field.

In the ML element in FIG. 11, the STA MLD field is disposed after the Element ID Extension field. The STA MLD field notifies the MAC address for the STA MLD.

After the STA MLD field, the Number Of Link Information Sets field is disposed. The Number Of Link Information Sets field notifies the number of Link Information subfields constituting the Link Information Set field.

After the Number Of Link Information Sets field, a Link Information Set field is disposed. The Link Information Set field includes one or more Link information subfields (each consisting of three octets).

The Link information subfield includes a Link ID subfield (one octet), a Non SR Link1 subfield (one octet), and a Non-STR Link2 subfield (one octet). The Link ID subfield notifies link identifier of a link ether than the wireless link transmitting the ML element. The Non-STR Link1 subfield notifies the link identifier of another first wireless link in non-STR link relationship with respect to the wireless link whose link identifier is notified by the Link ID subfield. The Non-STR Link2 subfield notifies a link identifier of another second wireless link in non-STR link relationship with respect to the wireless link whose link identifier is notified by the Link ID subfield. Any wireless link other than the wireless links notified as having non-STR link relationship has STR link relationship with respect to the wireless link whose link identifier is notified by the Link ID subfield.

Assuming that states of the wireless links between the AP MLD are the states illustrated in FIG. 10, the STA MLD describes the link identifier of Link2 in the Link ID subfield of the first Link Information field when transmitting the ML element from STA1. Since the other first wireless link in non-STR MLD link relationship with respect to Link2 is tink3, the STA MLD describes the link identifier of Link3 in the Non-STR Link1 subfield. The link identifiers of Link2 and Link3 are, for example, "2" and "3", respectively. Since Link3 is the only wireless link in non-STR link relationship with respect to Link2, the STA MLD describes information indicating Not Available (hereinafter, referred to as N/A) in the non-STR Link2 subfield. The information indicating N/A is, for example, "0". If a number from 0 is allocated Lo the link identifiers of the wireless links, "255", which is the maximum value of this subfield, may be used to express N/A for example.

The STA MLD describes the link identifier of Link3 in the Link ID subfield of the second Link Information fled when transmitting the ML element from STA1. Since Link2 is the only wireless in non-STR link relationship with respect to Link3 the STA MLD describes the link identifier of Link2 in the Non-STR Link1 subfield and describes information indicating N/A in the nor-STR Link2 subfield.

Since the first Link information field has already not that the wireless links Link3 and Link2 are in non-STR link relationship, the STA MLD may omit the notification in the second Link Information field and describe information indicating N/A in the Non-STR Link1 subfield and the Non-STR Link2 subfield.

In this example, the STA MLD first notifies non-STR/STR link relationship at Link2, and glen notifies non-STR/STR link relationship at Link3 in ascending order of the link identifiers. However, since the Link Information field includes the Link ID subfield, the STA MLD does net necessarily perform notification of non-STR/STR link relationship in ascending order or descending order of the link identifiers. However, it is convenient to manage information of wireless links in an implementation manner when the notification is performed in ascending/descending order of the link identifiers.

FIG. 12 illustrates another example of the state of three wireless links. Here, Link2 is in non-STR link relationship with respect to Link3, and Link2 is also in non-STR link relationship with respect to Link1.

When states of wireless links are as illustrated in FIG. 12, the STA MLD describes the link identifier of Link2 in the Link ID subfield of the first Link Information subfield of the ML element illustrated in FIG. 11, describes the link identifier of Link1 in the Non-STR Link1 subfield, and describes the link identifier of Link3 in the Non-STR Link2 subfield, when transmitting the ML element from STA1.

The STA MLD transmits the Association Request frame in the MI element over Link1. In the above notification method, whether Link1 and another 1n are in non-STR link relationship is not explicitly, nor in other words, directly notified. However, when the STA MLD notifies the AP MLD whether another link is in non-STR link relationship with Link1, the AP MLD can naturally detect that Link1 and another link are in STR link relationship or non-STR link relationship based on the symmetry of the notification.

As another method of notifying that the two wireless links are in STR link relationship or non-STR link relationship, a field for notifying that the wireless link (Link1 in examples of FIGS. 10 and 12) transmitting the ML element is in STR link relationship or non-STR link relationship with respect to any other link May be provided. FIG. 13 illustrates an example of the format of the ML element to which such notification field is added. The Link Information field includes a plurality of pairs of a Link ID subfield (three bits) and an STR/Non-STR Flag subfield (one bit). When the Link Information field is limited to, for example, one octet, the Link Information field includes a maximum of two pairs of the Link ID subfield (three bits) and the STR/Non-STR Flag subfield one bit).

A method of notifying that the remaining fields do not include information when the Link Information field including only one pair of Line Link ID subfield (three bits) and the STR/Non-STR Flag subfield (one bit) is created will be described.

When a value to be allocated as a link Identifier of a wireless link is set to one or more and zero is reserved, when zero is set to the Link ID subfield, the AP MLD can determine that subsequent subfields including the subfield do not include information, and the AP MLD does not have to process the remaining subfields. The same applies to the case where the range allocated for link identifiers of wireless links is among zero to six and seven is reserved.

Alternatively, as illustrated in FIG. 14, instead of FIG. 13, the Link Information field may be limited to one octet, and only one pair of the Link ID subfield (three bits) and the STR/non-STR Flag subfield (one bit) is set to the Link information field. Although the Link ID subfield is sat to three bits here, it may be longer such that the identifier of the necessary wireless link can be completely expressed. The remaining area of one octet is reserved. Further, when the last lit B7 is set as a More subfield indicating whether there is a subsequent Link Information field, the Number Of Link Information Sets field (one octet) as illustrated in FIG. 13 becomes unnecessary, When 1 bit of the More subfield is provided in this manner, the reserved field has three bits as illustrated in FIG. 14.

The STA MLD describes link identifiers of wireless links (in the examples of FIGS. 10 and 12, Link2 and Link3) other than the wireless link (in this case, Link1) transmitting the ML element in the Link ID subfield. The STA MLD sets flag information in the STR/Non-STR Flag subfield. The flag information indicates whether the wireless link transmitting the ML element and the wireless link whose link identifier described in the Link ID subfield are in STR link relationship or non-STR link relationship. When Link1 and the wireless link whose link identifier described in the Link ID subfield are in STR link relationship, the STA MLD sets the flag information to "1". When Link1 and the wireless link whose link identifier described in the Link ID subfield are in non-STR link relationship, the STA MLD sets the flag information to "0". The STR/Non-STR Flag subfield may be an STR Flag subfield. Alternatively, when the wireless link whose link identifier described in the ID subfield is in non-STR link relationship with respect to Link1, the flag information may be set to "1". When the wireless link of the link identifier described in the Link ID subfield is in STR link relationship with respect to Link1, the flag information may be set to "0". In this case, instead of the STR/Non-STR Flag subfield, a Non-STR/STR Flag subfield or a Non-STR Flag subfield may be used as a name of the subfield.

When there is another link in non-STR link relationship with respect to Link1, the STA MLD may notify non-STR link relationship of the another link. In this case, it is necessary to clearly indicate the link identifier of the wireless link of a comparison source in non-STR link relationship. Therefore, for example, as illustrated in FIG. 15, instead of FIG. 13, the Link Information field includes the Link ID1 subfield (three bits), the link ID2 subfield (three bits), the STR/Non-STR Flag subfield (one bit), and the remaining 1 bit (Reserved), and the Link Information field may be one octet. The link identifier of the wireless link of the comparison source in non-STR link relationship is set to the Link ID1 subfield, and the link identifier of a wireless link to be compared in non-STR link relationship set to the Link ID2 subfield. It is determined that the wireless link to be compared is in STR/non-STR link relationship with respect to the wireless link of the comparison source. The manner of using the STR/Non-STR Flap subfield is similar that in FIG. 13, and. the STR/Non-STR Flag subfield indicates whether the wireless link described in the Link ID2 subfield is in STR link relationship or in non-STR link relationship with the wireless link described in the ID1 subfield.

Alternatively, as illustrated in FIG. 16, instead of FIG. 13, the Link Information field may be the Link ID subfield (three bits) and the STR/Non-STR Flag Bitmap subfield (five bits). The link identifier of the wireless link of the comparison source is set to the Link ID subfield, the link identifiers of the other links to be compared are omitted, and the bits of the STR/Non-STR Flag Bitmap subfield indicate whether the wireless link of the comparison source has STR link relationship or non-STR link relationship with the wireless links expressed in the order of the Link IDs. B3 of the STR/Non-STR Flag Bitmap subfield B3-37 expresses Lhink1, B4 expresses Link2, and B5 expresses Link3. For example, when Link1 is set to the Link ID subfield, if Link2 is in non-STR link relationship with respect to Link1 and Link3 is in STR link relationship with respect Lu Link1 as illustrated in FIG. 12, "0" indicating non-STR link relationship is set to B4, and "1" indicating STR link relationship is set to B5. When the wireless link to be compared is the wireless link of the comparison source, rules are provided such that "0" is set to the corresponding bit, and "0" is set to the bit allocated to the identifier of the wireless link that does not exist (in the above-described example, up to Link5 can be expressed by this bitmap, but up to Link3 is used). When the STR/Non-STR Flag Bitmap subfield is set to B3-B6 and B7 is left, up to Link4 can be expressed and B7 is allocated to the More subfield as described above, and the Number Of Link Information Sets field (one octet) as illustrated in FIG. 13 can be made unnecessary.

The AP MLD only has to detect wireless Links that the STA MLD can support and which pair of wireless links is in non-STR link relationship.

As described above, when the STA MLD side is to notify relationship among its wireless links to the AP MLD, the system will be more efficient by the AP MLD notifying the STA MLDs of the link identifiers through a Beacon/Probe Response frame beforehand than by the AP MLD not notifying the STA MLDs of the link identifiers through a Beacon/Probe Response frame. When the MAC address is set to a field to express a wireless link, six octets are required. However, when the AP MLD notifies the link identifier by the Beacon/Probe Response frame in advance, in notifying a relationship among the wireless links on the STA MLD side, the length of a field expressing a wireless link can be reduced to one octet or less. As a result, the information element used for notification from the STA MLD can be shortened and the frame length can be shortened.

On he other hand, when a wireless link is represented by a BSSID/MAC address, although a BSSID/MAC address is usually expressed by full six octets, a scheme may be studied, under a condition such as when multi-link communication is discussed, that the values to be expressed are omitted, such as the extraction of a partial region of one octet at the end, for example, in order to identify the AP with other APs affiliated with the same AP MLD.

In the above descriptions, it was assumed that the STA MLD can use all the wireless links that the AP MLD can use. However, the STA MLD may fail to always support all the wireless links that the AP MLD provides. In this case, the STA MLD notifies the AP MLD of information relating to its supportable wireless links using the ML element. For example, when the STA MLD fails to support Link3, the STA MLD does not insert the Link Information of Link3 to the ML element, and inserts only the Link Information of Link2 to the ML element transmitted in Link1. In this case, considering the state in which Link 3 is deleted from the situation of FIG. 10, there is no wireless link which is in non-STR link relationship with Link2. Therefore, according to the notification method in FIG. 11, the STA MLD describes information indicating N/A in both subfields of non-STR Link1 of Link2 and Non-STR Link2 of Link2.

Other than the case where the STA MLD does not support certain links, from implementation reasons like the restriction of the number of wireless links managed by the STA MLD to the minimum, or from QoS reasons, for example, like the avoidance of a Dynamic Frequency Selection (hereinafter, referred to as a DES) band for stream data transmission, the STA MLD may limit wireless links for use to a part of notified wireless links using some algorithms even though the STA MLD can support all the wireless links not by the AP MLD.

In such the case, the STA MLD only has to insert the link information of limited wireless links which are scheduled to actually exchange data into the ML element to notify the AP MLD.

<<Constraint on Non-STR Link Relationship>>

In the ML element in FIG. 11, two subfields subsequent to the Link ID subfield are the Non-STR Link1 subfield and the Non-STR Link2 subfield. This means that the number of wireless links in non-STR link relationship with respect to one wireless link is limited to two.

<<Role of Primary Link>>

Next, a relationship between non-STR wireless links and the primary link will be described.

The primary link is a link used to obtain an access right (to access a channel) among a plurality of wireless links in non-STR link relationship. Even when there is a plurality of pairs of wireless links in non-STR link relationship, one of the wireless links is the primary link, and the other links are the secondary links.

In this embodiment, the AP MLD determines the primary link. The STA MLD detects a plurality of available wireless links notified from the AP MLD to the STR MLD, detects the primary link determined by the AP MLD, determines the wireless links to be used by the STA MLD itself according to the detected results, notifies the AS MLD of the wireless links to be used, and performs multi-link communication with the AP MLD when connection to the AP MLD is permitted.

At that time, the STA MLD determines the wireless links to be used by the STA MLD itself in consideration of the notification information from the AP MLD and non-STR/STR link relationship between wireless links that are candidates to be used by the STA MLD itself, and notifies the AP MLD of the wireless links to be used and STR/non-STR link relationship between the wireless links.

The STA MLD determines a wireless link to be used by itself based on constraint conditions relating to wireless links in non-STR link relationship. One of the constraint conditions is to suppress the number of wireless links in non-STR link relationship with respect to a certain wireless link within an upper limit value. As described above, based on the configuration of the ML element in FIG. 11, the number of wireless links in non-STR link relationship with respect to a certain wireless link is limited to two. When the received ML element is configured as the ML element of FIG. 11, the STA MLD can determine that the number of wireless links in non-STR link relationship with respect to a certain wireless link is limited to two. This upper limit value may be explicitly notified in advance from the AP MLD by Beacon frames or the like, or may be defined in advance in the standard.

In order to transmit Data frames or Management frames by the STA MLD over multi-link communication, it is necessary to obtain access rights at least over the primary link. For example, when the STA MLD can obtain access over the primary link by CSMA/CA, the STA MLD transmits a frame only over the primary link, for example. In the state before setting up multi-link communication, such as when the STA MLD transmits an Association Request frame, channel access can be performed regardless of the primary link. However, in this case, the STA MLD transmits the Association Request frame only over one wireless link. In the foregoing example, the Association Request frame is transmitted in Link1.

When the STA MLD can obtain an access right over the secondary link at the same time as the primary link, or when the STA MLD can perform transmission over the secondary link according to an access right acquisition period (Transmission Opportunity, referred to as a TXOP) over the primary link by accepting some transmission start time difference, the STA MLD may also perform the transmission over the secondary link. In an independent wireless link that not in non-STR link relationship with any other wireless link, there is no restriction.

Here, the transmission of the STA MLD will be considered.

When the communication of the STA MLD is limited to the primary link, fairness with the STA MLD communicating over other links does not matter.

On the other hand, it is assumed that the STA MLD simultaneously communicates over the primary link and the secondary link when it is determined that the secondary link is also available while the primary link is available. In this case, when NAV (described later) and random back off which are means of channel access in CSMA/CA are applied in the secondary link, it is considered that there are few communication opportunities in the secondary link at the STA MLD.

On the other hand, when PIFS access (described later) is permitted secondary link as in the case of channel bonding, channel access at a STA MLD wherein any two wireless links are in STR link relationship is disadvantageous, and it is obviously unfair for Overlapping BSS (hereinafter, referred to as an OBSS) STAs.

In order to enable the AP MLD to detect the communication state in the STA MLD including other links in non-STR link relationship by only confirming the communication state over the primary link, the STA MLD releases the access right obtained over the secondary link immediately even though the access right can be obtained in the secondary link when the acquisition of the access right over the primary link fails, while permitting a slight time difference.

With this configuration, the AP MLD can detect whether the STA MLD is performing communication (that is, whether the AP MLD is a TXOP holder or a TXOP responder) by observing the communication state of only the primary link before transmitting a frame to the STA MLD. Therefore, transmission by the AP MLD becoming interference to the communication at the ST MLD can be avoided.

The TXOP holder is the side where the transmission access right is obtained, and the TXOP responder is a communication counterpart of the TXOP holder. A premise here s that a communication counterpart of the STA MLD is the AP MLD. In the infrastructure ESS configured by the AP, as a communication form of a STA, there is communication among STAs (direct link communication) in addition to this, but consideration regarding this will be given in another embodiment.

<<Examples of Relationship of non-STR/STR Links>>

FIGS. 17A to 17C, 18A, and 13B illustrate some examples of non-STR link pairs and STR link pairs.

Figure 17A:
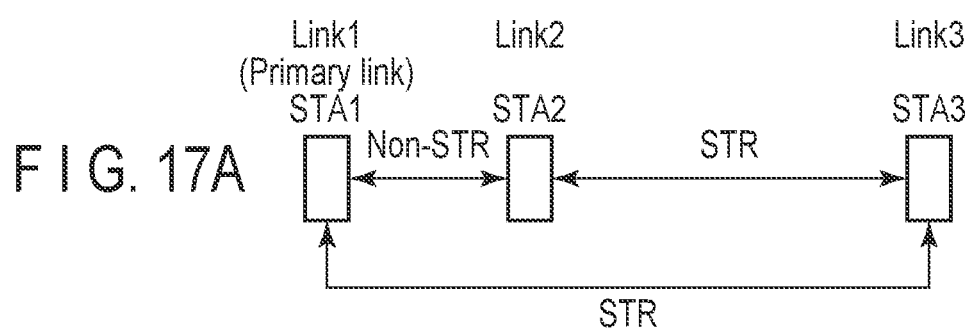
FIGS. 17A, 17B, and 17C illustrate some examples of wireless links in non-STR link relationship and wireless links in STR link relationship.

FIG. 17A illustrates the case where the primary link is Link1, and Link1 and Link2 are in non-STR link relationship, and Link3 is in STR link relationship with respect to Link1 and Link2 at a STA MLD, which are slightly different from the above-described wireless link relationship.

For example, an AP MLD sets one of two wireless links having a close separation distance between frequencies among wireless links to be used to the primary link. For example, when Link3 is sufficiently separated from Link1 and Link2, the AP MLD sets Link1 or Link2 to the primary link. In the example of FIG. 17A, the AP MLD sets, for example, a wireless link (Link1) at one end when three wireless links are arranged in order of frequency to the primary link.

Figure 17B:
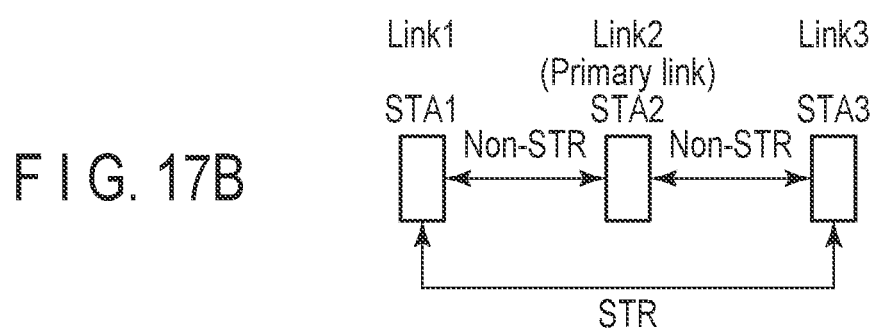

FIG. 17B illustrates the case where the separation distances among the frequencies of the three wireless links are relatively close. In this case, the AP MLD sets the central wireless link (Link2) when the three wireless links are arranged in order of frequency to the primary link. Since Link2 in the center is a link that may have the largest number of other wireless links in non-STR link relationship with itself (the number of other wireless links in on STR link relationship with Link2 here is two) Link2 is selected as the primary link.

In this case, at the STA MLD, and Link2 are in non-STR link relationship, and Link2 and Link3 are in non-STR link relationship. On the other hand, Link1 and Link3 have a long separation distance among frequencies, and are in STR link relationship.

Figure 17C:
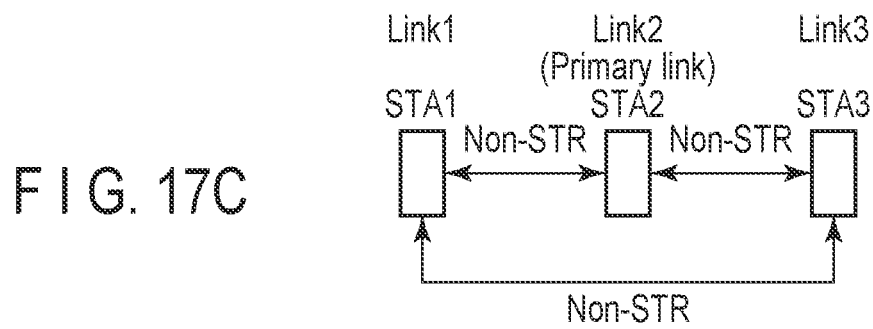

However, for a case with three wireless links, as illustrated in FIG. 17C, even when Link2 in the center are in non-STR link relationship with respect to Link1 and Link3 on the left and right, and Link1 and Link3 also are in non-STR link relationship, if the central link, Link2 in this drawing, is set to a primary link, the STA MLD can perform transmission based on the primary link.

The PP MLD can detect whether the STA MLD is a TXOP holder or a TXOP responder only by observing the communication state of the primary link.

In the examples of FIGS. 17A to 17C, the case is described in which there are three wireless links. However, the same applies to the case where there are four wireless links. For example, as illustrated in FIG. 18A, it is assumed that Link3 and Link2 are in non-STR link relationship, Link3 and Link4 are in non-STR link relationship, and all the other pairs of links are in STR link relationship. In such the case, since the non-STR link set #1 of Link1 and Link2 and the non-STR link set #2 of Link3 and Link4 can be handled independently, when one of the two links constituting each link set is set as the primary link, the AP MLD can detect whether the STA MLD is a TXOP holder or a TXOP responder on each link set only by observing the communication state of the corresponding primary link.

The number of links constituting the ink set does not have to be limited to two, and may be three or more. For example, each three wireless links as illustrated in FIGS. 17A, 17E, and 17C having non-STR link relationship can constitute an independent link set. The AP MLD may set any one of wireless links constituting an independent link set with three or more wireless links as the primary link. The AP MLD assumes in advance wireless links shut can constitute a wireless link set based on a separation distance among frequencies of the wireless links, and only has to set one primary link out of each of those wireless links assumed as a wireless link set.

On the other hand, in FIG. 18B, it is assumed that two wireless links (Link2 and Link3) which are in non-STR link relationship with respect to each other, are further respectively in non-STR link relationship with respect to different links, such as Link1 and Link4. For example, it is assumed that Link2 is set as the primary link, and a STA MLD intends to use all four wireless links (Link1 to Link4) with the AP MLD.

In this case, since Link4 is in STR link relationship with respect to Link2, Link4 can be originally independently used for transmission regardless of Link2 according to the primary link rule described above. However, since Link4 is in non-STR link relationship with respect to Link3 and Link3 is in non-TSR link relationship with respect to Link2, Link4 is affected by Link2 and Link3. Therefore, when the STA MLD tries to perform transmission over Link4, it is necessary to check the communication state of Link2 in addition to Link3. When the STA MLD does not check, an original simple confirmation operation cannot be achieved; the AP MLD sets the primary link, and by confirming the communication state of the STA MLD having non-STR link relationship with other wireless links only over the primary link, interference to communication at the STA MLD can be avoided.

When Link3 is set as the primary link, a similar problem occurs.

Therefore, in the case of FIG. 18B, there is no merit of setting the primary link. As illustrated in FIG. 18A, when link set 1 of the non-STR link pair and link set 2 of the hon-STR link pair are separated from each ocher in terms of frequency, one primary link can be set for each of link set 1 and link set 2, but a primary link cannot be set for each of link set 1 of the non-STR link pair and link set 2 of the non-STR link pair when any one of the wireless link within link set 1 and any one of the wireless link within link set 2 are in non-STR link relationship.

In order to simply solve this problem, the STA MLD may select a wireless link having a relationship as illustrated in FIGS. 17A and 17D. For example, the STA MLD does not use any of Link1, Link3, or Link4 when Link2 is Set as the primary link. In this manner, the STA MLD may select wireless links such that two links (Link2 and Link3 in FIG. 18B) in non-STR link relationship each is further not in non-STR link relationship with respect to other links different from each other. In the above example, the maximum number of other links which are in non-STA link relationship with respect to a certain wireless link is two.

There is another solution in which, when a certain wireless link (Link4 in FIG. 18B) in STR link relationship with respect the primary link (Link2 in FIG. 18B) is indirectly non-STR link relationship with respect to the primary link through another wireless link (Link2 in FIG. 18B), it is assumed that the certain wireless is in non-STR link relationship with respect to the primary link in the determination of access right acquisition. In this case, it is not necessary to exclude the case of FIG. 18B.

The purpose of setting the primary link is to ensure the presence or absence of communication of the STA MLD in another ink having non-STR link relationship with the primary link as long as the communication state of the primary link is observed with respect to the communication state of the STA MLD when the AS MLD tries to perform transmission over another link. Therefore, if this can be guaranteed, the condition of wireless links in non-STR link relationship may be relaxed.

For example, when the AP MLD can determine whether transmission to the STA MLD can be performed when the AP MLD observes only the communication state of the primary link, the condition that the number of wireless in non-STR link relationship with respect to a wireless link being two may be relaxed to three, for example. In this case, in the element transmitted to an AP MLD by a STA MLD illustrated in FIG. 11, the number of subfield notifying non-TR link relationship is increased from two to three. That is, the non-STR Link3 subfield is added after the non-STS Link2 subfield illustrated in FIG. 11.

<<Wireless Link Selection by the STA MLD>>

The STA MLD understanding the primary link set by the AP MLD may select operable wireless links in non-STR link relationship with respect to the primary link, and notify the AP MLD of the selection result using the ML element. The STA MLD understanding the primary link set by the AP MLD may select wireless links in STR link relationship with respect to the primary link, and notify the AP MLD of the selection result using the ML element.

<<Modification of Notification of non-STR/STR Link Relationship at the STA MLD>>

In the ML element of FIG. 11, the number of non-STR Link subfields notifying non-STR link relationship with a wireless link fixed to two. However, modifications of notification will be described when the notification of the information of a link in non-STR lank relationship is omitted because the information is already notified over another link and when no wireless link in non-STR link relationship with respect to another link is present and N/A is described in the non-STR Link subfield, as described above.

Figure 19:
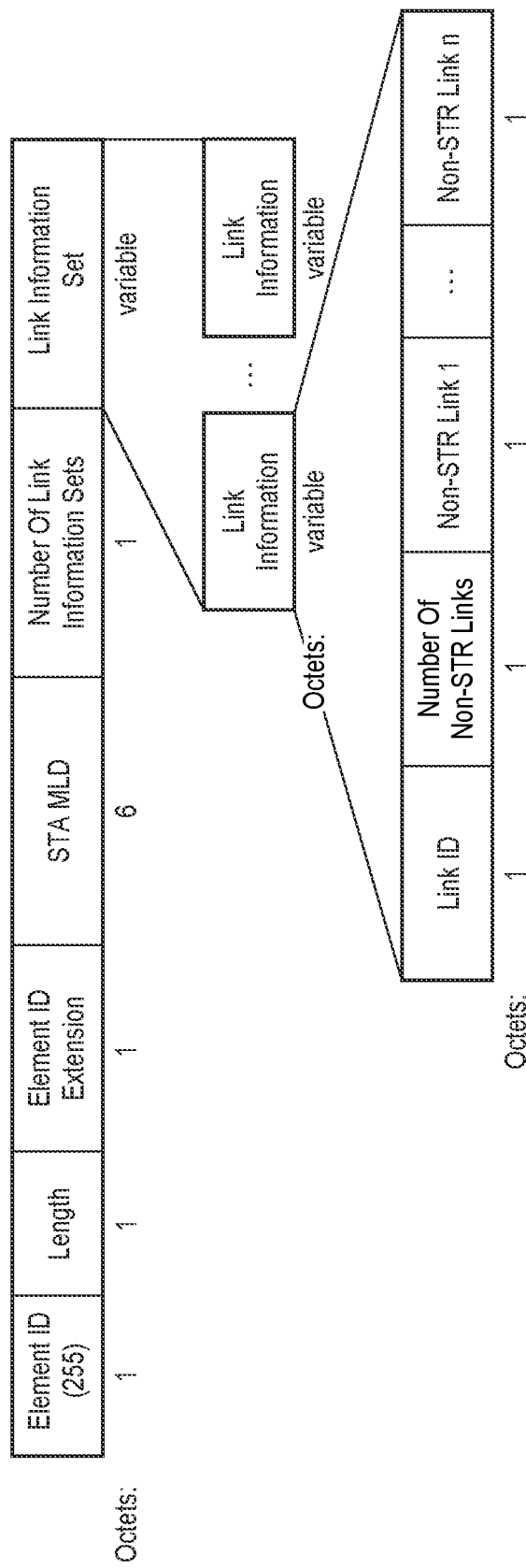
FIG. 19 illustrates a further example of a format of the ML element.

FIG. 19 illustrates a format of an ML element according to a first modification.

The Link information subfield includes a Link ID subfield (one octet), a Number Of Non-STR Links subfield (one octet), and one or more Non-STR Link subfields (variable length in unit of octets as an aggregate) (In FIG. 19, expressed as Non-STR Link1, . . . , Non-STR Link n, each consisting of one octet).

The Number Of Non-STR Links subfield notifies the number of links in non-STR link relationship with the link described in the Link ID subfield. The number of Non-STR Link subfields is the value of the Number Of Non-STR Links subfield.

With this configuration, when the number of wireless links in non-STR link relationship increases to three, for example, depending on situation, the STA MLD sets three in the Number Of Non-STR Links subfield, and arranges three Non-STR Link subfields after the Number Of Non-STR Links subfield, such that flexibility can be accommodated. When to number of links in non-STR link relationship is 0, the STA MLD describes 0 in the Number Of Non-TR Links subfield and does not arrange any Non-STR Link subfield.

A second modification of the efficiency improvement will be described. It is assumed that the STA MLD uses Link1, Link2, and Link3 similarly to the AP MLD, and none of the links are in non-STR link relationship, i.e., all of the links are in STR link relationship with each other. In this case, the STA MLD can omit the Number Of Non-STR Links subfield and the Non-STR Link subfield by, for example, setting a special value in a certain subfield, for example, the Link ID subfield of the Link Information field in FIG. 19.

A third modification will be described. When the number of wireless links used in multi-link communication is limited, all 1-octet bits are not required as the Number Of Link Information Sets subfield of the ML element illustrated in FIGS. 11 and 19, and some of the bits can be used for other purposes.

For example, when the number of wireless links is limited to eight, only three bits of the Number Of Link Information Sets subfield are allocated to represent the number of wireless links, and the number of sets of wireless links is defined to be 1 plus the value of the Number Of Link Information Sets subfield, three bits are sufficient for the Number Of Link Information Sets subfield length, and the remaining five bits can be used for other purposes. For example, when the value of the Number Of Link Information Sets subfield is zero, the number of sets of wireless links is 1. When this value is one, the number of sets of wireless links is two. When this value is seven (the maximum value that can be expressed by three bits), the number of sets of wireless links is eight. Therefore, for example, one bit thereof may be used as information for identifying the case where all the wireless links to be used are in STR link relationship with each other. In that case, the Non-STR Link subfield can be omitted. By doing so, the notification field length of the ML element can be shortened and efficiency can be improved.

<<AP MLD Detects Wireless Links of the STA MLD in Non-STR Link Relationship>>

The processing of an AP MLD that receives an Association Request frame including the ML element as described above is basically similar to the association process in wireless LAN based on IEEE 802.11 standard.

In the AP MLD, an AP having a MAC address AP1 passes information of a Frame Body of an Association Request frame and a MAC address STA1 of a STA to the upper MAC processing unit 40. The upper MAC processing unit 40 passes the received information to the MLME. The MLMF notifies the upper MAC processing unit 40 of an instruction for generating an Association Response frame. The upper MAC processing unit 40 prepares information of the Frame Body of the Association Response frame and information of STA1 as a transmission destination MAC address, and passes them to the AP having the MAC address AP1. The AP having the MAC address AP1 transmits the Association Response frame via the first physical processing unit 32.

When the AP MLD receives the Association Request frame from the STA having the MAC address STA1 and accepts the request as is, MLME sets the Status Code field in the Association Response frame including the ML element to "SUCCESS". When the AP Mt rejects the Association Request frame from the STA having the MAC address STA1, the MLME sets the Status Code field to "REFUSED" or information indicating a reason for rejection.

Note that a reason for rejection regarding the communication may be newly defined. The same applies to transmission of a Reassociation Response frame in a reassociation process.

The AP MLD also acquires the MAC address of the STA MLD by receiving the Association Request frame including the ML element. The ML element in FIG. 11 directly notifies the MAC address of the STA MLD, but the direct notification may be omitted.

For example, when the AP MLD can obtain the MAC address of the STA MLD from information having some kind of rule with respect to a MAC address of a wireless link, and, for example, by acquiring the MAC address of STA1, or by combining the MAC address of STA1 or the like and additional information, direct notification of the MAC address can be omitted.

The AP MLD stores the obtained MAC address of the STA MLD in a memory commonly accessible as the AP MLD, which may be prepared such as in the upper MAC processing unit 40 or in the MLME.

The AP MLD also stores information of a wireless link used at the STA MLD in non-STR link relationship with respect to the primary link, which is obtained by the ML element.

When the AP MLD sets Link2 as the primary link, and the STA MLD notifies the AP MLD that Link3 is in non-STR link relationship with respect to Link2 (primary link) as illustrated in FIG. 10, the AP MLD at least stores such information and enables the following operation.

<<Transmission of the AP MLD in Consideration of Communication State of the STA MLD>>

Figure 20:
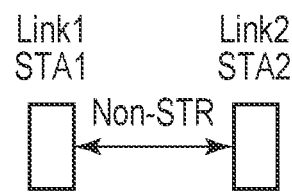
FIG. 20 illustrates an example of two wireless links in non-STR link relationship.

An operation in which the AP MLD performs downlink (referred to as DL) transmission to the STA MLD will be described with reference to FIGS. 20 and 21. Here, it is assumed that the AP MLD notifies the STA MLD that Link1 is the primary link, and the STA MLD notifies the AP MLD that Link2 and Link1 are in non-STR link relationship.

In addition to the above-described STA MLD, it is assumed that the AP MLD also accommodates a plurality of other STA MLDs in which Link1 and Link2 are in STR link relationship. Here, for convenience, the STA MLD in which Link1 and Link2 are in non-STR link relationship is referred to as non-STR MLD1, and a plurality of other STA MLDs in which Link1 and Link2 are in STR link relationship are referred to as STR MLDs. The STR MLDs may include the AP MLD.

The MAC address in Link1 of non-STR MLD1 is STA1, the MAC address in Link2 of non-STR MLD1 is STA2, the MAC address in Link1 of the AP MLD is AP1, and the MAC address in Link2 of the AP MLD is AP2.

It is assumed that the AP MLD has data to be transmitted to non-STR MLD1. For example, as illustrated in FIG. 21, at first, it is assumed that the STR MLDs have obtained the TXOP at Link1 ("TXOP between STR MLDs" in FIG. 21), and Link2 is not used (idle).

The AP MLD determines whether non-STR MLD1 is not communicating over Link1 (whether non-STR MLD1 is not a TXOP holder/responder). After confirming that non-STR MLD1 is not communicating over Link1, the AP MLD performs DL transmission including a frame addressed to non-STR MLD1 ("DL including non-STR MLD1" in FIG. 21) over Link2. The frame is, for example, a Data frame, an RTS frame, or the like. The RTS frame is a type of Control frame.

When non-STR MLD1 is communicating over Link1, the AP MLD does not perform DL transmission including a frame addressed to non-STR MLD1 over Link2 until non-STR MLD1 stops communicating over Link1.

Although DL transmission including a frame addressed to non-STR MLD1 is described, DL transmission may be performed only for the frame addressed to non-STR MLD1, or may be performed for DL multi-user (referred to as MU) transmission including frames also addressed to other STA MLDs.

In DL transmission over Link2, the RA of the frame addressed to non-STR MLD1 is STA2. In the DL MU, in the PHY packet, an association identifier (referred to as AID) allocated to STA2 or non-STR MLD1 is notified using a PHY header. The PHY header is configured to identify a stream, a resource unit (referred to as RU), or a stream and an RU in the stream to be received and decoded by each STA. A MAC address of each STA MLD is specified in the RA in the received and decoded Data frame.

When DL transmission includes a frame addressed to another STA MLD, and Link2 and Link1 are in non-STR link relationship also in the another STA MLD, similarly to non-STR MLD1, a condition that the another STA MLD is not communicating over Link1 is a condition that performs DL transmission over Link2. This condition is unnecessary when Link2 and Link1 are in STR link relationship in the another STA MLD.

As described above, until immediately before the AP MLD starts DL transmission ("DL including non-STR MLD1" in FIG. 21) including non-STR MLD1 over Link2, the AP MLD determines whether non-STR MLD1 is communicating over Link1. When it is determined that non-STR MLD1 is communicating over Link1, no interference occurs when DL transmission can be postponed.

However, a time difference may occur in controlling Link1 and Link2 at the AP MLD due to means of implementation. In this case, for example, when non-STR MLD1 is not communicating over Link1 for a priority interframe space (hereinafter, referred to as PIFS) prior to the start of DL transmission including non-STR MLD1 over Link2, DL transmission may be performed.

With this configuration, the occurrence of interference when non-STR MLD1 communicates within a PIFS fails to be avoided, but interference can be minimized. The PIFS is an interframe space that can be used only under some limited conditions in a wireless LAN in conformity with IEEE 802.11 standard. The PIFS is defined by short interframe space (hereinafter, referred to as STFS) plus a Slot time. The STFS is a minimum frame interval used when a response frame such as to the received Data frame is transmitted, and there is no need to detect the carrier sense state. The Slot time is a minimum time unit that performs back off, and carrier sense is required. In a typical case of 2.4 GHz band, an SIFS is 10 us, the Slot time is 20 us, and a PIFS is 30 us.

In a typical case of 5 GHz band, an SIPS Lime is 16 us, the Slot time is 9 us, and a PIFS is 25 us.

When the direct link communication is not performed in the BSS. The determination that non-STR MLD1 is not communicating over Link1 (not a TXOP holder/responder Link1) can be made by determining, by the AP MLD, whether the MAC address in Link1 of non-STR MLD1, i.e., STA1 is not included in the RA of the frame transmitted from the AP MLD, or whether the MAC address in Link1 of non-STR MLD1, i.e., STA1 is not included in the TA of the frame addressed to the AP MLD, when TA is present. This is because the communication counterpart in Link1 for the non-STR MLDs is always the AP MLD.

Basically, direct communication is an optional function, and considering that it is infrequently used, it can be said that the above determination criterion is sufficient as to whether to perform DL transmission.

In addition, by detecting the application in use by the connected STA MLD, the possibility at using direct link communication may be determined, and the criterion for determining whether to perform DL transmission may be changed based on the determination. For example, when it is determined that direct link communication is used, the AP MLD determines whether TAs of frames also not transmit Led to the AP MLD do not include the MAE address in Link1 of non-STR MLD1.

When the AP MLD determines that non-STR MLD1 communicates over Link1 based on the addresses of a frame, the AP MLD detects the end of the TXOP using a network allocation vector (hereinafter, referred to as NAV) set in a Duration field in the MAC header of the frame, and does not perform transmission to non-STR MLD1 over the wireless link in non-STR link relationship with respect to Link1 here, Link2 until the end of the TXOP in Link1.

An example of a typical frame that the AP MLD performs DL transmission to non-STR MLD1 is a Data frame. FIG. 22 illustrates an example of a basic, configuration of the Data frame. The Data frame includes a MAC header, a Frame Body (variable length in octets), and an FCS (four octets), similarly to the Beacon frame illustrated in FIG. 3.

The MAC header includes a Frame Control field (two octets), a Duration field (two octets), an Address 1 (first address) field (six octets), an Address 2 (second address) field (six octets), an Address 3 (third address) field (six octets), a Sequence Control field (two octets), an address 4 (fourth address) field (zero or six octets), a QoS Control field (zero or two octets), and an HT Control field (zero or four octets).

The Frame Control field includes a Type subfield and a Subtype subfield. At the AP MLD transmitting a Data frame, the Type subfield is identification information of the Data frame, and the SubType subfield is, for example, QoS Data.

The Frame Body contains data received from the runner layer.

Figure 23:
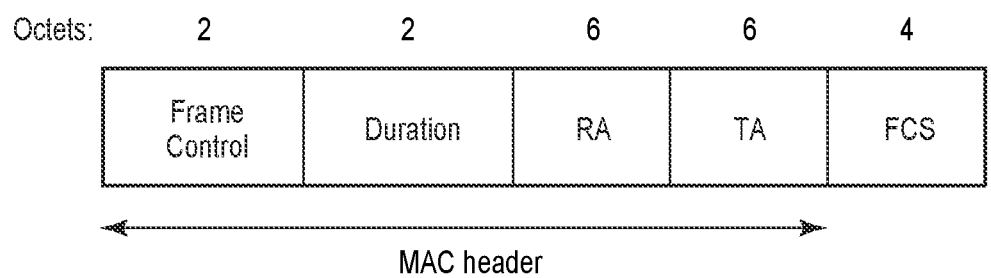
FIG. 23 illustrate an example of a format of an RTS frame.

Another example of a typical frame that the AP MLD performs DL transmission to non-STR MLD1 is an RTS frame. FIG. 23 illustrates an example of a basic configuration of the RTS frame. The RTS frame includes a MAC header and an FCS (four octets).

The MAC header includes a Frame Control field (two octets), a Duration field (two octets), an RA field (six octets), and a TA field (six octets). The RA field is an address of a reception destination STA of the Data frame, the Management frame, or the Control frame of an independent destination scheduled to be transmitted after this RTS frame is transmitted. The TA field describes an address of the STA that transmits the RTS frame.

The Frame Control field includes a Type subfield and a Subtype subfield. The AP MLD set the Type subfield as the identification information of the Control frame and the SubType subfield as the identifier of the RTC frame.

As described above, when the AP MLD determines that non-STR MLD1 is not communicating over Link1 and performs DL transmission to non-STR MLD1 over Link2, non-STR MLD1 only has to be able to perform reception and decoding over Link2. Therefore, even though the interference of Link2 leaks into Link1 at non-STR MLD1, the interference at Link1 does not affect the operation of non-STR MLD1.

Figure 21:
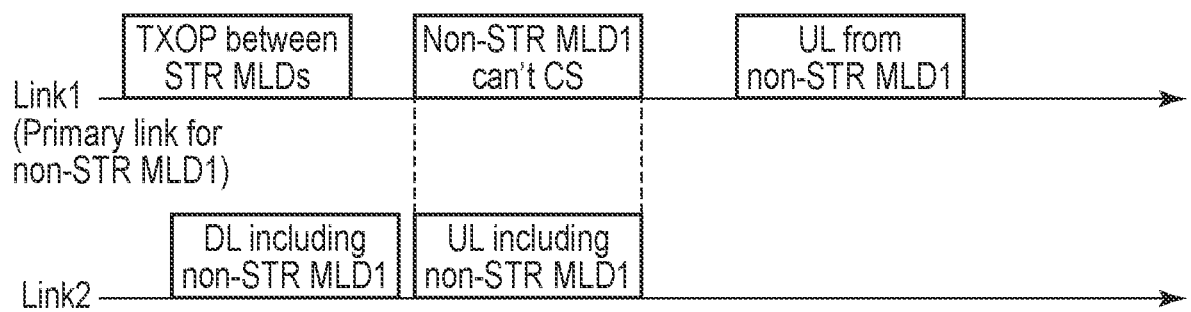
FIG. 21 illustrates an example of a frame transmission from an AP MLD to a STA MLD.

As illustrated in FIG. 21, when the TXOP ("TXOP between STR MLDs" in FIG. 21) by the STR MLDs ends but DL transmission including the Data frame addressed to non-STR MLD1 continues over Link2 ("DL including non-STR MLD1" in FIG. 21), it is considered that an interference component of DL transmission leaks into Link1, and CCA becomes busy at Link1 of non-STR MLD1. However, in non-STR MLD1, since it is not necessary to perform reception and decoding over Link1, there is no influence.

In this case, there is a possibility that an operation in which non-STR MLD1 obtains the access right at Link1 is hindered. A countermeasure in that case will be described later.

When non-STR MLD1 is not communicating over Link1 and Link1 is available for communication, the AP MLD may perform DL transmission including a frame addressed to non-STR MLD1 also over Link1. DL transmission frame is not limited to a Data frame, and may be an RTS frame addressed to non-STR MLD1 or an MU RTS frame (a kind of Trigger frame) including non-STR MLD1 as destinations. In this case, the AP MLD may adjust such that the TXOP in Link1 ends simultaneously with the end of the TXOP in Link2 or after the end of the TXOP in Link2. As an example of the adjustment, the AP MLD may include padding bits in DL transmission frame over Link2.

FIG. 24 illustrates an example of a format of an A-MPDU created by frame aggregation. The A-MPDU includes a sequence of n (n is one or more) A-MPDU subframes and one EOF Padding field of a variable length in units of octets.

Each A-MPDU subframe includes an MPDU delimiter (4 octets), and an MPDU (variable length in octets) follows the MPDU delimiter. The A-MPDU subframe other than the end of the A-MPDU includes a Padding subfield (0-3 octets) for making the length of the A-MPDU subframe to be 4n octets.

The EOF Padding includes an EOF Padding subframe (4n octets) and an EOF Padding Octets subfield (0-3 octets).

The AP MLD may adjust the length of the frame using the fields for this padding purpose in the A-MPDU.

In consideration of the timing at which non-STR MLD1 transmits the response frames over Link1 and Link2, the AP MLD may align the transmission end times of DL transmission Data frames between Link1 and Link2, and may also align the lengths of the response frames from non-STR MLD1. With the configuration, DL transmission Data frames and UL transmission response frames c:an he synchronized between Link1 and Link2.

<<DL Transmission of Trigger Frame from AP MLD>>

In the description or FIG. 21, the AP MLD performs DL transmission of a frame including non-STR MLD1 as destinations over Link2 ("DL including non-STR MLD1" in FIG. 21). This assumes DL single-user (DL SU) transmission or DL multi-user (DL MU) transmission. However, the AP MLD may transmit a Trigger frame that permits UL transmission to only non-STR MLD or a plurality of STA MLDs including non-STR MLD1.

When the AD MLD transmits a frame addressed to a STA having a MAC address STA2 over Link2 and the STA having the MAC address STA2 receives the frame, the STA having the MAC address STA2 performs UL transmission of a response frame such as Ack or BlockAck to an AP having a MAC address AP2 after SIFS. When DL transmission performed by the AP having the MAC address AP2 over Link2 is DL MU transmission including the frame addressed to the STA having the MAC address STA2, and the AP having the MAC address AP2 requests response frames from STAs being destinations of the DL frames in DL MU transmission, the AP having the MAC address AP2 may include a Trigger frame requesting UL MU transmission of the response frames in DL MU transmission. This Trigger frame requesting transmission of response frames is of a type of multi-user block acknowledgment request (hereinafter, referred to as MU-BAR). Upon receiving an MU-BAR, each STA transmits a response frame in UL MU transmission.

FIG. 21 is including such case in "UL including non-STR MLD1". When the STA having the MAC address STA2 is performing UL transmission of a response frame over Link2, it is considered that the STA having the MAC address STA1 affiliated with the same non-STR MLD1 fails to normally perform carrier sense (referred to as CS) of the wireless medium on Link1 ("non-STR MLD1 can't CS" in FIG. 21).

However, there are two types of CS in a wireless LAN in conformity with IEEE 802.11 standard. One is to directly sense busy/idle state of the wireless medium, and is called as a physical CS. The other one is a virtual CS that sets a NAV until the end time at which the notified duration ends from the end time of the PHY packet including the frame based on the duration notified in the Duration field of the received frame and the like. When two links are in non-STR link relationship at an MLD, the CS stated as a problem not being able to be performed normally on the second link when transmission of a frame is taken place over the first link is the physical CS. In the Physical CS, whether the state of the CCA is busy or idle is checked.

The Trigger frame is a type or Control frame. The Trigger frame instructs an uplink (referred to as UL) MU transmission to the STAs. In instructing a plurality of terminals to perform the UL MU transmission, a frame that the AP first transmits is the Trigger frame. The AP instructs, by the Trigger frame, STAB which STAs may perform UL MU transmission, how long the packet length of the UL MU transmission is, which MCS is used by, a STA, and the like. The AP here may be an AP MLD. The STAs here may be STR MLDs.

When UL MU transmission is performed after the transmission of a Trigger frame, the access right to perform UL MU transmission is already acquired by the AP MLD transmitting the Trigger frame. Therefore, the decision whether to obtain the access right at Link2 is made at the AP MLD and it is similar to the case when transmitting the DL frame as described above. When the STA MLD notifies the AP MLD in advance of an UL transmission request, the AP MLD can schedule transmission of a Trigger frame to the STA MLD. The STA MLD may previously request the AP MLD which wireless link the STA MLD wants to receive the Trigger frame or previously negotiate which wireless link the STA MDL receives the Trigger frame. In that case, FIG. 21 illustrates a state after the link to be used is determined.

Figure 25:
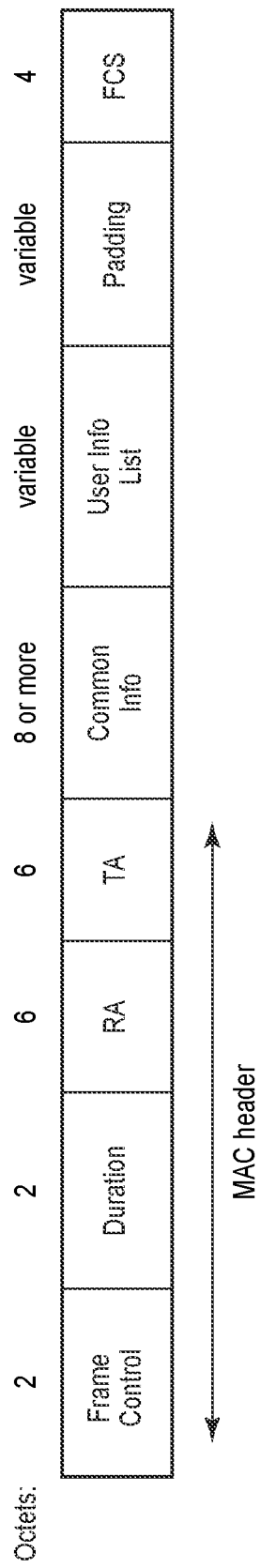
FIG. 25 illustrates an example of a format of a Trigger frame.

FIG. 25 illustrates a format of the Trigger frame. The Trigger frame includes a MAC header, a Common Info field (eight octets or more), a User Info List field (variable length in units of octets), a Padding field (variable length in units of octets), and an FCS field (four octets).

The MAC header field includes a Frame Control subfield (two octets), a Duration subfield (two octets), an RA subfield (six octets), and a TA subfield (six octets). The Common Info field includes a DL Length subfield. The user Info List field includes 0 or more User Into subfields, and each User Info subfield includes an AID12 subfield, a UL HE-MCS subfield, and the like. The AID subfield, if set in a MAC header, has two octets, whose length is the same as the Duration field, and is set to place of the Duration field. However, since the range of the AID actually allocated by the DP to STAs is 1 to 2007, 12 bits is sufficient for the AID12 subfield for expressing the AID of a STA in the User Info subfield of this Trigger frame, and is 12 bits.

The AP MLD specifies the AID for each STA MLD in the AID12 subfield, the MCS use for the UL MU transmission in the UL HE-MCS subfield, and the PHY packet length in the UL Length subfield.

When the User Info field specifies one terminal as a destination terminal to which the Trigger frame is to be transmitted, the RA is an address of one terminal. When the User Info field specifies a plurality of terminals s destination terminals tn which the Trigger frame is to be transmitted, the RA is a broadcast address.

The AID12 subfield contains an association ID allocated to the STA MLD. The association ID specifies the STA MLD instead of the MAC address, and conventionally, strictly, the STA of the corresponding link at the STA MLD. After the STA MLD transmits the Association Request frame to the AP MLD, when the AP MLD transmits the Association Response frame to the STA MLD accept the request, the AP MLD allocates the association ID to the STA MLD. The association ID is used in a sharing manner in all the wireless links used in the STA MLD.

Similarly to the transmission of the Data frame, the AP MLD confirms that non-STR MLD1 is not communicating over the primary link, and then transmits the Trigger frame to non-STR MLD1.

The STA MLD that receives the Trigger frame detects that the STA MLD is subject to the UL MU transmission when the association ID s allocated from the AP MLD and the association ID of the STA MLD is in the AID12 subfield. The STA MLD performs DL MU transmission a SIFS after the end time of the PHY packet that contains the Trigger frame. As a Trigger frame transmission method, the AP MLD may transmit a Trigger frame without designating individual STA MLDs the AID12 subfields. In this case, the STA MLD on the reception side of the Trigger frame may determine whether to perform transmission using a random number. This transmission method is referred to as UL OFDMA (Orthogonal Frequency Division Multiple Access) based Random Access (hereinafter, referred to as UORA). In this case, for example, when non-STR MEM is not communicating over Link1, STA2 that receives the Trigger frame designating UORA may perform UL transmission.

<<CS Resume Example in Link1 of Non-STR MLD1>>

As a method for avoiding the possibility that the CS does not function sufficiently due to the state in which the CPA of the wireless medium is unknown at Link1 and non-STR MLD1 collides with the transmission of other STAs, for example, there is a method in which the execution or the CSMA/CA is suspended. Even though it is determined that the state of the CCA at Link1 is idle for a fixed time from the time when the interference of Link2 or the TXOP of Link2 ends, the execution of the CSMA/CA is suspended for the fixed time, and the CSMA/CA is executed after the fixed time elapses.

In a wireless LAN in conformity with IEEE 802.11 standard, there is a case where a terminal performs transmission even though the TXOP has already been obtained by another STA because of not recognizing by physical CS similarly to the above. Such case happens when a terminal in power save transitions from a doze state to an awake state or when a channel is switched. Therefore, to avoid such cases, a fixed time called NAVSyncDelay is defined. The first method is similar in concept to this NAVSyncDelay, which may be utilized.

The AP (when the NAVSyncDelay is applied to the multi-link communication, the AP MLD) or the STA (when the NAVSyncDelay is applied to the multi-link communication, the STA MLD) can individually set the NAVSyncDelay, and can set an extremely short time as the NAVSyncDelay. Therefore, it may be inappropriate to avoid a collision. Further, the NAVSyncDelay cannot be shared as a common time in the BSS. As a second method, another parameter including a value may be defined as a new wireless LAN standard. Alternatively, the new parameter value may be set by the AP MLD and notified to its surrounding STA MLDs by the Beacon frame or the like. When the AP MLD notifies this fixed time duration by the Beacon frame or the like, for example, the above-described ML element, EHT Capabilities element, or a new information element may be used.

When the reception of another frame can be detected and the NAV can be obtained while waiting for the fixed time, the purpose is achieved because the use state of the wireless medium is synchronized with other STAs. Therefore, the waiting for the fixed may be canceled.

As a third method, when the CSMA/CA is resumed from the time when the interference from Link2 ends, the sensitivity may be increased compared to the conventional CS level, i.e., the threshold of CS may be lowered compared to that of the conventional CS. Conventionally, in a wireless LAN in conformity with IEEE 802.11 standard, a CS level for detecting the SHY packet of the wireless LAN is defined as −82 dBm/20 MHz, and the CS level for detecting a signal including other noise is defined as −62 dBm/20 MHz. However, when the CSMA/CA is resumed at Link1 from the time when the interference from Link2 ends, the physical CS level may be uniformly set to, for example, −82 dBm/20 MHz. Also in this case, when the MAC frame is received over Link1 or the like and it is determined that the CS state can be detected similarly to other terminals in which the CS is normally performed, the operation may immediately return to the operation of the CSMA/CA using the normal threshold value on the CS.

In these examples, it is necessary for the STA having the MAC address STA1 to detect the transmission end time of the STR2 in Link2. Therefore, for example, the occupation length or the end time of the PHY packet transmitted from the STA having the MAC address STA2 in Link2 may be shared with the STA having the MAC address STA1 in Link1.

In transmitting a response frame, the STA having the MAC address STAG can obtain the TXOP length acquired by the AP having the MAC address AP2 between the STA having the MAC address STA2, or the end time of the TXOP from the NAV information (described later) at Link2. Using this, in the fourth method, the TXOP length or the end time of the TXOP is shared with the STA having the MAC address STA of Link1. According to this method, the STA having the MAC address STA1 can perform an operation of waiting for a fixed time from the end time thereof or an operation of increasing the CS sensitivity from the end time thereof. For example, the lower MAC processing unit 38 that processes the access control of Link2 shares the information with the lower MAC processing unit 36 that processes the access control of Link1.

As a fifth method of returning from a state at which the STA having the MAC address STA1 fails to accurately detect the CS state at Link1, the AP MLD may notify the STA having the MAC address PTA2 of the NAV state at Link1 in a frame transmitted over Link2 from the AP MLD to the STA2 having the MAC address STA2. This is because Link1 and Link2 are not in non-STA link relationship at the AP MLD. The STA MLD detects when the TXOP at Link1 ends from the NAV information at Link1. Far example, when the end timing by the NAV information is earlier than an end timing of a case in which the CCA fails to detect the end timing, the STA MLD performs normal CSMA/CA from the time when the CCA can be performed without waiting for the fixed time described above. When the end timing by the NAP information is later than an end timing of a case in which the CCA fails to detect the end timing, the STA MLD waits for the end timing by the NAV information and then performs normal CSMA/CA.

<<Postpone of DL Transmission from AP MLD to Non-STR MLD1>>

FIG. 21 illustrates the case where the AP MLD determines whether non-STR MLD1 is communicating over Link1 when the AP MLD attempts to transmit a next Data frame addressed to non-STR MLD1 and confirms that non-STR MLD1 is performing DL transmission over Link1 ("UL from non-STR MLD1" in FIG. 21).

In this case, there are several operations at the AP MLD. A first example is that the AP MLD does not perform transmission over Link2 transmission over Link1 to the STA having the MAC address STA1 is enabled. As a result, transmission to non-STR MLD1 is postponed.

A second example of the AP MLID operation is to transmit a Management frame or a Data frame to another STA over Link2 when the AP MLD has data addressed to the another STA. This also causes the transmission to a STA of non-STR MLD1 to be postponed.

The other STA is (1) a STA of another non-STR MLD that does not transmit a frame over Link1, (2) a STA of another non-STR MLD in which Link1 and Link2 are in STR link relationship, (3) a STA of an STR MLD in which all wireless links are in STR link relationship, or (4) a STA connected to AP2 only over Link2.

The application of the second example has a condition. The second example can be applied to the case where non-STR MLD1 can receive the PHY header of the PHS packet over one of the two wireless links in non-STR link relationship and perform automatic gain control (hereinafter, referred to as AGC), and frame exchange can be continued at Link1 in a state where synchronization for reception and decoding can be obtained. Whether the frame exchange can be continued at Link1 depends on the condition of the signal-to-interference ratio (hereinafter, referred to as SIR).

However, in some implementations, when one link participates in a TXOP, the other link may be interfered by the one link. For example, in a wireless LAN chip also capable of transmitting and receiving radio waves of Bluetooth (registered trademark) standard, it is studied that a 13luetooth signal wraps around through a wireless LAN antenna and the Bluetooth signal is distorted. In this case, a low noise amplifier (hereinafter, referred to as LNA) on the wireless LAN side may be turned off at the time of transmitting a Bluetooth radio wave. When Link1 performs transmission and reception, Link2 may perform similar operation as above. That is, the LNA of Link2 may be turned off when transmission and reception are performed over Link1.

The STA-MLD may notify the AP MLD in advance whether such an operation can be performed. In notifying that the two wireless links are in non-STR link relationship to the AP NLD using the ML element or the like, the STA-MLD may also notify this information. The STA-MLD may also collectively notify this information as capability of the STA MLD. An example of the elements to be collectively notified is the EHT Capabilities element. The EHT Capabilities element is also placed in the Association Request flame or the Reassociation Request frame.

As a method of transmitting a frame to non-STR MLD1 over Link2 without interfering communication at Link1 of non-STR MLD1, the AP MLD may perform beamforming when transmitting a frame to non-STR MLD1 over Link1. By beamforming, null may be directed to the communication of non-STR MLD1 at Link1 (null steering). Alternatively, spatial reuse (hereinafter, referred to as SR) of IEEE 802.11ax standard may be applied. In SR, the CS sensitivity is adjusted according to the transmission power of an own terminal. In addition, in SR, resistance to interference of own transmission from another terminal is determined based on information obtained from a received frame, and when it is determined that the resistance is sufficient (there is no problem as SIR), transmission can be made with. The overlapping with the received frame.

<<Transmission at Wireless Link in STR Link Relationship with Respect to Primary Link in STA MLD>>

In the transmission from the AP MLD to the STA MLD in which Link1 and Link2 are in STR link relationship, the STA MLD independently transmit and receive a frame over Link1 and Link2. Therefore, the AP MLD does not have to determine whether the STA MLD is communicating over Link1.

As described above, according to the first embodiment, the AP MLD obtains link information of wireless links in non-STR link relationship from a non-STR MDL. The AP MLD sets one of the wireless links expected to be in non-STR link relationship as the primary link, and notifies non-STR MLDs of the primary link information. When the AP MLD transmits a frame to a non-STR MLD over a secondary link other than the primary link, where the secondary link is in non-STR relationship with the primary link at the non-STR MLD, the AP MLD determines whether the non-STR MLD is not communicating over the primary link. When the non-STR MLD is communicating over the primary link, the AP MLD postpones the transmission of the frame.

Accordingly, the AP PLD can determine whether transmission can be performed only by confirming the communication state of the primary link when transmitting a frame to the non-STR MLD. Therefore, it is possible to avoid collision among wireless links in non-STR link relationship, and to secure the performance of the non-STR MLD. The non-STR MLD can fully enjoy benefit of the multi-link operation when there is no wireless links in non-STR link relationship.

Second Embodiment

In the first embodiment, the STA MLD directly notifies the AP MLD which wireless link is in non-STR link relationship with respect to a certain wireless link. In the second embodiment, instead of directly no which wireless link is in non-STR link relationship with respect to the certain wireless link, the STA MLD notifies the AP MLD of a separation distance on a frequency at which two wireless links are in non-STR link relationship or are in STR link relationship. Thus the STA MLD indirectly notifies the AP MLD of the two wireless links in non-STR link relationship.

The STA MLD notifies the AP MLD to handle two wireless links having a frequency separation distance equal to or greater than a threshold distance as wireless links in non-STR link relationship. From relationship between the link ID and the link frequency of the wireless link to be used, the AP MLD determines which two wireless links are in non-STR link relationship. For example, when the AP MLD attempts to perform transmission as illustrated in FIG. 21, the AP MLD determines whether Link1 and Link2 are in non-STR link relationship or STT link relationship for the STA MLD based en the separation distance between the frequencies of Link1 and Link2. The STA MLD notifies the threshold distance and the AP MLD compares the separation distance to the threshold distance. When the separation distance is equal to or longer than the threshold distance, the AP MLD determines that the two wireless links are in non-STR link relationship.

FIG. 26 illustrates an example of a format of an ML element included in the Association Request frame transmitted from the STA MLD to the AP MLD.

The ML element includes an Element ID field (one octet), a Length field (one octet), an Element ID Extension field (one octet), a STA MLD field (six octets), a Max Non-STR Frequency Difference field (one octet), a Number Of Links field (one octet), and a Link ID Set field (variable length in units of octets). When the Link ID subfield included in the Link ID Set field is fixed and it is ensured that other fields do not follow the Link ID Set field, the Number Of Links field may not be included. After Non-STR Frequency Difference field, a region up to end of the remaining ML element may be set as the Link ID Set field. The region may be divided for each fixed length of the Link ID subfield and each divided region may be handled as the Link ID subfield.

The Max Non-STR Frequency Difference field notifies a threshold distance that is a maximum separation distance on frequencies of two wireless links in non-STR link relationship. When the frequency separation distance among the wireless links is equal to or shorter than the threshold distance notified by this field, the AP MLD determines that the wireless links are in non-STR link relationship in the STA MLD. When the frequency separation distance among the wireless links is longer than the threshold distance, the AP MMD determines that the wireless links are in STR link relationship in the STA MLD.

This field name may be changed to a field name of Min STR Frequency Difference in the meaning of "expressing a threshold distance that is the minimum separation distance on the frequency in STR link relationship". In that case, when the frequency separation distance among the wireless links is equal to or longer than the threshold distance notified by this field, the AP MLD determines that the wireless links are in STR link relationship in the STA MLD. When the frequency separation distance among the wireless links is shorter than the threshold distance notified by this field, the AP MLD determines that the wireless links are in non STR link relationship in the STA MLD.

In the following description, the Max Non-STR Frequency Difference field name is used. However, even though the Min STR Frequency Difference field name is used, only the viewpoint of the notification content is different, and the other content is similarly applied.

For example, the STA MLD notifies the AP MLD that two wireless links are in non-STR link relationship when the frequency separation distance is 240 MHz or less in the Max Non-STR Frequency Difference field. The Max Non-STR Frequency Difference field is prepared by one octet in FIG. 26. For example, when the channel width is 80 MHz, a channel In a frequency band of 0 to 20.4 GHz can be expressed by a value up to 0 to 255. When it is desired to express 240 MHz as the threshold distance, the value of this field is 3. Since it is meaningless to express 0 MHz in this field, a numerical value expressing 0 MHz may be used for other purposes or reserved.

For example, when only 2.4 GHz band to 6 GHz band are targeted as a frequency band of a wireless system, it is sufficient that the threshold distance can express 5 GHz. Therefore, values other than values expressing 5 GHz are used for other purposes or reserved.

Instead of the unit of 80 MHz, for example, a wireless system using another fixed value as a unit, such as a unit of 20 MHz, may be used. A part of the bit regions of this field may be used to identify a unit of a channel, and the remaining bit regions may be used as a value expressing the threshold distance.

For example, 0 is reserved, 1 is 20 MHz, 2 is 40 MHz, 3 is reserved, 4 is 80 MHz, and 5 to 7 are reserved as regions for identifying the unit of the first three bits, and, the separation distance of the frequency may be calculated by multiplying the value expressed by the remaining five bits by the unit.

In the case of using up to 160 MHz as a unit, for example, the three bits may be set such that 0 is reserved, 1 is 20 MHz, 2 is 40 MHz, 3 is 80 MHz, 4 is 160 MHz, and to 7 are reserved.

When the STA MLD can detect in advance what range the separation distance on the frequency within to ensure that the two wireless links are in non-STR link relationship or how far the two wireless links are away from each other to be in STR link relationship, in consideration of the design on implementation and the like, such a notification can be made.

In the former case, a notification method such as the Max Non-STR Frequency Difference field is used. In the latter case, a notification method such as the Min STR Frequency Difference field is used.

In FIG. 26, the Number Of Links field and the Link ID set field are sequentially placed after the Max Non-STR Frequency Difference field. Since these fields include the Max Non-STR Frequency Difference field, the Non-STR Link1 subfield and the Non-STR Link2 subfield in FIG. 19 can be omitted, and thus the field name of the ML element in FIG. 19 is changed. The Number Of Links field indicates the number of Link ID subfields included in the subsequent Link ID Set field. The Link ID Set subfield includes one or a plurality of Link ID subfields. The Link ID subfield is similar to the Link ID subfield in FIG. 11.

Among the plurality of wireless links notified from the AD MLD, the STA MLD notifies the AP MLD of IDs of one or more wireless links used in the STA MLD using the Link ID subfield. In the case of using two wireless links, the format of FIG. 11 required seven octets after the STA MLD field. However, in the format of FIG. 26, four octets are required after the STA MLD field, and the field size can be reduced. The reduction of the field size also contributes to the efficiency of wireless communication.

The frequency separation distance notified using the Max Non-STR Frequency Difference field is, for example, a difference obtained by comparing the center frequencies of the channels used by the respective wireless links. The separation distance of the frequencies to be notified may be changed so as to express a difference among, the closest ends of the channels used by the respective wireless links.

When the AP MLD receives the Association Request frame including the ML element as illustrated in FIG. 26 from the STA MLD, the AP MLD compares the frequency separation distance between the wireless links notified by the AP MLD itself with the frequency separation distance notified by the Max Non-STR Frequency Difference field, and detects which two wireless links are in non-STR link relationship in the STA MLD.

FIG. 27 illustrates channels in 5 GHz band of a wireless LAN in conformity with 802.11 standard. In the case of the 80+80 MHz channel, two 80 MHz channels that are not adjacent in FIG. 27 are used. For example, it is assured that the AG MLD notifies the STA MLD of channel number 106 as Link1 and channel number 138 as Link2. The STA MLD notifies the AP MLD that two wireless links are in non-STR link relationship when the frequency separation distance is 240 MHz or less in the Max Non-STR Frequency Difference field.

Assuming that the Max Non-STR Frequency Difference field is represented by a difference of center frequencies, a center frequency of channel number 106 is 5,530 MHz, a center frequency of channel number 138 is 5,690 MHz, and a separation distance of the frequencies is 160 MHz which is 240 MHz or less. Thus the AP MLD determines that Link1 and Link2 are in non-STR link relationship in the STR MLD.

Of course, the STA GILD that transmits this information recognizes that Link1 and Link2 are in non-STR link relationship in its own devices. For example, similarly to the first exemplary embodiment, when the AP MLD sets Link1 as the primary link, the STA MLD transmits Linker as the primary link. At the time of transmission of a frame to the STA MLD, the AP MLD determines whether the STA MLD is communicating aver Link1, and obtains an access right based on the determination.

According to the second embodiment, since the STA MLD indirectly notifies the AP MLD of wireless links in non-STR/STR link relationship, the size of notification information is reduced, and communication efficiency is improved.

Third Embodiment

In the first embodiment, the AP MLD sets one of the plurality of wireless links used by its own device as the primary link and notifies the STA MLD of the primary link. In the present embodiment, the AP MLD receives the Association Request frame for requesting connection from the STA MLD only over the primary link, and indirectly notifies the STA MLD of the primary Link. Therefore, the direct notification according to the first embodiment is omitted.

Specifically, the AT MLD transmits the Association Response frame in response to the Association Request frame. Reception of the Association Request frame over the primary link is added as one of conditions for transmitting the Association Response frame whose Status Code is a value indicating "SUCCESS".

The Association Request frame includes a MAC header, a Frame Body, and an FCS, similarly to the Beacon frame in FIG. 3. The Type subfield of the Frame Control field included in the MAC header describes identification information of the Management frame, and the SubType subfield describes identification information of the Association Response frame. The Frame Body of the Association Request frame includes a Status Code indicating whether the Association Request operation has succeeded or failed.

When the STA MLD transmits the Association Request frame over the secondary link, the AP MLD transmits the Association Response frame whose Status Code is a value indicating "NG (failure)". Upon receiving the Association Response frame with a value indicating "NG (failure)" in the Status Code, the STA recognizes that the wireless link that transmits the Association Request frame (or receives the Association Response frame) is not the primary link, retransmits the Association Request frame by changing the wireless link, and requests connection again. Upon receiving the Association Response frame in which a value indicating "SUCCESS" is described in the Status Code, the STA MLD recognizes that the wireless link that has transmitted the Association Request frame (or receives the Association Response frame) is the primary link.

With this configuration, transmission of the Reduced Neighbor Report element that notifies the STA MLD of the primary link from the AP MLD can be omitted, and efficiency of wireless communication can be improved.

FIG. 28 illustrates an example of the Status Code of the wireless LAN standard. Each code of Line Status Code is allocated to each value. As an example, a SUCCESS code indicating success is allocated to 0, REFUSED indicating failure and REFUSED_REASONUN_UNSPECIFIED indicating unspecified reason are allocated to 1, TDLS_REJECTED_ALTERNATIVE_PROVIDED indicating Tunneled Direct Link Setup (hereinafter, referred to as TDLS) wake-up schedule rejection (with an alternative schedule) is allocated to 2, TDLS_REJECTED indicating TDLS wake-up schedule rejection is allocated to 3, and SECURITY DISABLED indicating disablement of security is allocated to 4. Presently, there are several reserved values to which no code is allocated. For example, 4, 2, 9, 20, 21, are not allocated any code.

FIG. 29 illustrates an example of the Status Code in the third embodiment. The code "DENIED_NOT_PRIMARY_LINK" meaning rejection because it not the primary lick is allocated to one of the values presently in reserved, here 4. When the STA MLD transmits the Association Request frame over the secondary link, the AP MLD transmits the Association Response frame with the Status Code of 4.

In order to notify the STA MLD of the primary link, when the AP MLD transmits the Association Response frame in which 4 is described in the Status Code to the STA MLD, the AP MLD may add an information element to which primary link information (Channel Number or the like) is described to the Association Response frame. With this configuration, the STA MLD can recognize the primary link without repeatedly receiving the Association Response frame in which 4 is described in the Status Code.

As one method that does not enable the STA MLD to transmit the Association Request frame over the secondary link, a configuration may be in which the AP MLD transmits the Beacon frame over the primary link and does not transmit the Beacon frame over the secondary link. When the Beacon frame is not transmitted, a legacy STA also does not transmit the Association Request frame. For example, when only the STA MLD corresponding to the MLD is permitted to transmit the Association Request frame over the secondary link, the AP MLD may transmit a type of Management frame (the frame type is different from the Beacon frame) not recognized by the legacy STA to the STA PLC instead of the Beacon frame, and notify that transmission of the Association Request frame is permitted.

Even when there are a plurality of primary links as illustrated in FIG. 18A, the AP MLD only has to receive the Association Request frames from the AP MLD over Link1 and Link4 that are the primary links, and not receive the Association Bequest frames over Link2 and Link3 that are the secondary links.

When the AP MLD indirectly notifies the primary link information over Link1 and Link4, the STA MLD determines that Link1 and Link4 are the primary links. The STA MLD does not have to transmit the Association Request frame over Link4 as long as the STA MLD can connect to the AP MLD by transmitting the Association Request frame over Link1.

According to the third embodiment, the AP MLD does not notify the STA MLD of the identifier of the wireless link set as the primary link, but indirectly no the STA MLD of the primary link instead. Therefore, the size of the notification information is reduced, and communication efficiency is improved.

Fourth Embodiment

In the first embodiment, when performing DL MU transmission over a certain secondary link, the AP MLD individually determines (FIG. 21 illustrates only the MLD1) whether a target STA configures a STA MLD in which the secondary link and the primary link are in non-STR link relationship.

In the fourth embodiment, when the it MLD configures the PHY packet for DL MU transmission at a certain secondary link, a STA MLD as subject to DL MU transmission is only the STA MLD in which the secondary link and the primary link are in STR link relationship or only the STA MLD in which the secondary link and the primary link are in non-STR link relationship. That is, the AP MLD permits no mixture of the STA MLD in which the secondary link and the primary link are in STR link relationship and the STA MLD in which the secondary link and the primary link are in non-STR link relationship in the destination of the PHY packet transmit over the secondary link.

In order to achieve this, the AP MLD creates a table indicating the STA MLD in which the primary link and the secondary link are in non-STR link relationship in advance for each secondary link.

Depending on the STA MLD, the primary link and the secondary link are in link relationship and non-STR link relationship. When the AP MLD performs DL transmission over the secondary link, the AS MLD can determine whether the communication state of the primary link has to be checked by observing the table.

FIG. 30A illustrates an example of a table indicating addresses of the STA MLD groups in which the primary link and the secondary link are in non-STR link relationship for a certain secondary link. Here, as an address, the MLD MAC address is used, which is allocated Lo the upper MAC processing unit 40. FIG. 30B illustrates a table indicating the MLD MAC address of the STA MLD group in which the primary link and the secondary link are in STR link relationship for a certain secondary link.

With this configuration, it is possible to collectively check the communication state of the primary link at the time of DL MU transmission to which a plurality of STA MLDs are set as destinations of transmission. When the AP MLD performs DL MU transmission of the PHY packet destined only for a STA MLD in which the secondary Link and the primary link are in STR link relationship in a certain secondary link, the AP MLD can omit determination as to whether the STA MLD as the destination of transmission is communicating over the primary link.

FIGS. 31A, 31B, and 32 illustrate another example of the table created by the AP MLD. When DL MU transmission is performed, the transmission destination MAC address RA of the MAC header is required when the MAC frame is created. Further, when DL MU transmission is performed, an association identifier AID is required in the PHY header when the PHY packet is created. Therefore, the AP MLD may create a table by these information. FIG. 31A is a table illustrating, for a certain in secondary link, the MLD MAC addresses of the STA MLD groups in which the primary link and the secondary link are in non-STR link relationship, MAC addresses in the secondary link, and AIDs in the secondary link. FIG. 31B is a table illustrating, for a certain secondary link, the MLD MAC addresses of the STA MLD groups in which the primary link and the secondary link are in STR link relationship, MAC addresses in the secondary link, and AIDs in the secondary link. The STA1-2 indicates a MAC address in the secondary link (Link2) of terminal STA MLD having an MLD MAC address MLD1. The AID1-2 indicates an AID in the secondary link (Link2) of terminal STA MLD having the MLD MAC address MLD1.

FIG. 32 illustrates an example in which FIGS. 31A and 31B are combined together in one table. FIG. 32 illustrates a table in which, for a certain secondary link, the STA MLD groups in which the primary link and the secondary link are in non-STR link relationship and the STA MLD groups in which the primary link and the secondary link are in STR link relationship are grouped for each MLD MAC address. The table of FIG. 32 includes MLD MAC addresses of STA MLDs, MAC addresses in the primary link (Link1), AIDs in the primary link (Link1), MAC addresses in the secondary link (Link2), AIDs in the secondary link (Link2), and flags indicating whether the secondary link is in non-STR link relationship with respect to the primary link.

In the above description, the AP MLD makes the STA MLD in which the secondary link and the primary link are in STR link relationship and the STA MLD in which the secondary link and the primary link are in non-STR link relationship not coexist in the destination of the PHY packet transmitted over a certain secondary link, thereby simplifying the determination of whether to perform DL transmission.

In the following, an example in which the AP MLD simplifies determination as to whether DL transmission can be performed even though the STA MLD in which the secondary link and the primary link are in STR link relationship and the STA MLD in which the secondary link and the primary link are in non-STR link relationship coexist in the destination of the PHY packet transmitted over a certain secondary link will be described.

The AP MLD places the STAs constituting the STA MLD in which the secondary link and the primary link are in non-STR link relationship in the first half of the stream processing order of Multi-Input Multi-Output (hereinafter, referred to as MIMO).

With this configuration, in the stream processing, when the AP MLD detects that the processing of the STA constituting the STA MLD in which the secondary link and the primary link are in non-STR link relationship has shifted to the processing of the STA constituting the STA MLD in which the secondary link and the primary link are in STR link relationship, the AP MLD does not have to confirm the communication state of the primary link thereafter, and the processing can be simplified.

For example, when the AP MLD performs DL transmission by MU MIMO, the STA MLD is allocated for each stream. In this allocation, the AP MLD allocates the STA MLD in non-STR link relationship until processing of a certain stream, and allocates the STA MLD in STR link relationship from processing of subsequent streams. Until processing of the certain stream, the AP MLD confirms whether the secondary link and the primary link are in non-STR link relationship or STR link relationship in the STA MLD configured by the STA. When detection that the secondary link and the primary link are in non-STR link relationship, the AP MLD has to confirm the communication state of the STA MLD in the primary link.

However, when it is detected that the secondary link and the primary link are in STR link relationship in the processing of the certain stream processing, the secondary link and the primary link are in STR link relationship in the subsequent processing of the stream. Therefore, it is not necessary to determine non-STR/STR link relationship between the secondary link and the primary link, and it is also not necessary to confirm the communication state in the primary link.

The same applies to the case where the wireless communication device adopts OFDMA for multiplexing in frequency. In the case of OFDMA, the AP MLD allocates RUs to the STA MLD in ascending or descending frequency order. The AP MLD allocates STA MLDs in non-STR link relationship no to an RU of a certain frequency, and STA MLDs in STR link relationship for RUs of subsequent frequencies. The AP MLD performs processing of RUs of OFDMA in descending order of frequency or in ascending order of frequency.

With this configuration, in the processing of the RU of OFDMA, the AP MLD has to check whether the secondary link and the primary link are in non-STR link relationship or STR link relationship in the STA MLD configured by the STA and check the communication state of the STA MLD in the primary link when detecting that the secondary link and the primary link are in non-STR link relationship until the processing of the RU of the certain frequency. However, when it is detected that the secondary link and the primary link are in STR link relationship, since the secondary link and the primary link are in STR link relationship in the subsequent processing of the RU, it is not necessary to determine whether relationship between the secondary link and the primary link is the non-STR/STR link, and it is also not necessary to confirm the communication state in the primary link.

FIG. 33 is a flowchart illustrating an example of processing when the AP MLD classifies STA MLDs into the STA MLD in which the primary link and the secondary link are in non-STR link relationship and the STA MLD in which the primary link and the secondary link are in STR link relationship.

The AP MLD determines whether the destination of the DL MU packet to be transmitted is the STA MLD group in which the secondary link and the primary link are in non-STR link relationship (112 in FIG. 33). When the destination is not the STA MLD group in which the secondary link and the primary link are in non-STR link relationship, the AP MLD performs DL transmission of the PHY packet after obtaining the channel right (120 in FIG. 33).

When the destination is the STA MLD group in which the secondary link and the primary link are in non-STR link relationship, the AP MLD determine whether the TROP is obtained over the primary link (114 in FIG. 33). When the TXOP is not obtained over the primary link, the AP MLD performs DL transmission of the PHY packet after obtaining the channel right (120 in FIG. 33).

When the TXOP is obtained over the primary link, the AP MLD determines whether the destination of the PHY packet includes the same MLD as the TXOP holder/responder of the primary link (116 in FIG. 33). When the destination of the PHY packet does not include the same MLD as the TXOP holder/responder of the primary link, the AP MLD performs DL transmission of the PHY packet after obtaining the channel right (120 in FIG. 33).

When the destination of the PHY packet includes the same MLD as the TXOP holder/responder of the primary link, the AP MLD regenerates the PHY packet for the DL MU transmission such that the destination of the PHY packet no longer includes the same MLD as the TXOP holder/responder of the primary link, or postpone transmission until the end of the TXOP over the primary link of the same MLD as the TXOP holder/responder (118 in FIG. 33). After completion of this processing, the AP MLD performs DL transmission of the PHY packet after obtaining the channel right (120 in FIG. 33).

Fifth Embodiment

In the present embodiment, in selecting a plurality of wireless links to be used in the multi-link communication, the AP MLD takes into account a frequency separation distance among the wireless links. For example, in many of the connected STA MLDs, the AP MLD selects wireless links in which the separation distance on the frequency of two wireless links is egua1 to or longer than a certain fixed value such that all the two wireless links are in STR link relationship. The fixed value may be defined. by specifications.

For example, when the AP MLD selects two wireless links of a 5.2 GHz band and a 5.3 GHz band as wireless links for multi-link, since frequencies of the two wireless links are close, in most STA MLDs connected to the AP MLD, the two wireless links are in non-STR link relationship. Therefore, as a method in which the AP MLD selects wireless links for multi-link, wireless link having frequencies as far as possible such as the 5.2 GHz band and the 5.6 GHz band are selected.

According to the fifth embodiment, the AP MLD selects wireless having a certain frequency separation distance or more for the multi-link communication. Therefore, in the STA MLD, the wireless links are less likely to be in non-STR link relationship.

Sixth Embodiment

In the present embodiment, when the AD MLD connects the STA MLD, an upper limit is set to the number of connections of the STA MLD in which the primary link and the secondary link are in non-STR link relationship. When the number of connections of such STA MLD exceeds the upper limit, the AP MLD does not permit further connection of the STA MLD even though the AP MLD receives the Association Request frame.

When the AP MLD does not permit the connection, the AP MLD notifies the STA MLD of the reason using the Status Code of the Association Response frame, FIG. 34 illustrates an example of the Status Code in the sixth embodiment. A code "DENTED_EXCEED_MAX_VALUE" is allocated to one of the values presently reserved, here eight, meaning rejection of the connection of the STA MLD which the primary and secondary links are in non-STR link relationship because the number of the STA MLD connections in non-STR link relationship exceeds the upper limit. When the number of connections of the STA MLD in which the primary link and the secondary ink are in non-STR link relationship exceeds the upper limit, the AP MLD transmits the Association Response frame in which 8 is described in Status Code to the STA MLD.

Since the STA MLD determines the reason why the Association Request frame is rejected, it is possible to stop the Association Request frame from being unnecessarily retransmitted.

Since the secondary link used by the STA MLD may be different, the upper limit of the number of connections of the STA MLD may be limited for each secondary link.

Seventh Embodiment

In the present embodiment, the STA MLD in which the primary link and the secondary link are in non-STR link relationship is suppressed from obtaining access rights in an autonomously distributed manner by the CSMA/CA. This facilitates the AP PhD to perform DL transmission to STA MLD.

For example, there is a mechanism for increasing the efficiency of the AP MLD at the time of the UL MU of IEEE 802.11ax standard. The present embodiment makes it difficult to perform a spontaneous transmission of the ETA MLD using the mechanism.

As one specific example, the STA MLD is made difficult to transmit a frame over the primary link until receiving the Trigger frame. Since the transmission of the STA MLD is suppressed over the primary link, the AP MLD can easily determine the communication state of the primary link.

Figure 35:
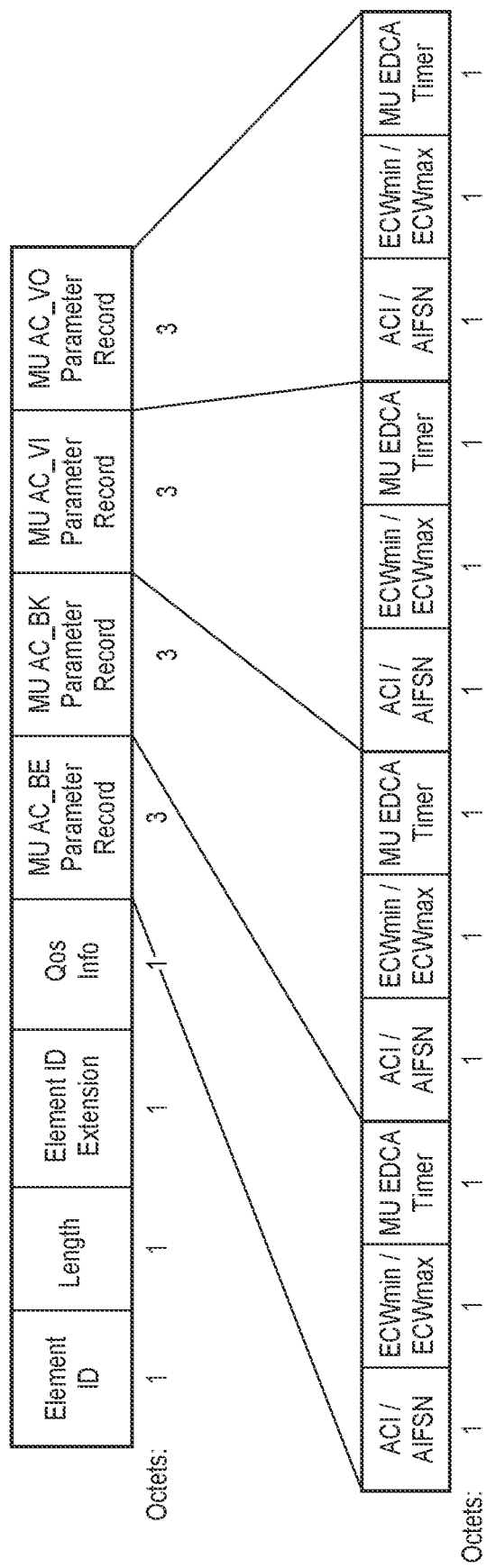
FIG. 35 illustrates an example of a format of an MU EDCA parameter set element according to a seventh embodiment.

Another specific example is to adjust an MU Enhanced Distributed Channel Access (hereinafter, referred to as EDCA) parameter included in the Frame Body of the Management frame. FIG. 35 illustrates a format of an example of the MU EDCA parameter set element.

The MU EDCA parameter set element includes Element ID (one octet), Length (one octet), Element ID Extension (one octet), QoS Info (one octet), MU AC_BE Parameter Record (three octets), MU AC_BK Parameter Record (three octets), MU AC_VO Parameter Record (three octets), and MU AC_VO Parameter Record (three octets).

Each of the MU AC_BE Parameter Record (three octets), the MU AC_BK Parameter Record (three octets), the MU ACEI Parameter Record (three octets), and the MU AC_VO Parameter Record (three octets) includes an ACI/AIFSNF subfield (one octet), an ECWMin/ECWmax subfield (one octet), and a MU EDCA Timer subfield (one octet).

The AIFSN recorded in the ACI/AIFSN subfield specifies the number of slots to be taken after an SIFS. This number of slots is a fixed time before random back off is performed by the CSMA/CA. When the fixing time is increased, access become difficult. Therefore, when the AP MLD lengthens this AIFSN, the STA MLD is less likely to obtain an access right. The adjustment of the AIFSN may be performed automatically or by user's setting.

Eighth Embodiment

Though the AP MLD may transmit the Trigger frame to the STA of the STA MLD according to the condition based on the first embodiment on both the primary link and the secondary link in non-STR link relationship with respect to the primary link on the STA MLD side, the AP MLD transmits the Trigger frame simultaneously with or partially overlapped with the transmission of the Trigger frame over the primary link.

Based on FIG. 21, the primary link is Link1. The Trigger frame including the STA MLD as subject to transmission is transmitted over the primary link Link1 after the AP MLD obtains the access right when the STA MLD is not performing communication. The AP MLD also transmits the Trigger frame including the STA MLD as the destination of transmission over Link2 which is the secondary link in the same period as the period in which the Trigger flame including the STA MLD as the destination is transmitted over the primary link Link1. That is, when the AP MLD obtains the access right of the primary link, when the secondary link is available for transmission/reception, the Trigger frame including the STA MLD as the destination is transmitted using the primary link and the secondary link at the same time.

The method of obtaining the access right relating to the transmission of the Trigger frame is similar to DL MU transmission of the first embodiment.

The end time of the Trigger frame is set to be the same between the primary link and the secondary link such that the Trigger-Based PPDU, which is the UL MU transmission, starts simultaneously in the primary link and the secondary link. When the transmission of the Trigger frame in the secondary link is delayed with respect to the transmission of the Trigger frame in the primary link, a padding bit or the like is set to the Trigger frame on the primary link side to adjust the ROY packet length such that the end time becomes the same between the primary link and the secondary link. The length of the Trigger-Based PPDU indicated in the Trigger frames transmitted in both links is made the same such that the Trigger-Based PPDU in both links ends simultaneously. The values of the Duration field of both Trigger frames (or when the access right is obtained prior to the Trigger frame in the RTS frame or the like, the RTS frames) are made the same, and the end times of the TXOP are made the same. When the end time of the TXOP of the primary link ends earlier than that of the secondary link as a result, the TXOP of the secondary link also ends in accordance with the end time of the TXOP of the primary link or within a range with no time difference as much as possible. CF-End is transmitted to end the TXOP.

The AP MLD transmits the Response frames over the primary link and the secondary link to the STA that has transmitted the Trigger-Based PPDU in synchronization after a fixed time (SIFS) of the Trigger-Based PPDU that is transmitted response to the Trigger frames received over the primary link and the secondary link simultaneously and ends at the same time. The Response frames transmitted over the primary link and the secondary link also have the same time duration. With this configuration, the sequence of frame exchange is synchronized and continued over the primary link and the secondary link. For this purpose, the lower MAC processing units 36 and 38 in the AP MLD cooperate with each other, and cooperate with each other regarding the frame to be transmitted, the timing to be instructed in the frame to be transmitted, the packet length, and the TXOP length between the AP1 at Link1 side and the AP2 at Link2 side. When these response frames are transmitted at the end of the TXOP, the time durations are not necessarily the same. This is because, since the TXOP is not synchronously ended, interference or CS does not sufficiently function over the side of the wireless link where the TXOP is ended earlier only during a short period, but the influence is small.

Ninth Embodiment

The purpose of the ninth embodiment is the same as the purpose of the fourth embodiment and the like. The AP MLD classifies the secondary link into two types of secondary link. The AP MLD permits only the STA MLD in which the primary link and the secondary link are in non-STR link relationship to use the first type secondary link. The AP MLD permits only the STA MLD in which the primary link and the secondary link are in STR link relationship to use the second type secondary link.

The STA MLD notifies the AP MLD of available links, a combination of available links in non-STR link relationship, and a combination of available links in STR link relationship using an Association Request frame. Since it can be seen that the combination of the links is in STR link relationship by notifying the combination of the 1nks in non-STR link relationship, or conversely, it can be seen that the combination of the links is in non-STR link relationship by notifying the combination of the links in STR link relationship, either one of them may be notified. The AP MLD notifies each STA MLD of a link available to the STA MLD using the Association Response frame. For example, it is assumed that the AP MLD uses Link1, Link2, and Link3 for the multi-link communication, and Link2 is set as the primary link. It is assumed that a certain STA MLD wants to use Link1, Link2, and Link3, and then notifies the AP MLD that Mink2 and Link1, and Link2 and Link3 are in non-STR link relationship by the Association Request frame. In this case, the AP MLD does not permit the STA MMD to use Link1 by the Association Response frame. In other words, the AP MLD disables the use of Link1 of the STA MLD. On the other hand, it is assumed that another STA MLD notifies the AP MLD that the other STA MLD wants to use Link1, Link2, and Link3 and that Link1, Link2, and Link3 in STR link relationship by the Association Request frame. In this case, the AP MLD does not permit the STA MLD to use Link3 in the Association Response frame. In other words, the AP MLD disables the use of Link3 of the STA MLD. In this manner, a certain secondary link can be used by the STA MLD in which the primary link and the secondary link are in non-STR link relationship, and another secondary link can be used by the STA MLD in which the primary link and the secondary link are in STR link relationship. An example of a method in which the AP MLD notes the STA MLD of such a usage restriction of the secondary link may define a new value for Status Code of the Association Response frame.

FIG. 36 illustrates an example of the Status Code in the ninth embodiment. The code "DENIED_STR_LINK" meaning deny because the primary and secondary links are in STE link relationship is allocated to one of the values presently in reserved, here 20. That is, the Status Code of "DENIED_STR_LINK" is notified when the Association Request frame is transmitted from the STA MLD in which the primary link and the secondary link are in STR link relationship and a rule that permits only the STA MLD in which the primary link and the secondary link are in non-STR link relationship to use the secondary link is determined.

The code "DENIED_NON-STR_LINK" which means to deny because the primary link and the secondary link are in non-STR link relationship is allocated to one of the values presently in reserved, here 21. That is, the Status Code of "DENIED_NON-STR_LINK" is notified when the Association homiest frame transmitted from the STA MLD in which the primary lint and the secondary link are in non-STR link relationship and a rule that permits only the STA MLD in which the primary link and the secondary link are in STR link relationship to use the secondary link is determined.

Alternatively, the Beacon frame, the Probe Response frame, or the like may notify in advance that there is such a limitation due to the secondary link in the AP MLD. With this configuration, it is possible to avoid inefficiency that connection is not permitted by making a connection request without knowing the usage policy or the secondary link.

By aggregating the STA MLDs in which the primary link and the secondary link are in non-STR link relationship for a specific secondary link in this manner, the AP MLD only has to check the communication state of the primary link in order to care for non-STR link relationship only in accessing the specific secondary link, and the process of obtaining the access right can be simplified.

Tenth Embodiment

In the above embodiments, the AP MLD independently sets the primary link. In the present embodiment, the AP MLD sets the primary link based on a request from the STA MLD. For example, when the primary links requested by each STA MLD are different, the AP MLD can set different primary links for each STA MLD.

As described above, the AP MLD notifies the STA MLD of a wireless link that is usable in the multi-link communication over a certain wireless link using the Reduced Neighbor Report element of the Beacon frame. The STA MLD notifies the AP MLD of another link to be requested to be connected and a desired primary link over a certain wireless link using the ML element of the Association Request frame.

The AP MLD determines a link to be used and the primary link, and not the STA MLD of the determined result using Association Response frame. In determining the primary link, the AP MLD may reject a connection request of a wireless link of the STA MLD that does not satisfy the constraint condition. The AP MLD defines a new value in the Status Code of the Association Response frame and notifies the STA MLD of a reason for rejecting the connection request.

FIG. 37 illustrates an example of the Status Code in the tenth embodiment. The code "DENIED_NOT_RESTRICTION_CONDITION" meaning reject for not meeting the constraint is allocated to one of the presently reserved values, here 9.

When the AP MLD sets different primary links according to the STA MLD requirements, the number of primary links may be excessively increased. In order to suppress the increase in the number of primary links, the AP MLD may determine the primary link such that the number of primary links for non-STR MLD) is as small as possible, for example, one or two, and may reject the connection request of the STA MLD in some cases.

According to the tenth embodiment, the load of processing on the AP MLD side increases, but the multi-link communication according to the request of the AP MLD side can be executed, and thus the STA MLD side has a large advantage.

Eleventh Embodiment

The present embodiment corresponds to the case where the AP MLD changes the frequencies of some of the wireless links used in the multi-link communication.

In the wireless LAN in conformity with IEEE 802.11 standard, a channel switch mechanism for changing a channel used in the BSS to another channel is defined. For example, in a Dynamic Frequency Selection (hereinafter, referred to as DFS) operation, when a radar wave is detected in a presently used channel, it is a typical example that the presently used communication channel has to be shifted to another channel.

In addition to this, the AP MLD sometimes changes the frequency channel based on some algorithm. For example, when there is some interference from another BSS or the like, it is difficult to obtain an access right, or QoS fails to be satisfied even though an access right is obtained, the AP PhD may change the frequency channel.

In the conventional channel switch, the STA MLD accommodates (connects) a channel of a certain frequency, i.e., the STA MLD has a connection relationship can accommodate a changed channel without performing the association process. However, when the frequency of the wireless link used in the multi-link is changed, there is a possibility that relationship between the wireless link and the primary link is changed from STR link relationship to non-STR link relationship or vice versa by the STA MLD.

Therefore, when the frequency of the wireless link used by the AP MLD in the multi-link is changed, the STA MLD has to notify the AP MLD that the changed wireless link and the primary link are in non-STR/STR link relationship.

For example, after changing the wireless link, the AP MLD has to collect, from the STA MLD, information that is capable of identifying that the changed wireless link and primary link are in non-STR/STR link relationship. Therefore, the AP MLD creates a new type of Trigger frame that requests transmission of the information. The Common Info field of the Trigger frame includes a Trigger Type subfield.

FIG. 38 shows an example of relationship between the value of the Trigger Type subfield and the type of the Trigger frame. For example, the value of the Trigger Type subfield is 0 to 15. For example, the value of 0 indicates a basic type (Basic). A value 1 indicates a type (Beamforming Report Poll (BRP)) of requesting a beamforming report. in the following, similarly, up to the value of 7 indicates the type of the current Trigger frame. The values of 8 to 15 are reserved values that are not presently used.

The new type of the Trigger frame that requests transmission of the information capable of identifying non-STR/STR link relationship is allocated to any of the reserved values. For example, a value 8 is defined indicate a type (Link Info Report of Poll (LIRP)) for which link information is requested.

A plurality of the STA MLDs (or a single STA MLD) having received the Trigger frame of the new type from the AP MLD over a certain wireless link create a frame including information that is capable of identifying that the changed wireless link and the primary link are in non-STR/STR link relationship, and transmit the frame to the AP MLD in the UL MU. As a result, the AP MLD can efficiently collect, from the STA MLD, information that capable of identifying that the changed wireless link and primary link are in non-STR/STR link relationship.

The STA MLD may set information (channel information, channel width, and the like) of the changed wireless link in a Trigger Dependent Common Info subframe and perform UL MU transmission.

The STA MLD can notify the AP MLD of non-STR/STR link relationship between the changed wireless link and the primary link when obtaining the information of the changed wireless link from the AP MLD in advance. In order to realize this, similarly to the operation in the channel switch, the AP MLD may notify the STA MLD of the change information indicating the change of the wireless link several times in advance, and give the STA MLD a time margin for re-notification. Specifically, the change information may be notified by the Beacon frame before several beacon intervals. The AP MED may notify the STA MLD of a time at which the wireless link is to be changed and give the STA MLD time to transition to a new wireless link after the change. Specifically, the STA MLD may be notified how many cycles after the beacon interval the frequency of the wireless link changes.

There is the case where the AP MLD newly adds a wireless link corresponding to the multi-link communication, and the above operation is similarly applied to this case. Since the STA MLD has to notify the AP MLD that the newly added wireless link and the primary link are in non-STR/STR link relationship, the STA MLD has to detect when the newly added wireless link is available.

Even when the AP MLD changes the primary link itself, a relationship with respect to another link may change. Therefore, the STA MLD has to notify the AP MLD of non-STR/STR link relationship between the primary link changed by the AP MLD and another link.

According to the eleventh embodiment, even though the AP MLD changes the frequencies of some wireless links of a plurality of wireless links used in the multi-link communication, the multi-link communication can be continuously executed.

Twelfth Embodiment

The present embodiment corresponds to the case where the STA MLD changes wireless link used in the communication. After the STA MLD associates with the AP MLD, it may be desired to change the wireless link used. After changing the wireless link, the STA MLD does not have to reassociate with the AP MLD.

An example of wireless link switching by the STA MLD is that the STA MLD changes a wireless link having STR link relationship with respect to the primary link to a wireless link having non-STR link relationship with respect to the primary link. In some cases, the STA MLD does not use the wireless link having STR link relationship with respect to the primary link due to, for example, interference from another system. In this case, the STA MLD may intentionally change the wireless link having STR link relationship with respect to the primary link to a wireless link having non-STR link relationship with respect to the primary link.

For example, in 2.4 GHz band, there is interference such as a Bluetooth radio wave or an electromagnetic wave from a microwave oven in addition to interference from another BSS of the same wireless LAN. In such a case, when the primary link is in 5 GHz band and another link in non-STR link relationship with respect to the primary link is available in 5 GHz band as a secondary link candidate, the STA MLD changes the secondary link to the secondary link candidate. Therefore, the STA MLD has to notify the AP MLD that the changed wireless link has non-STR link relationship with respect to the primary link.

Another example of changing a wireless link by the STA MLD is that the STA MLD changes the secondary link in non-STR link relationship with respect to the primary link to another link. In this case, the primary link and the secondary link may remain in non-STR link relationship, or may change to be in STR link relationship.

In any case, when the wireless link is changed, the STA MLD has to notify the AP MLD that the new wireless link and the primary link are in non-STR/STR link relationship. However, since relationship between the primary link and another link that has not been changed does not change, the STA MLD does not have to re-notify the information about the wireless link that has not been changed. The STA MLD may notify the AP MLD of the fink relationship between the other link and the new link as long as the link relationship becomes non-STR link relationship.

In another example of the change of the wireless link by the STA MLD, there is the case where the STA MLD chances a wireless link that is originally the primary link to another link. In this case, when the AP MLD sets the primary Link, the STA MLD does not use the primary link. Therefore, it is necessary to select a wireless link whose relationship with respect to all the other links is the STR link. On the condition that this is ensured, the STA MLD may omit the information on relationship between the non-STR/STR links in the change notification to the AP MLD.

When The primary link is determined between the AP MLD and the STA MLD through negotiation, the constraint condition is unnecessary, and therefore the STA MLD re-notifies the AP MLD of The link relationship among the wireless links to be used again. The primary link is determined by re-negotiation between AP MLD and the STA MLD.

The STA MLD may newly add a wireless link. For example, a wireless link that has already been listed as available by the AP MLD and has not been notified of being used from the STA MLD in an association process may be subsequently added. Also in such a case, the STA PLID notifies the AP MLD that the newly added wireless link and another link (particularly, the primary link) are in non-STR/STR link relationship.

In any of the above cases, the STA MLD may commonly recognize with the AP MLD the timing at which the wireless link changes or the timing at which the wireless link is added. When the AP MLD has to detect non-STR link relationship, the AP MLD also has to detect the time. As a frame that notifies the information relating to the change or the new addition, a Link Change Indication Action frame to be newly defined can be used. In this Action frame, information may be notified by the ML element as illustrated in FIGS. 11 and 13 to 16.

When non-STR link relationship between an original link and the primary link does not change, i.e., when the changed link and the primary link are still in non-STR link relationship, notification of non-STR/STR link relationship with respect to the changed link from the STA MLD to the AP MLD may be omitted.

Even though the STA MLD has previously notified the AP MLD of non-STR/STR link relationships of the wireless links that can be all candidates under control of the AP MLD, it may be better to notify again non-STR/STR link relationships of the wireless links that can be all candidates from the STA MLD to the AP MLD. This is because, when the STA MLD does not actually use a wireless link, the AP MLD may not store unnecessary information for the time being because the AP MLD wants to reduce she amount of information to be managed as much as possible. For example, there is a wireless link that does not allocate a traffic ID (Traffic ID, hereinafter, referred to as TID) to be used.

According to the twelfth embodiment, even though the STA MLD changes the frequencies of some wireless links of the plurality of wireless links used in the communication, the multi-link communication can be continuously executed.

Thirteenth Embodiment

There is direct link communication in which a first STA and a second STA associated with the seine AP perform direct communication without going through the AP in a BSS (infrastructure BSS) configured under the AP.

In FIG. 21, when the AP MLD determines whether communication can be performed over the primary link on the premise of Intervention of the AP MLD, it is possible to confirm whether the counterpart terminal is the non-STR terminal when the AP MLD confirms a counterpart in the primary link or the counterpart of a receiving terminal in the primary link. However, in the direct link communication, the AP MLD, more specifically, an AP corresponding to a wireless link in the AP MLD does not intervene in frame exchange. Therefore, the AP MLD also has to observe frames other than the frame that the AP MLD is transmitting or receiving. That is, the AP MLD has to check the RA and the TA even for a frame that the AP MLD is transmitting or a frame other than The frame that the AP MLD is receiving to check whether the counterpart is the non-STR terminal.

As an example of a countermeasure, when the direct link communication is performed, the use of the multi-link communication is prohibited. For example, this is prohibited as specifications. As a method of prohibition, the STA MLD may voluntarily restrict the STA MLD such that the STA MLD does not perform the direct link communication during the multi-link communication under a certain AP MLD, or the AP MLD may prohibit the direct link communication using the Beacon frame. An information element (for example, it may be referred to as an EHT Operation element) notifying prohibition may be newly defined. In the current wireless LAN standards, an HT Operation element, a VHT Operation element, an HE Operation element, and the like are defined. These Operation elements are used by the AP to notify the operational association of the BSS. The new EHT Operation element is likewise used by the AP to notify operational relevance of the BSS. The EHT Capability element is for a terminal (including an AP and a STA) to notify the capability of the terminal, and is different from the EHT Operation element.

With this configuration, it is possible to simplify determination by the AP MLD as to whether the STA MLD is communicating over the wireless link in non-STR link relationship with respect to the primary link. That is, the AP MLD only has to confirm a counterpart terminal (the TA of a frame addressed to the AP MLD or the RA of a frame transmitted from the AP MLD) communicating with its own device over the primary link.

On the other hand, the multi-link communication may be made available also in the direct link communication. In this case, the STA MLD performs confirmation similar to the AP MLD for transmission destination STA MLD. That is, when the multi-link communication is performed among the STA MLDs, the STA MLD recognizes that a plurality of wireless links to be subjected to the multi-link communication are in non-STR/STR link relationship.

In the case of the TDLS in which the AP MLD is not directly involved in setting up the direct link communication, when a STA of a first STA MLD of two STA MLDs that perform the direct link communication transmits a TDLS Setup Request frame for setup settings, the STA of the first STA transmits the TDLS Setup Request frame to a STA of a second STA of the two STA MLDs through the AP MLD, the TDLS Setup Request frame including, for example, information about a plurality of wireless links to be used. The STA of the second STA MLD receiving the TDLS Setup Request frame through the AP MLD transmits the TDLS Setup Response frame to the STA of the first STA MLD through the AP MLD. When the STA of the second STA MLD receives connection request of the direct link communication, the STA of the second STA MLD transmits the TDLS Setup Response frame to the STA of the first STA through the AP MLD, the TOLS Setup Response frame including, Son example, information capable of identifying that the plurality of wireless links are in non-STR/STR link relationship. When the multi-link communication is performed in the direct communication, the primary link follows the setting of the AP MLD in order to ensure that the AP MLD can determine whether a desired STA MLD can transmit a frame by observing the primary link. Basically, a subset of wireless links used by the AD MLD may be selected. In a first STA MLD that transmits the TDLS Setup Request frame, all selected wireless links are in STR link relationship. The first STA MLD should operate like the AP MLD in the first embodiment and the like. When there is a wireless link in non-STR link relationship with respect to the primary link, the first STA MLD has to set information relating to non-STR/STR link relationship in the TDLS Setup Request frame. Alternatively, when the access right is necessarily obtained in the primary link in both STA MLDs of the direct link and the other secondary links are used only to transmit a frame in synchronization with the primary link, it is not necessary to notify each other of non-STR/STR link relationship on the assumption that all other secondary links are in non-STR link relationship with respect to the primary link in both STA MLDs. Specific examples of these notifications can follow the notification method in the first embodiment, for example. That is, an information element similar to the Beacon frame may be set to the TDLS Setup Request frame, and an information element similar to the Association Request frame may be set to the TDLS Setup Response frame for notification.

The Legacy AP MLD can detect Data frame, but fails to detect the Management frame such as the TDLS Setup Request frame and TDLS Setup Response frames. Therefore, In order to stop the legacy AP MLD from being involved in the setting of the direct link communication, the Management frame such as the TDLS Setup Request frame and the TRIS Setup Response frame is encapsulated in the Data frame and transmitted. Encapsulation is to put the entire Management frame in the Frame Body of the Data frame to obtain a Data frame.

When the direct link communication is performed between the first STA MLD and the second STA MLD, frame transmission fails to be performed among The STA MLDs before setting the direct link communication. As such, the first STA MLD encapsulates the Management frame and transmits a capsule to the legacy AP MLD. In the Management frame, an address of the first STA MLD is set as the transmission source, and an address of the second STA MLD is set as the destination.

The Legacy AP MLD extracts the Management frame from the Frame Body of the received Data frame, encapsulates the Management frame into the Data frame, and transmits the Data frame to the second SIP MLD that is the destination of the Management frame.

A second STA MLD extracts the Management frame from the Frame Body of the received Data frame. Since the address of the first STA MLD is set as the transmission source in the Management frame, the second STA MLD sets the direct link communication with the first STA MLD.

In the first embodiment, the AP MLD notifies the STA MLD of information on available wireless links, and the STA MLD notifies the AP MLD of wireless links to be used. In the present embodiment, a first STA MLD among two the STA MLDs that perform the direct link communication may notify a second STA MLD among two the STA MLDs of a wireless link to he used in the direct link communication using the TDLS Setup Request frame, and the second STA MLD may notify the first STA MLD of a non-STR/STR links relationship using the TDLS Setup Response frame. The second STA MLD sometimes does not necessarily notify the first STA MLD of non-STR/STR link relationship. The first STA MLD may notify the second STA MLD of non-STB/STR link relationship.

The AP MLD notifies each STA MLD of a usable wireless link using the Beacon frame. Therefore, since each STA MLD detects the detailed information of the wireless links by the notification from the AP MLD, it is not necessary to transmit the detailed information from each STA MLD to the counterpart that performs the direct link communication redundantly. In regard to information on the wireless links, information may be exchanged among the STA MLDs that perform the direct link communication using the link identifier.

When the direct link communication is performed using a wireless link (off-channel) not used by the AP MLD, as notified by the AP MLD, it is necessary to notify the STA SLID that performs the direct link communication cf information indicating a frequency position and the like of a wireless link used for the direct link communication.

When the AP MLD is involved in setting of The direct communication instead of the TDLS, the AP MLD detects the capability including non-STR/STR link relationship of two STA MLDs that set the direct link communication. Therefore, when each STA MLD transmits the setting information for the direct link communication and the information of the wireless link in non-STR/STR link relationship is not included in the Management frame, the APMLD can complement the information and notify both of the two STA MLDs configuring the direct link communication of the complemented information.

As long as the AP MLD confirms only the TA or the RA of a frame transmitted over the primary link (regardless of whether the AP MLD is transmitting), the AD MLD can detect whether a desired STA MLD is performing communication over the primary link even though the direct link communications are performed in the BSS.

According to the thirteenth embodiment, it is possible to perform the direct link communication during the multi link communication.

Fourteenth Embodiment

In the above-described embodiments, the AP MLD independently sets the primary link, or the AP MLD sets the primary link by negotiation between the STA MLD and the AP MLD. In this embodiment, when the STA MLD obtains an access right of one of a plurality of wireless links used in multi-link communication, i.e., obtains a TXOP, and starts data exchange the STA MLD sets the wireless link for which the access right is obtained as the primary link. The AP MLD performs an operation using the primary link set by the STA MLD.

For example, when the multi-link communication is performed using Link1 and Link2, the STA MLD sets Link1 as the primary link and transmits a frame only over Link1 when the STA MLD first obtains an access right on Link1. When the STA MLD obtains the access right on Link2 following Link1, the STA MLD also transmits a frame over Link2.

When transmitting a frame to the STA MLD, the AP MLD determines whether the STA MLD is not communicating over all wireless links in non-STR link relationship in the STA MLD. When not communicating, the AD MLD transmits a frame in one wireless link or a plurality of wireless links.

In order to achieve this, the STA MLD has to notify the AP MLD in advance of non-STR/STR link relationships of the wireless links to be used. The AP MLD holds relationship for each STA MLD.

With this configuration, the confirmation load in the AP MLD increases, but the transmission opportunity can be increased in the STA MLD having wireless links in non-STR link relationship with respect to the AP MLD. Here, such STA MLD is referred to as a non-STR STA MLD. However, when the AP MLD limits the number of wireless links in non-STR link relationship at the non-STR MLD STA, the number of wireless links which are subject to be checked by the AP MLD can be reduced. This is not the case among wireless links in STR link relationship.

In the fourteenth embodiment, when the non-STR STA MLD first obtains an access right ever any wireless link in non-STR link relationship with other wireless links, the AP MLO sets the wireless link as the primary link. The AP MLD observes at least the communication states of all the wireless links that are notified by the non-STR MLD STA and an non-STR link relationship, sequentially detects the primary link of the non-STR STA MLD, and stops transmission to the non-STR MLD STA in other links in non-STR link relationship with respect to the primary link. In the fourteenth embodiment, notification of the primary link by the Beacon frame or the like of the first embodiment is unnecessary.

According to the fourteenth embodiment, although the confirmation load on the AP MLD increases, the transmission opportunity of the STA MLD having the wireless links in non-STR link relationship with respect to the AP MLD increases.

Fifteenth Embodiment

In the above description of the embodiments, details of the antenna are not described. As a fifteenth embodiment, an antenna mounting method will be described. This implementation method is applicable to all the embodiments described above.

Figure 39:
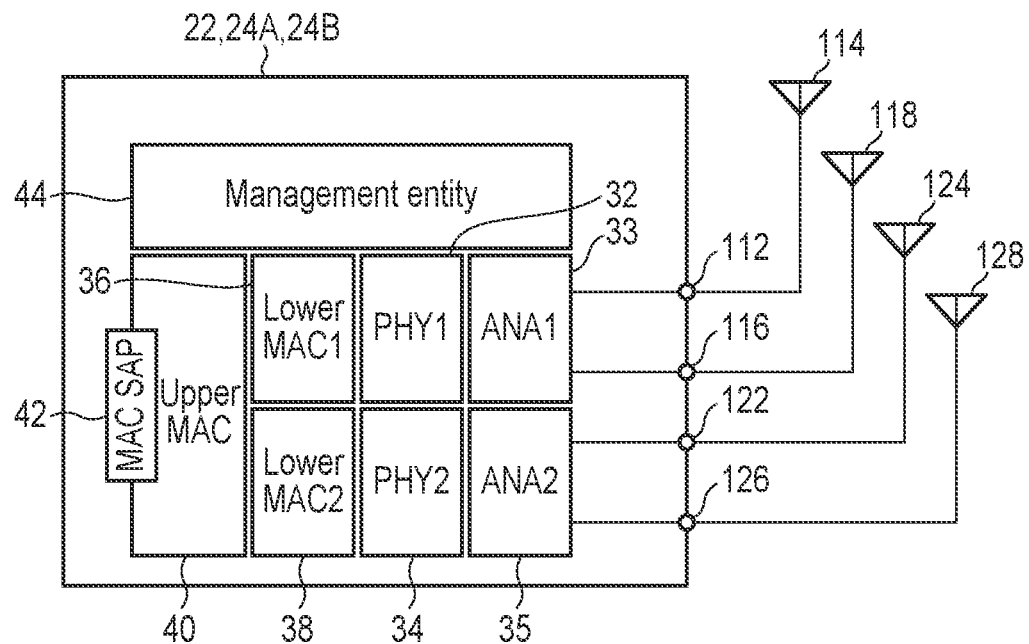
FIG. 39 illustrates a first implementation example of an antenna according to a fifteenth embodiment.

FIG. 39 illustrates a first implementation example in which the AP MLD 22 (or the non-AP MLD 24A, the non-AD (STA) MLD 24B) uses a transmission antenna 114, a first reception antenna 118, a second transmission antenna 124, and a second reception antenna 128.

In the fifteenth embodiment, a first analog processing unit (ANA1) 33 and a second analog processing unit (ANA2) 35 are added to the configuration of FIG. 2 in the AP MLD 22.

The first transmission antenna 114 is connected to a first transmission antenna connector 112 of the AP MLD 22. The first reception antenna 118 is connected to a first reception antenna connector 116 of the AD MLD 22. The second transmission antenna 124 is connected to a second transmission antenna connector 122 of the AD MLD 22. The second reception antenna 128 is connected to a second reception antenna connector 126 of the AP MLD 22.

The first analog processing unit (ANA1) 33 is connected to the first physical processing unit (PHY1) 32. The second analog processing unit (ANA2) 35 is connected to the second physical processing unit (PHY2) 34. Each of the analog processing units 33 and 35 includes a transmission system processing unit and a reception system processing unit.

The transmission system processing units of the analog processing units 33 and 35 convert the PHY packet, which is a digital signal output from the physical processing units 32 and 34, into an analog signal having a frequency corresponding to a wireless link. The analog signal output from the transmission system processing unit of the first analog processing unit 33 is supplied to the first transmission antenna 114 through the first transmission antenna connector 112 and transmitted from the antenna 114. The analog signal output from the transmission system processing unit of the second analog processing unit 35 is supplied to the second transmission antenna 124 through the second transmission antenna connector 122 and transmitted from the antenna 124.

The analog signal received by the first reception antenna 118 is inputted to the reception system processing unit of the first analog processing unit 33 via the first reception antenna connector 116. The analog signal received by the second reception antenna 128 is outputted to the reception system processing unit of the second analog processing unit 35 via the second reception antenna connector 126. The reception system processing units of the analog processing units 33 and 35 convert the analog signals received by the reception antennas 118 and 128 into digital signals such that the analog signals can be processed by the physical processing units 32 and 34.

As described above, in the first implementation example, the first transmission antenna 114 is used as the transmission of Link1, the first reception antenna 118 is used as the reception of Link1, the second transmission antenna 124 is used as the transmission of Link2, and the second reception antenna 128 is used as the reception of Link2.

Figure 40:
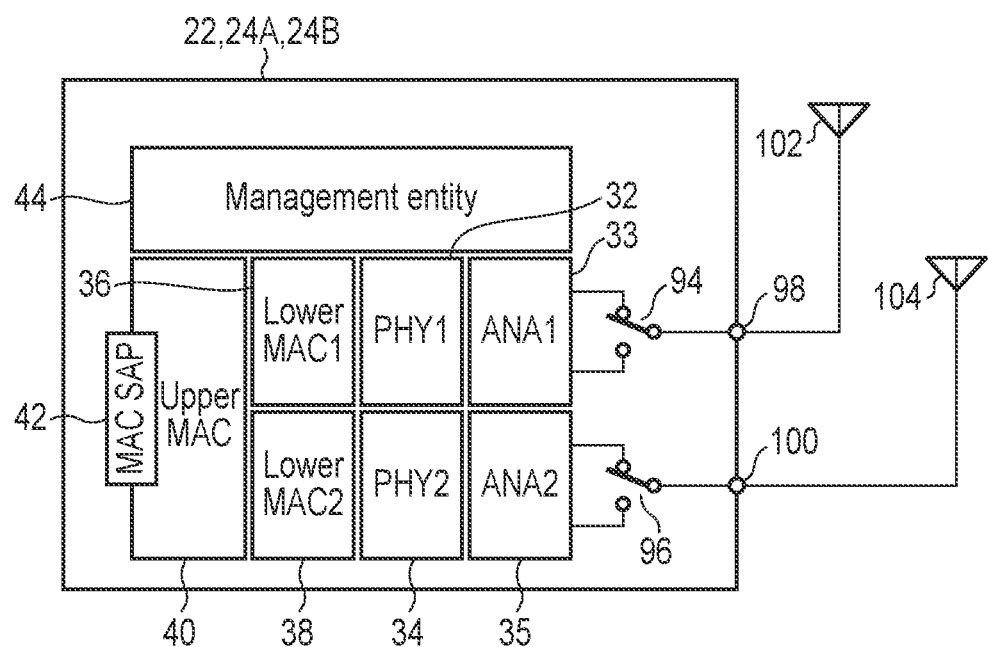
FIG. 40 illustrates a second implementation example of an antenna according to the fifteenth embodiment.

FIG. 40 illustrates a second implementation example in which the AP MLD 22 (or the non-AP (STA) MLD 24A, the non-AP (STA) MLD 24B) uses a first transmission/reception antenna 102 and a second transmission/reception antenna 104.

The first transmission/reception antenna 102 is connected to a first transmission/reception antenna connector 98 of the AP MMD 22. The second transmission/reception antenna 104 is connected to the second transmission/reception antenna connector 100 of the AP MLD 22.

The analog signal output from the transmission system processing unit of the first analog processing unit 33 is supplied to the first transmission/reception antenna 102 through a selector 94 and the first transmission/reception antenna connector 98, and is transmitted from the first transmission/reception antenna 102. The analog signal output from the transmission system processing unit of the second analog processing unit 35 is supplied to the second transmission/reception antenna 104 through a selector 96 and the second transmission/reception antenna connector 100, and is transmitted from the second transmission/reception antenna 104.

The analog signal received by the first transmission/reception antenna 102 is inputted to the reception system processing unit of the first analog processing unit 33 via the first transmission/reception antenna connector 98 and the selector 94. The analog signal received by the second transmission/reception antenna 104 is inputted to the reception system processing unit of the second analog processing unit 35 via the second transmission/reception antenna connector 100 and the selector 96.

The selectors 94 and 96 are switched by controllers included in the analog processing units 33 and 35, respectively. The selector 94 is switched to switch between the transmission of Link1 and the reception of Link1. The selector 96 is switched to switch between the transmission of Link2 and the reception of Link2.

As described above, in the second implementation example, the first transmission/reception antenna 102 is used for the transmission and reception of Link1, and the second transmission/reception antenna 104 is used for the transmission and reception of Link2.

Figure 41:
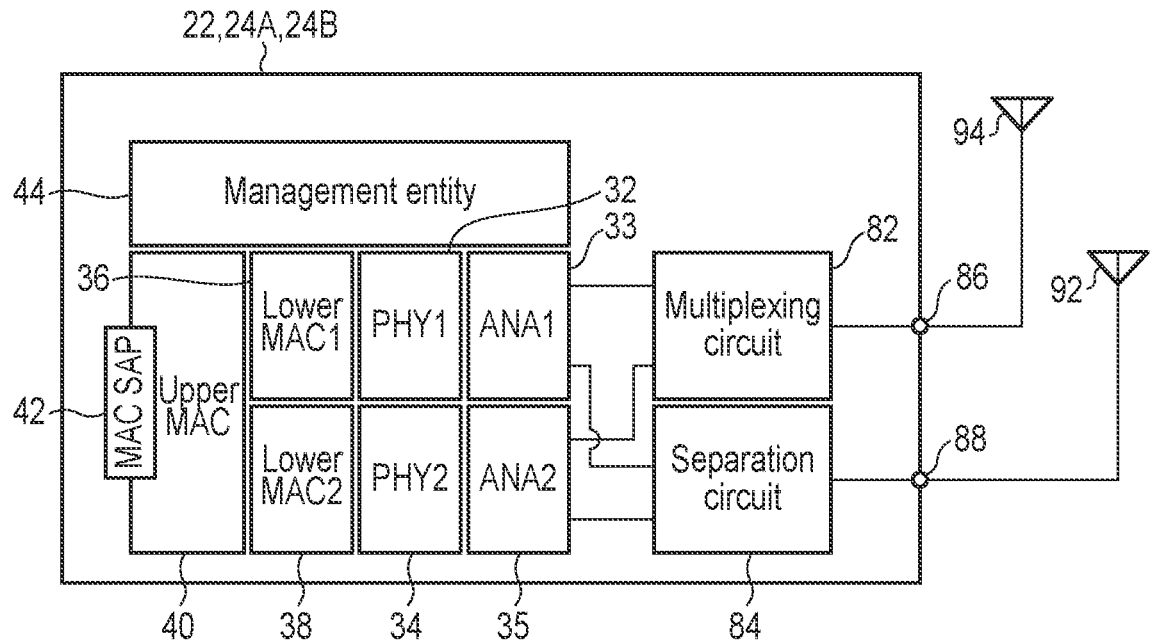
FIG. 41 illustrates a third implementation example Of an antenna according to the fifteenth embodiment.

FIG. 41 shows a third implementation example in which the AP MLD 22 (or the non-AP (STA) MLD 24A, the non-AP (STA) MLD 245) uses one transmission antenna 94 and one reception antenna 92.

The transmission antenna 94 is connected to a transmission antenna connector 36 of the AP VID 22. The reception antenna 92 is connected to a reception antenna connector 38 of the AP MLD 22.

The analog signal output from the transmission system processing unit of the first analog processing unit 33 and the analog signal output from the transmission system processing unit of the second analog processing unit 35 are supplied to a multiplexing (MUX) circuit 82. The multiplexing circuit 82 multiplexes the two analog signals into a single analog signal. The output analog signal of the multiplexing circuit 82 is supplied to the transmission antenna 94 via the transmission antenna connector 86 and transmitted from the transmission antenna 94.

The analog signal received by the reception antenna 92 is inputted to a separation (DEMUX) circuit 84 via the reception antenna connector 88. The separation circuit 84 separates the reception signal for each link frequency, supplies the reception signal of Link1 to the reception system processing unit of the first analog processing unit 33, and supplies the reception signal of Link2 to the reception system processing unit of the second analog processing unit 35.

As described above, in the third implementation example, the single transmission antenna 94 is used in common for the transmission of Link1 and the transmission of Link2, and the single reception antenna 92 is used in common for the reception of Link1 and the reception of Link2.

Figure 42:
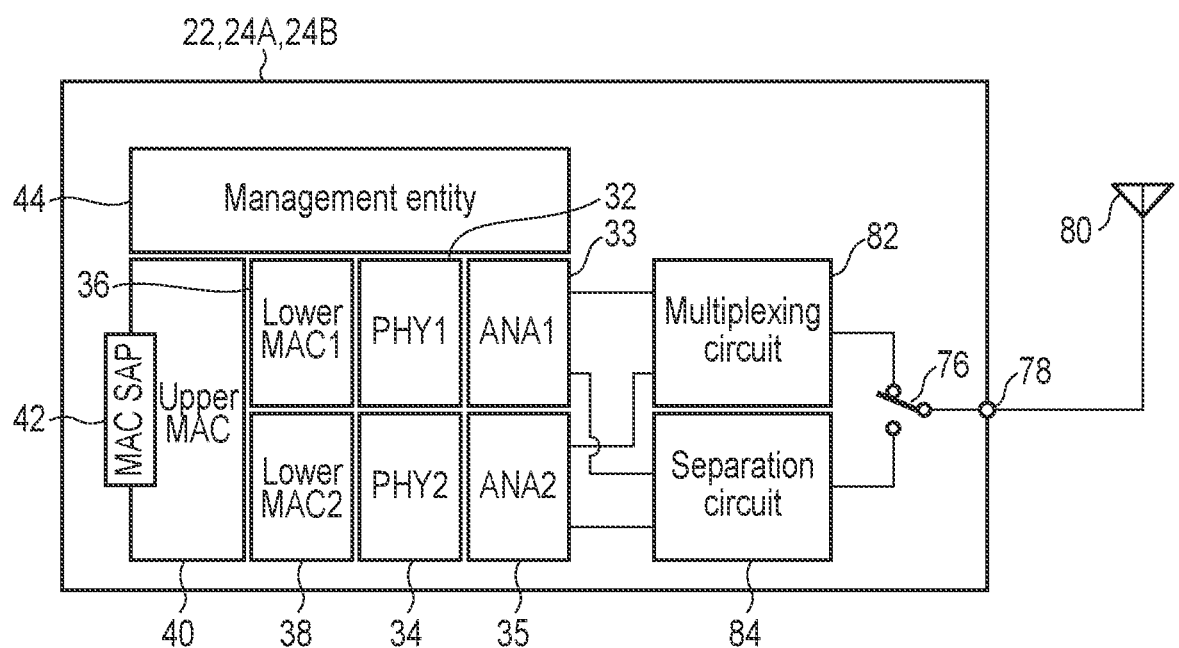
FIG. 42 illustrates a fourth implementation example of an antenna according to the fifteenth embodiment.

FIG. 42 illustrates a fourth implementation example in which the AP MLD 22 (or the non-AP (STA) MLD 24A, the non-AP (PTA) MLD 24B) uses a single transmission/reception antenna 80. The transmission/reception antenna 80 as connected to the transmission/reception antenna connector 78 of the AP MLD 22.

In the fourth implementation example, a selector 76 is added to the third implementation example.

The output the multiplexing circuit 82 is supplied to the transmission/reception antenna 80 through the selector 76 and the transmission/reception antenna connector 78 and transmitted from the transmission/reception antenna 80.

The analog signal received by the transmission/reception antenna 80 is inputted to the separation (DEMUX) circuit 84 through the transmission/reception antenna connector 78 and the selector 76.

The selector 76 is switched by a controller included in each of the analog processing units 33 and 35. The selector 76 can switch between the transmission of Link1 and Link2 and the reception of Link1 and Link2.

As described above, in the fourth implementation example, the single transmission antenna 80 is used for the transmission and the reception of Link1 and Link2 in a sharing manner.

While certain embodiments have been described, these embodiments have been presented by the way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device which:
   is configured to receive, from another wireless communication device at a first frequency, first information identifying that the other wireless communication device is capable of operating at a second frequency, and second information identifying that the other wireless communication device has a restriction on transmission and reception between the second frequency and the first frequency;
   notifies the other wireless communication device that one of the first frequency and the second frequency is set as a primary frequency;
   connects to the other wireless communication device at the first frequency and the second frequency; and
   is configured to receive the second information and, based on whether a transmission destination address or a transmission source address of communication at the primary frequency includes an address of the other wireless communication device, obtain an access right of a frame addressed to the other wireless communication device at a secondary frequency other than the primary frequency out of the first frequency and the second frequency.

2. The wireless communication device according to claim 1, wherein the second information identifies that reception fails to be performed at the first frequency when transmission is performed at the second frequency, or that reception fails to be performed at the second frequency when transmission is performed at the first frequency.

3. The wireless communication device according to claim 1, wherein when the transmission destination address or the transmission source address of communication at the primary frequency includes an address of the other wireless communication device, transmission of a frame addressed to the other wireless communication device at the secondary frequency is postponed.

4. The wireless communication device according to claim 1, wherein:
   the first information identifies that the other wireless communication device is capable of operating at a third frequency and the second frequency;
   the wireless communication device notifies the other wireless communication device that one of the first frequency, the second frequency, and the third frequency is set as the primary frequency; and
   the secondary frequency comprises two frequencies other than the primary frequency among the first frequency, the second frequency, and the third frequency.

5. The wireless communication device according to claim 1, further comprising:

a first connector connectable to a first antenna that transmits a signal of the first frequency;
a second connector connectable to a second antenna that receives a signal of the first frequency;
a third connector connectable to a third antenna that transmits a signal of the second frequency; and
a fourth connector connectable to a fourth antenna that receives a signal of the second frequency.

6. The wireless communication device according to claim 1, further comprising:
a first connector connectable to a first antenna that transmits a signal of the first frequency and receives the signal of the first frequency; and
a second connector connectable to a second antenna that transmits a signal of the second frequency and receives the signal of the second frequency.

7. The wireless communication device according to claim 1, further comprising:
a first connector connectable to a first antenna that transmits a signal of the first frequency and a signal of the second frequency; and
a second connector connectable to a second antenna that receives the signal of the first frequency and the signal of the second frequency.

8. The wireless communication device according to claim 1, further comprising a connector connectable to an antenna that transmits a signal of the first frequency and a signal of the second frequency and that receives the signal of the first frequency and the signal of the second frequency.

9. A wireless communication device which:
transmits, to another wireless communication device, third information identifying that the wireless communication device is capable of operating at a first frequency and a second frequency, and fourth information identifying that there are restrictions on transmission and reception between the first frequency and the second frequency;
receives, from the other wireless communication device, a notification that one of the first frequency and the second frequency is set as a primary frequency;
connects to the other wireless communication device at the first frequency and the second frequency; and
based on the fourth information identifying that there are restrictions on transmission and reception between the first frequency and the second frequency, obtains an access right to the other wireless communication device at the primary frequency, and obtains an access right to the other wireless communication device at a secondary frequency other than the primary frequency in the first frequency and the second frequency.

10. The wireless communication device according to claim 9, wherein when a transmission destination address or a transmission source address of communication at the primary frequency includes an address of the other wireless communication device, transmission of a frame addressed to the other wireless communication device at the secondary frequency is postponed.

11. The wireless communication device according to claim 10, wherein when transmission of a frame for which an access right is obtained at the primary frequency is postponed, transmission of a frame for which an access right is obtained at the secondary frequency is postponed.

12. The wireless communication device according to claim 9, wherein:
the third information identifies that operation is possible at the third frequency and the second frequency;
the wireless communication device receives, from the other wireless communication device, a notification that one of the first frequency, the second frequency, and the third frequency is set as the primary frequency; and
the secondary frequency comprises two frequencies other than the primary frequency among the first frequency, the second frequency, and the third frequency.

13. The wireless communication device according to claim 9, further comprising:
a first connector connectable to a first antenna that transmits a signal of the first frequency;
a second connector connectable to a second antenna that receives a signal of the first frequency;
a third connector connectable to a third antenna that transmits a signal of the second frequency; and
a fourth connector connectable to a fourth antenna that receives a signal of the second frequency.

14. The wireless communication device according to claim 9, further comprising:
a first connector connectable to a first antenna that transmits a signal of the first frequency and receives the signal of the first frequency; and
a second connector connectable to a second antenna that transmits a signal of the second frequency and receives the signal of the second frequency.

15. The wireless communication device according to claim 9, further comprising:
a first connector connectable to a first antenna that transmits a signal of the first frequency and a signal of the second frequency; and
a second connector connectable to a second antenna that receives the signal of the first frequency and the signal of the second frequency.

16. The wireless communication device according to claim 9, further comprising a connector connectable to an antenna that transmits a signal of the first frequency and a signal of the second frequency and that receives the signal of the first frequency and the signal of the second frequency.

17. A wireless communication method for a first wireless communication device connected to a second wireless communication device, the first wireless communication device being configured to receive, from the second wireless communication device at a first frequency, first information identifying that the second wireless communication device is capable of operating at a second frequency, and second information identifying that the second wireless communication device has a restriction on transmission and reception between the second frequency and the first frequency, the wireless communication method comprising:
notifying the second wireless communication device that one of the first frequency and the second frequency is set as a primary frequency;
connecting to the second wireless communication device at the first frequency and the second frequency; and
receiving the second information and, based on whether a transmission destination address or a transmission source address of communication at the primary frequency includes an address of the other wireless communication device, obtaining an access right of a frame addressed to the other wireless communication device at a secondary frequency other than the primary frequency in the first frequency and the second frequency.

18. A wireless communication method for a first wireless communication device connected to a second wireless communication device, the wireless communication method comprising:

transmitting, to the second wireless communication device, third information identifying that the first wireless communication device is capable of operating at a first frequency and a second frequency, and fourth information identifying that there are restrictions on transmission and reception between the first frequency and the second frequency;

receiving, from the second wireless communication device, a notification that one of the first frequency and the second frequency is set as a primary frequency;

connecting to the second wireless communication device at the first frequency and the second frequency; and based on the fourth information identifying that there are restrictions on transmission and reception between the first frequency and the second frequency, obtaining an access right to the other wireless communication device at the primary frequency, and obtaining an access right to the other wireless communication device at a secondary frequency other than the primary frequency in the first frequency and the second frequency.

* * * * *